US012626424B1

(12) United States Patent
Lee

(10) Patent No.: US 12,626,424 B1
(45) Date of Patent: May 12, 2026

(54) TRUSTED REALITY COMPOSITOR (TRC): OS-LEVEL PER-FRAME, FAIL-CLOSED, RECEIPT-GATED RENDERING, LABELING, AND EGRESS GATING FOR AR/VR/CAMERA OVERLAYS

(71) Applicant: Yong Bok Lee, Sheridan, WY (US)

(72) Inventor: Yong Bok Lee, Sheridan, WY (US)

(73) Assignee: SILENT AUTHORITY LLC, Sheridan, WY (US)

( * ) Notice: Subject to any disclaimer, the term of this patent is extended or adjusted under 35 U.S.C. 154(b) by 0 days.

(21) Appl. No.: 19/358,595

(22) Filed: Oct. 15, 2025

Related U.S. Application Data

(60) Provisional application No. 63/876,985, filed on Sep. 6, 2025.

(51) Int. Cl.
　G06T 11/00 (2026.01)
　G06F 21/62 (2013.01)
　G06Q 50/26 (2024.01)

(52) U.S. Cl.
　CPC .......... G06T 11/00 (2013.01); G06F 21/6218 (2013.01); G06Q 50/265 (2013.01)

(58) Field of Classification Search
　CPC .... G06Q 50/265; G06F 21/6218; G06T 11/00
　See application file for complete search history.

(56) References Cited

U.S. PATENT DOCUMENTS

| 4,309,569 A | 1/1982 | Merkle |
| 5,136,646 A | 8/1992 | Haber et al. |
| 5,136,647 A | 8/1992 | Haber et al. |
| 8,184,812 B2 | 5/2012 | Margolis et al. |
| 8,935,746 B2 | 1/2015 | Vetillard et al. |
| 9,397,990 B1 | 7/2016 | Taly et al. |
| 9,608,825 B2 | 3/2017 | Sarangdhar et al. |

(Continued)

OTHER PUBLICATIONS

Nakamoto, Satoshi. "Bitcoin: A Peer-to-Peer Electronic Cash System." 2008.

(Continued)

*Primary Examiner* — Phi Hoang

(57) ABSTRACT

Systems and methods for receipt-gated, fail-closed rendering and egress of synthetic overlays in AR/VR/camera pipelines. An OS-resident reality compositor admits an overlay only when a per-overlay Reality Receipt (R2) verifies, within the frame budget, to a current signed head of an append-only public log under a freshness policy, using an inclusion proof and, on head advance, append-only evolution (consistency); an anti-replay tuple prevents reuse. A view-permit latch binds time-of-check/time-of-use (TOC-TOU) verify-to-pixels and returns a Structured Precondition-Failure (code) while dropping non-conformant draws; PASS draws are labeled in machine-readable (optionally machine-audible) form. The same predicates govern rendering and at least one of share, upload, record/capture, or clipboard. An attested boundary (TEE/secure element) may aggregate a device run-permit across apps. The system emits view and interaction receipts and a digitally signed certification result that commits to receipt and signed-head identifiers, enabling portable evidence for policy consumers and audit systems.

30 Claims, 14 Drawing Sheets

(56) References Cited

U.S. PATENT DOCUMENTS

| | | | | |
|---|---|---|---|---|
| 9,824,418 | B1 * | 11/2017 | Labour | G06F 9/44589 |
| 10,075,298 | B2 | 9/2018 | Struttmann et al. | |
| 10,515,409 | B2 | 12/2019 | Creighton, IV et al. | |
| 10,581,613 | B2 | 3/2020 | Ford et al. | |
| 10,831,902 | B2 | 11/2020 | Black et al. | |
| 11,243,945 | B2 | 2/2022 | Govindarajan et al. | |
| 11,277,268 | B2 | 3/2022 | Yang et al. | |
| 11,424,931 | B2 | 8/2022 | Seibel et al. | |
| 11,546,377 | B2 | 1/2023 | Boshmaf et al. | |
| 11,595,215 | B1 | 2/2023 | Madden et al. | |
| 11,741,219 | B2 | 8/2023 | Zeng et al. | |
| 11,997,207 | B2 | 5/2024 | Madden et al. | |
| 2017/0142127 | A1 * | 5/2017 | Harple | H04L 63/0428 |
| 2019/0180372 | A1 | 6/2019 | Creighton, IV et al. | |
| 2021/0090348 | A1 * | 3/2021 | Croxford | G06V 10/82 |
| 2024/0061699 | A1 * | 2/2024 | Dunning | G06F 9/45558 |
| 2024/0078004 | A1 * | 3/2024 | Qian | G06F 3/0482 |
| 2025/0022189 | A1 * | 1/2025 | Oetting | G06F 16/9535 |
| 2025/0150270 | A1 * | 5/2025 | Ganju | G06F 21/31 |

OTHER PUBLICATIONS

Boucher, Nicolas; et al. "Triad: Trusted Timestamps." arXiv:2311.06156v2, 2023.

Birgisson, Arnar; Politz, Joe; Taly, Ankur; et al. "Macaroons: Cookies with Contextual Caveats for Decentralized Authorization in the Cloud." 2014.

NIST. Zero Trust Architecture (SP 800-207). 2020.

ISO/IEC. ISO/IEC 23894:2023—Information Technology—Artificial Intelligence—Guidance on Risk Management. Feb. 2023.

IETF. "The Base16, Base32, and Base64 Data Encodings (RFC 4648)." Oct. 2006.

HL7. "FHIR Release 5—Security and Privacy Guidance." 2023.

Groth, Jens. "On the Size of Pairing-Based Non-Interactive Arguments." 2016.

Boneh, Dan; Boyen, Xavier; Shacham, Hovav. "Short Group Signatures." 2004.

Douceur, John R. "The Sybil Attack." 2002.

Mamo, Julian; et al. "Dwarna: A Platform for Dynamic Consent." European Journal of Human Genetics, 2020.

European Union. "Regulation (EU) 2024/1689—Artificial Intelligence Act. OJ L, 12.7.2024." Jul. 12, 2024.

Laurie, Ben; Langley, Adam; Kasper, Emilia. "Certificate Transparency (RFC 6962)." IETF, Jun. 2013.

Android Open Source Project (Google). Android Verified Boot (AVB) 2.0—Security Model & Implementation (README). n.d.; retrieved Sep. 16, 2025.

C A/Browser Forum. Baseline Requirements for the Issuance and Management of Publicly Trusted TLS Certificates, Version 2.1.6. Jul. 21, 2025.

C2PA (Adobe; Arm; BBC; Intel; Microsoft; et al.). C2PA Technical Specification, Version 2.2. May 1, 2025.

W3C Verifiable Credentials Working Group. Verifiable Credentials Data Model v2.0. W3C Recommendation, May 15, 2025.

Apple Platform Security Guide. Dec. 2024. (PDF).

Laurie, Ben; Messeri, Eran; Stradling, Rob. "Certificate Transparency Version 2.0 (RFC 9162)." IETF, Dec. 2021.

Crosby, Scott A.; Wallach, Dan S. "Efficient Data Structures for Tamper-Evident Logging." USENIX Security, 2009.

Rundgren, Anders; Jordan, Brent; Erdtman, Samuel. "JSON Canonicalization Scheme (RFC 8785)." IETF, 2020.

Bormann, Carsten; Hoffman, Paul. "Concise Binary Object Representation (CBOR) (RFC 8949)." IETF, 2020.

Schaad, Jim; Jones, Mike; et al. "CBOR Object Signing and Encryption (COSE): Algorithms (RFC 9053)." IETF, 2022.

Birkholz, Henk; Thaler, Ned; Richardson, M .; et al. "Remote Attestation Procedures (RATS) Architecture (RFC 9334)." IETF, 2023.

Intel Corporation. Intel® SGX DCAP: ECDSA Quote Library—API Reference. Intel, 2022.

Lundblade, Laurence; Mandyam, Giridhar; O'donoghue, Jeremy; Wallace, Carl. The Entity Attestation Token (EAT), RFC.

Sporny, Manu; Guy, Amy; Sabadello, Markus; Reed, Drummond. Decentralized Identifiers (DIDs) v1.0. W3C Rec., Jul. 19.

NIST. Artificial Intelligence Risk Management Framework (AI RMF 1.0) (NIST AI 100-1). Jan. 2023.

* cited by examiner

TRUSTED REALITY COMPOSITOR (TRC): OS-LEVEL PER-FRAME, FAIL-CLOSED, RECEIPT-GATED RENDERING, LABELING, AND EGRESS GATING FOR AR/VR/CAMERA OVERLAYS

Non-Trademark Notice. "Trusted Reality Compositor" and "TRC" are technical labels/abbreviations for convenience only; no trademark rights are asserted. Applicant may commercialize the technology under different brand names. The scope of the invention is defined solely by the claims.

Equivalents (illustrative; non-limiting). References to particular transports, logs, proof systems, display stacks, or operating systems are illustrative. A "provenance anchor verifiable under a freshness policy" includes, without limitation, transparency-style logs and certificate-transparency signed heads, attested ledgers, certificate chains, quorum attest services, authenticated append-only structures, or vector-commitment/accumulator systems that provide substantially similar freshness and append-only evolution (consistency) semantics. Mention of external policies, regulations, or standards is not an admission that any is prior art.

CROSS-REFERENCE TO RELATED APPLICATIONS

Priority and incorporation. This application claims the benefit of U.S. Provisional Application No. 63/876,985 (filed Sep. 6, 2025) under 35 U.S.C. § 119 (c). The disclosure of the provisional application is incorporated by reference for non-essential subject matter only to the extent permitted by 37 C.F.R. § 1.57. In the event of any inconsistency, the present disclosure controls; all essential material supporting the claims is provided herein.

Cross-reference (illustrative; non-limiting). TRC is interoperable with the PoPC rail (Receipt-Anchored Policy-Compliant Execution and Outcome-Based Ranking), which emits verifiable receipts and verification/settlement artifacts that TRC may consume at compositor gatepoints. Interoperability includes, illustratively, sensor ingress (TSIL), model-load admission (AML-Gate), verify-then-write model memory (UPL), and settlement rails (ISL). These cross-references are evidentiary only and are not incorporated by reference; the claims control.

Independence (illustrative; non-limiting). Interoperability with external rails (e.g., PoPC) is optional; TRC operates without any specific receipt format so long as receipt semantics are satisfied.

Standards and references (non-limiting). References to public specifications or standards (e.g., WebAuthn/passkeys, certificate-transparency signed heads, RFC 8785 JSON canonicalization (JCS), RFC 8949 deterministic CBOR, JSON Schema, post-quantum signature suites) are illustrative and used for terminology and interoperability only; adherence is not required unless expressly claimed.

Appendices as part of the specification. Appendices A-L are submitted as part of this specification and form an integral portion of the written description. The appendices provide normative schemas and protocols, representative APIs, definitions, mapping ledgers, conformance tests, ethical-use guidance, and security considerations and optional hardening profiles. These materials are illustrative and non-limiting; the claims control.

Appendix map (illustrative; non-limiting). Appendix A (definitions), B (schemas/APIs), C (claims-to-figs mapping), D (protocols), E (transcripts/certificates), F (conformance), G (store/policy template), H (reference builds), I (deny codes), J (R2 v1.1 extensions), K (ethical-use covenant), and L (transparency report).

Equivalents & non-limiting posture. Functionally equivalent schemas, transports, cryptographic suites, log structures, and proof systems that provide comparable attestation, append-only verifiability, and freshness enforcement are within scope. Examples are illustrative; unless expressly claimed, no particular standard is required.

Policy context & NPL (illustrative; non-limiting). Evolving safety frameworks (e.g., the International Scientific Report on the Safety of Advanced AI, 2025, and state-level measures such as New York's RAISE Act) motivate auditable controls, incident reporting, and verifiable safeguards. Such non-patent literature is cited solely as background context and is not incorporated by reference and does not limit the claims.

FIELD OF THE INVENTION

Field. This disclosure relates to computer-graphics composition and safety for AR/VR/camera systems. In particular, it addresses how an operating-system compositor decides whether to render synthetic overlays and how that decision is made auditable.

Particular focus (illustrative; non-limiting). The invention concerns an OS-level compositor gate that refuses to render a synthetic overlay unless the overlay is accompanied by verifiable evidence (a "Reality Receipt," $R^2$) that satisfies defined policy predicates (e.g., freshness, anti-replay, geo/jurisdiction fences, safety budgets). When predicates are satisfied, the system injects a machine-readable label; when predicates are not satisfied, the overlay is dropped and a Structured Precondition-Failure (code) is returned. Where human likeness or voice is present, deployments MAY require consent artifacts (e.g., Right-of-Publicity Consent Tokens, RPCT). (Illustrative; non-limiting.)

Problem space (illustrative). Modern AR/VR stacks can place synthetic graphics over camera feeds or immersive scenes. Without independent verification and portable evidence, users can be misled and platforms/regulators lack a common mechanism to answer what rendered, why, and under which policy. The compositor is the last place every pixel passes just before display; gating here makes safety and audit effective.

Core mechanism (illustrative). TRC adds: (i) a receipt verifier that checks a per-overlay $R^2$ within a frame budget; (ii) a view-permit latch inside the compositor that PASS/HOLD/FAILS the overlay based on predicates; and (iii) machine-readable labels that communicate the decision to users and assistive technologies. The same predicates MAY also be applied at additional OS gatepoints (e.g., Render and at least one of Share, Upload, Record/Capture, Clipboard/Drag-Drop). (Illustrative; non-limiting.)

Reality Receipt contents (conceptual; non-limiting). An $R^2$ canonically identifies the overlay (e.g., overlay identifier, origin signature), binds it to the scene (e.g., scene digest), and carries a predicate set (e.g., geo/jurisdiction fences, safety budgets, age/school mode) together with an inclusion proof to a signed head of an append-only public log. Field sets and encodings are illustrative; implementations MAY use deterministic JSON/CBOR for stable hashing as evidence-only.

Freshness & anti-replay (conceptual; non-limiting). The verifier determines that the $R^2$'s commitment is included under a current signed head per a freshness policy and, when the head advances, that append-only evolution (consistency)

holds. Deployments MAY also check an anti-replay tuple (e.g., nonce, monotonic counter, device/profile epoch) to refuse re-use. Parameters and formats are illustrative only.

Consent & child-safety (illustrative). Where human likeness or voice appears, deployments MAY require RPCT consent or enable a school/child-safety profile that elevates prompts, caps ad frequency, or requires guardian co-sign. These are examples and do not alter claim scope.

Outputs & evidence (illustrative). On PASS the compositor injects a machine-readable label; on HOLD/FAIL it drops the overlay and returns a Structured Precondition-Failure (code). Deployments MAY emit View Receipts (what rendered), Interaction Receipts (what the user did), and a Certification Result summarizing the decision and evidence references. Evidence fields are audit-only and do not affect gate semantics.

Anti-bypass posture (illustrative). To resist common bypasses, TRC MAY: (i) bind verify-to-pixels with a per-frame token (time-of-check/time-of-use (TOCTOU) defense); (ii) enforce the latch at cast/mirror/remote egress paths; and (iii) guard display-engine overlay planes or system MMU mappings so non-conformant layers cannot bypass the compositor. These are examples; claim scope is not limited to these techniques.

Deployment forms (illustrative). TRC can be realized as an OS/browser/HUD/HMD compositor module, as an API-layer (e.g., an OpenXR API layer discovered by the loader), and/or as device firmware that aggregates run-permits across apps. A verifier may run on-device or in the cloud. Packaging is illustrative and does not limit the claims. For platform-specific illustrative builds (OpenXR/API-layer, mobile, HUD/wearables, WebXR/WebView, and cloud/edge streaming), see Appendix H; these examples are evidence-only and do not alter TRC gate semantics.

Interoperability (evidence-only; non-limiting). TRC is log- and encoding-agnostic; evidence MAY reference signed heads and proofs of inclusion/append-only evolution, deterministic encodings (e.g., JCS/CBOR) for stable hashing, content-credentials (e.g., C2PA), attestation tokens (e.g., RATS/EAT), and identity pointers (e.g., DIDs). Such references are evidentiary only and do not alter TRC gates or claim scope.

BACKGROUND

Context (illustrative; non-limiting). Modern AR/VR and camera pipelines routinely place synthetic overlays—ads, filters, navigation prompts, agent UIs—on top of sensor feeds or immersive scenes. These pixels are often generated by multiple parties (apps, SDKs, cloud services) and routed through an OS-level compositor immediately before display.

Status quo limitations (illustrative). Today, provenance, consent, and safety checks—if present—are usually performed at the app layer and with best-effort logging. Such checks are (i) not per-frame, (ii) not fail-closed at the compositor, (iii) not portable across apps and devices, and (iv) frequently non-auditable by regulators, platforms, schools, or insurers. As a result, users and investigators lack a uniform way to answer what rendered, why, and under which policy.

Risk landscape (illustrative). Documented risks include deepfakes, unsafe driver/medical overlays, and right-of-publicity violations; in school contexts, minor-likeness abuse and cyberbullying are acute. Runtime vectors include time-of-check/time-of-use (TOCTOU) swaps, cast/mirror/ remote egress paths that bypass app-local checks, and display-plane or MMU tricks that skip the compositor entirely.

Prior approaches and gaps (illustrative). App-level badges and post-hoc logs are easily spoofed and do not travel across apps. Closed, provider-specific attestations lack independent verification and freshness semantics. System "do-not-disturb" or notification filters reduce noise but do not enforce policy evidence or frame-budget decisions at the pixel path.

Design goals (illustrative; non-limiting). A practical solution should: (i) make the compositor the decision point per frame; (ii) require verifiable evidence before pixels render; (iii) be log-agnostic (work with any append-only public log that exposes inclusion and append-only evolution proofs); (iv) enforce freshness and anti-replay; (v) support consent and child-safety predicates; (vi) surface machine-readable labels (including accessibility channels); (vii) emit portable evidence (receipts and certificates) for audit; and (viii) resist common bypass paths (TOCTOU, cast/mirror egress, plane/MMU).

Compositor vantage (illustrative). The OS compositor is the last shared choke-point through which every pixel passes. Gating here allows fail-closed behavior: overlays that lack proof are dropped before they can be displayed, while verified overlays receive a consistent label that is visible and machine-readable across apps.

Evidence concept (illustrative). TRC introduces a per-overlay Reality Receipt ($R^2$) that canonically identifies the overlay (e.g., overlay identifier, origin signature), binds it to the scene (e.g., scene digest), and carries policy predicates (e.g., geo/jurisdiction fences, safety budgets, school/age mode) along with an inclusion proof to a signed head of an append-only public log. Field sets and encodings are illustrative; implementations may use deterministic JSON/CBOR for stable hashing as evidence-only artifacts.

Freshness & anti-replay (illustrative). A freshness policy validates that the referenced commitment is included under a current signed head and—when the head advances—that append-only evolution (consistency) holds. Deployments may also reject reuse via an anti-replay tuple (e.g., nonce, monotonic counter, profile epoch). Where connectivity is constrained, a Short-Receipt profile can present with an advisory watermark and AMBER label until freshness is obtained; such advisory modes do not alter gate semantics.

Anti-bypass posture (illustrative). To counter known vectors, TRC may: (i) bind verify-to-pixels with a per-frame token (TOCTOU defense); (ii) enforce the view-permit at cast/mirror/remote egress paths; (iii) guard display-engine overlay planes or system MMU mappings; and (iv) apply a timeout policy (e.g., TIME_BUDGET_EXCEEDED) to stall-based attacks. These techniques are examples; claim scope is not limited to them.

Consent & child-safety (illustrative). When human likeness or voice is present, deployments may require Right-of-Publicity Consent Tokens (RPCTs) or enable child/school profiles that elevate prompts, cap ad frequency, or require guardian co-sign; takedown and school-escalation evidence can be emitted for policy workflows. These predicates are examples and do not alter claim scope.

Labels & receipts (illustrative). On PASS, the compositor injects a machine-readable label; on HOLD/FAIL, it drops the overlay and returns a Structured Precondition-Failure (code). Deployments may emit View Receipts (what rendered), Interaction Receipts (what the user did), and a Certification Result summarizing decisions with evidence references—all audit-only, with no effect on gate semantics.

Interoperability (evidence-only; illustrative). TRC is log- and encoding-agnostic and can reference evidence such as signed heads with inclusion/append-only evolution proofs, deterministic encodings (e.g., JCS/CBOR) for stable hashing, content credentials (e.g., C2PA), attestation tokens (e.g., RATS/EAT), identity pointers (e.g., DIDs), and viewability/measurement fields familiar to ad exchanges. Such references are evidentiary only and do not alter TRC gates or claim scope.

Industrial applicability (illustrative). A compositor-level, evidence-producing gate enables platforms and app stores to apply uniform policy across apps; helps schools and parents protect minors; supports insurers and regulators with portable records; assists automotive/HUD/HMD vendors with safety cases; and gives ad/commerce ecosystems trusted signals—while remaining technology-agnostic and claims-controlled.

SUMMARY OF THE INVENTION

Overview (illustrative; non-limiting). The Trusted Reality Compositor (TRC) adds an OS-resident view-permit latch to the compositor pipeline so that every overlay draw is gated per frame. A synthetic overlay renders only if it presents verifiable evidence—a Reality Receipt ($R^2$)—that satisfies defined policy predicates; otherwise the compositor drops the overlay and returns a Structured Precondition-Failure.

On PASS, the compositor injects a machine-readable label on the render surface (and, where enabled, a machine-audible label for accessibility).

Reality Receipt ($R^2$) (conceptual; non-limiting). An $R^2$ canonically identifies the overlay (e.g., an overlay identifier and origin signature), binds it to the scene (e.g., a scene digest), and carries a predicate set (e.g., geo/jurisdiction fences, safety budgets, age/school mode). The receipt further includes an inclusion proof to a signed head of an append-only public log, enabling independent verification. Where human likeness or voice is present, deployments MAY require Right-of-Publicity Consent Tokens (RPCTs) as a predicate. For overlays produced by generative models, deployments MAY carry model/version and prompt hashes; field sets and encodings are illustrative.

Frame-budget verification (illustrative). A receipt verifier checks the $R^2$ within a frame budget and validates: (i) freshness to a current signed head under a policy (e.g., MMD-style); (ii) append-only evolution (consistency) on head advance; (iii) anti-replay (e.g., nonce, monotonic counter, profile epoch); and (iv) policy predicates (fences, budgets, age mode) and scene binding. Verification outcomes are consumed by the view-permit latch to PASS/HOLD/FAIL the overlay.

Labels and portable evidence (illustrative). On PASS, the compositor injects a machine-readable (and optionally machine-audible) label; on HOLD/FAIL, it drops the overlay and returns a Structured Precondition-Failure (code). Deployments MAY emit View Receipts (what rendered) and Interaction Receipts (what the user did), plus a Certification Result summarizing the decision and evidence references. These artifacts are audit-only and do not alter gate semantics.

Uniform gatepoints (illustrative). The same predicates MAY be applied at Render and at least one of Share, Upload, Record/Capture, or Clipboard/Drag-Drop so that downstream egress paths honor the compositor's decision. Audio and haptic overlays MAY be gated in synchrony with visual overlays, and labels MAY be exposed through OS accessibility APIs.

Device run-permit and timeout (illustrative). A device TEE/secure element MAY aggregate predicates across apps via a run-permit latch, fail-closed within the frame budget on violation, re-arm on satisfaction, and emit signed allow/deny evidence. A timeout policy (e.g., TIME_BUDGET_EX-CEEDED) MAY treat stalled verification as a precondition failure to prevent "wait-to-win" attacks.

Anti-bypass posture (illustrative). To resist common bypasses, TRC MAY: (i) bind verify-to-pixels with a per-frame token (TOCTOU defense); (ii) enforce the latch at cast/mirror/remote egress paths; and (iii) guard display-engine overlay planes or system MMU mappings so non-conformant layers cannot bypass the compositor. These techniques are illustrative and do not limit claim scope.

Advisory Short-Receipt (illustrative). In constrained connectivity, a Short-Receipt profile MAY render with an advisory watermark and AMBER label until freshness is obtained; Share/Upload remain blocked. Advisory modes are illustrative and do not alter TRC gating rules.

Profiles (illustrative; non-limiting). TRC-Core/Pro/Privacy and Kids/Critical profiles MAY parameterize policy without narrowing scope. For example, TRC-Pro MAY require quorum across multiple logs or additional attestation/ZK assurances; TRC-Privacy MAY carry a succinct zero-knowledge verdict reference (e.g., PROOF_PEND-ING/OK/FAIL) without exposing raw frames; Kids/Critical MAY elevate prompts, cap ad frequency, or require guardian co-sign.

Interoperability (evidence-only; non-limiting). TRC is log- and encoding-agnostic: evidence MAY reference signed heads with inclusion and append-only evolution proofs (CT-style, vector-commitment, accumulator), deterministic encodings (e.g., JCS/CBOR) for stable hashing, content credentials (e.g., C2PA), attestation tokens (e.g., RATS/EAT), TEE evidence (e.g., DCAP quote references), identity pointers (e.g., DIDs), and ad-measurement fields (e.g., viewable_time_ms, occlusion_pct) familiar to exchanges. Such references are audit-only and do not alter gate semantics or claim scope.

Deployment forms (illustrative). TRC can be realized as an OS/browser/HUD/HMD compositor module, as an API layer (e.g., an OpenXR API layer discovered by the loader), and/or as device firmware aggregating run-permits across apps; the verifier may run on-device or in the cloud. Packaging is illustrative and does not limit the claims.

Technical effects (illustrative). Binding verify-to-pixels removes app-level badge spoofing, enforces deterministic deny semantics across OS surfaces and cast/mirror paths, and reduces worst-case hazard exposure in driver/medical contexts-specific improvements to graphics-pipeline integrity. Portable receipts/certificates provide independent auditability across apps and ecosystems.

Follow-On Privilege/Mint-After-Verify (illustrative; non-limiting). No session enablement, egress permission (Share/Upload/Record/Capture/Clipboard), capability token, or device RUN_PERMIT (run-permit) is issued or activated unless verification satisfies (i) freshness to a current signed head and (ii) append-only evolution on head advance, with anti-replay and predicate checks; otherwise the path fails closed. Certification Results may be consumed by policy consumers (e.g., app stores, insurers, regulators) for audit and gating, but such artifacts are audit-only and do not alter the view-permit latch's gate semantics.

Status stapling (illustrative; evidence-only).

Where a responder exposes OCSP-style status for permits/tokens, admission decisions MAY accept stapled status alongside the Certification Result to reduce responder load and enable metered access. Status artifacts are evidentiary and do not alter the view-permit latch semantics. TRC-Core verifiers SHOULD accept a freshness status_staple (or batch attestation) when available; stale or missing staples MUST map to STATUS_STAPLE_STALE (HOLD/FAIL per policy). (Evidence-only; gates unchanged.)

SYSTEM ARCHITECTURE OVERVIEW

Top-level components (illustrative; non-limiting). The TRC architecture comprises: (i) a reality compositor that merges a sensor/liveness layer with synthetic overlays; (ii) a receipt verifier that validates a per-overlay Reality Receipt ($R^2$) within a frame budget; (iii) a view-permit latch inside the compositor that PASS/HOLD/FAIL for the draw and injects labels; (iv) OS gatepoints (Render and at least one of Share, Upload, Record/Capture, or Clipboard/Drag-Drop) that apply the same predicates; (v) a device run-permit aggregator (TEE/SE) that fail-closes cross-app; (vi) logging/ ETL for allow/deny evidence, View/Interaction Receipts, and EvidenceBundle; and (vii) a verifier/CRM service that emits a Certification Result consumable by app stores, insurers, or regulators. (Illustrative; claims control.)

Reference builds (illustrative; evidence-only). Representative deployments corresponding to the architecture above are cataloged in Appendix H (OpenXR/API-layer, mobile compositor, HUD/wearables, WebXR/WebView, cloud/ edge). These builds aid enablement and certification; they are illustrative and do not alter TRC gate semantics or claim scope.

Per-frame dataflow (illustrative). For each frame: (a) an app/layer submits an overlay; (b) the compositor requests/ verifies the overlay's $R^2$ (and, where applicable, RPCT) within the frame budget; (c) the view-permit latch transitions to PASS/HOLD/FAIL based on predicate outcomes; (d) on PASS, pixels are composed and a machine-readable (and, optionally, machine-audible) label is injected; on HOLD/FAIL, pixels are dropped and a Structured Precondition-Failure (code) is returned; (e) receipts and telemetry are recorded for audit. (Illustrative.)

Reality compositor (illustrative). The compositor owns the last shared choke-point of pixels. It receives layer submissions, resolves z-order and blending, and invokes the view-permit latch before scan-out. The compositor MAY expose a minimal API to deliver decision outcomes to assistive technologies and to gate audio/haptic channels in synchrony with visuals. (Illustrative.)

Overlay submission & scene binding (illustrative). An overlay submission MAY include an overlay identifier, origin signature, and a scene digest that binds the overlay to capture context (e.g., at least one of camera pose, depth/ feature map, or camera-pipeline timecode). Implementations MAY compute and cache scene digests to avoid rework across frames. (Illustrative.)

Reality Receipt ($R^2$) shape (conceptual; non-limiting). An $R^2$ canonically identifies the overlay, carries policy predicates (e.g., geographic/jurisdictional fences, safety budgets, age/school mode), and includes an inclusion proof to a signed head of an append-only public log so a relying verifier can validate freshness and append-only evolution (consistency). Field sets and encodings are illustrative; deterministic JCS/CBOR encodings MAY be used for stable hashing as evidence-only artifacts. (Illustrative.)

Receipt verifier (illustrative). The verifier checks, within a frame budget: (i) freshness to a current signed head under a configured policy (e.g., MMD-style); (ii) append-only evolution proofs when the head advances; (iii) anti-replay tuple (nonce, monotonic counter, profile epoch) to refuse re-use; (iv) policy predicates (fences, budgets, age mode); and (v) scene binding integrity. Caches MAY reduce proof/ attestation latency; timeouts MAY map to TIME_BUDGE-T_EXCEEDED. (Illustrative.)

Freshness policy & Short-Receipt (illustrative). A freshness policy MAY reference a log's maximum-merge-delay (or equivalent) and local head-age constraints. In constrained connectivity, a Short-Receipt profile MAY allow advisory presentation with a watermark and AMBER label until freshness is obtained; Share/Upload remain blocked. Advisory modes are illustrative and do not alter gate semantics. (Illustrative.)

View-permit latch state machine (illustrative). The latch implements a simple automaton: INIT→VERIFY→{PASS|HOLD|FAIL} (with REARM on new evidence). PASS composes pixels and injects labels; HOLD/FAIL drop pixels and return a Structured Precondition-Failure. Transitions MAY be triggered by proof validation, timeout, or policy change; labels MAY expose codes and references to the $R^2$. (Illustrative.)

Uniform gatepoints & egress (illustrative). The same predicates MAY be applied at Render and at least one of Share, Upload, Record/Capture, or Clipboard/Drag-Drop, so downstream egress paths cannot outpace the compositor decision. Cast/mirror/remote composition are enforced at the egress path; non-conformant overlays are masked or dropped. (Illustrative.)

Device run-permit aggregator (TEE/SE; illustrative). A device TEE or secure element MAY aggregate predicates across apps, fail-closed within the frame budget on violation, re-arm upon satisfaction, and emit signed allow/deny evidence (e.g., {label_state, receipt_id, scene_digest, fail_close_time, rearm_time, code}) for acceptance testing and audit. Optional self-tests MAY toggle states with synthetic inputs and post signed transcripts. (Illustrative.)

Labels, accessibility, and multi-modal sync (illustrative). Labels MAY include a state (e.g., PASS/HOLD/FAIL/ STALE) and a reference to the $R^2$, and MAY be exposed through OS accessibility APIs. Audio and haptic overlays MAY be gated in synchrony with visuals, and machine-audible labels MAY mirror visual outcomes. (Illustrative.)

Logging, receipts, and ETL (illustrative). On each decision the system MAY emit View Receipts (what rendered) and Interaction Receipts (what the user did), plus EvidenceBundle (e.g., scene/overlay bindings, proof refs, deny codes, timing). Optional regulator-view exports MAY redact sensitive fields while preserving verifiability. Evidence is audit-only and does not alter gate semantics. (Illustrative.)

Verifier/CRM and Certification Result (illustrative). A back-end or on-device verifier/CRM MAY ingest receipts and produce a Certification Result under a profile (e.g., TRC-Core/Pro/Privacy), including decision status, codes, and evidence references (e.g., signed head IDs, inclusion/ evolution proof refs, C2PA manifest refs, EAT/RATS tokens, DID subject). Ad-measurement fields (e.g., viewable_time_ms, occlusion_pct, ad_angle, poll_ms) MAY be included for auditors; all such fields are evidence-only. (Illustrative.)

Profiles & policy plug-ins (illustrative). Profiles MAY parameterize policy: TRC-Pro can require quorum across logs or additional attestation/ZK assurances; TRC-Privacy can carry a succinct ZK verdict reference (e.g., PROOF_PENDING/OK/FAIL) without exposing frames; Kids/Critical can elevate prompts, cap ad frequency, or require guardian co-sign. Policy plug-ins MAY supply additional predicates (e.g., caveat tokens). (Illustrative.)

Security hardening (illustrative). To resist bypasses, TRC MAY: (i) bind verify-to-pixels with a per-frame token (TOC-TOU defense); (ii) enforce the latch at cast/mirror/remote egress; (iii) guard display-engine overlay planes and system MMU to stop plane-bypass; (iv) apply a budget watchdog (e.g., TIME_BUDGET_EXCEEDED); and (v) record overlay injection, unexpected camera enable, chaperone/boundary changes, or drift patterns with appropriate deny codes for forensics. Techniques are illustrative and do not limit claim scope. (Illustrative.)

Interoperability hooks (evidence-only; illustrative). Evidence MAY reference CT-style signed heads (with inclusion and append-only evolution proofs), C2PA content credentials (hashed URIs, claim signatures, RFC-3161 timestamps/OCSP), EAT/RATS tokens (cat_nonce, ueid, manifests, measurements), DIDs (subject/doc/verification-method refs), and deterministic encodings (JCS/CBOR) for stable hashing. Such references are audit-only and do not alter gate semantics or claim scope. (Illustrative.)

Performance & telemetry (illustrative). Implementations MAY expose compositor telemetry—e.g., TW_ms (time-warp time), LCnt (layer count), LM_merges, DevicePPD/LayerRenderedPPD, layer properties—and ms budgets (p50/p99). These counters help diagnose performance while preserving gate behavior. (Illustrative.)

Privacy-by-design & consent UX (illustrative). Deployments MAY render a persistent Privacy HUD (consent_mode, data classes used, one-tap revoke), log consent_hud_events, and use School/Child-Safety profiles (guardian co-sign, minors flags, takedown packets). All values are evidence-only and do not alter gate semantics. (Illustrative.)

Deployment & packaging (illustrative). TRC can be delivered as: (i) an OS module; (ii) a browser/HUD/HMD compositor component; (iii) an OpenXR API layer discovered by the loader; and/or (iv) device firmware that aggregates run-permits across apps. The verifier MAY run on-device or in the cloud; multi-tenant policies MAY be applied per app, user, or scenario. Packaging is illustrative and does not limit the claims.

Ecosystem consumption (illustrative). App stores, insurers, regulators, and ad exchanges MAY consume Certification Results and receipts to gate distribution, coverage, conformance, or bidding; schools MAY consume school-escalation artifacts; platforms MAY integrate with moderation and safety tools. These integrations are evidence-only and do not modify gate semantics. (Illustrative.)

Policy template (illustrative; evidence-only). An app-store/enterprise policy one-pager aligned to TRC-Core conformance appears in Appendix G; it is a licensing aid and does not alter TRC gate semantics or claim scope.

Trusted Human Presence (THP) interop (illustrative; evidence-only). In live RTC contexts, Certification Results and receipts MAY carry audit-only pointers to THP artifacts (e.g., thp_pt_ref, thp_verification_result_id) to align overlay labels with call presence state; such references are evidentiary only and do not alter TRC gate semantics.

Compositor hooks & equivalents (illustrative; non-limiting).

The view-permit latch can be enforced at functionally equivalent composition boundaries that implement verify-to-pixels semantics, including at least one of: (i) layer admission or submit; (ii) scene-graph commit; (iii) present scheduling with a token-bound present fence; (iv) overlay-plane promotion in a display engine; (v) hardware composition or atomic present; (vi) egress duplication for cast/mirror/remote composition paths; and (vii) snapshot/export paths, including Record/Capture and Clipboard/Drag-Drop, provided gating occurs before scan-out or subscriber visibility. Names are illustrative and do not limit equivalents; function controls.

Non-limiting statement. The architectural overview above aids understanding of one family of implementations. It is illustrative and non-limiting; the claims define the scope.

SECURITY MODEL & THREAT RESILIENCE-OVERVIEW (ILLUSTRATIVE; NON-LIMITING)

Adversary model (overview). TRC assumes adversaries may attempt to (i) replay receipts, (ii) swap or modify surfaces after verification (TOCTOU), (iii) inject overlays via cast/mirror/remote paths, (iv) stall verifiers to exceed the frame budget, or (v) falsify time/clock sources.

Core mitigations (overview). TRC's compositor-resident view-permit latch: (a) binds verify-to-pixels with a per-frame token (TOCTOU defense), (b) validates surface attributes (handle, z-order, CRC) before scan-out, (c) enforces the latch at egress for cast/mirror/remote paths, (d) applies a budget watchdog (e.g., TIME_BUDGET_EXCEEDED), and (e) uses trusted monotonic-time sources and counters.

TOCTOU binding (overview). A per-frame token associates verification outcome with the exact pixels to be displayed; any layer/mode change that would display pixels not covered by the token forces HOLD/FAIL.

Liveness (optional). Deployments MAY incorporate sensor-liveness checks to reduce pre-recorded injection. Liveness is evidentiary and does not alter gate semantics.

Telemetry integrity. Evidence records and self-test transcripts MAY be signed and anchored to support independent verification and chain-of-custody.

Cognitive-risk deny codes (illustrative). Profiles MAY emit PHOTOSENSITIVE_RISK or HAPTIC_OVERLOAD when refresh-rate flicker or forced haptic amplitudes exceed thresholds; events are HOLD/FAIL within the frame budget.

Human-Joystick & drift cues (illustrative). Slow, monotonic scene-relative translation or sinusoidal drift above policy thresholds MAY trigger HOLD/FAIL with CHAPERONE_TAMPER or DRIFT_DETECTED deny codes; View/Interaction Receipts MAY include {delta_pose, drift_rate} for forensics.

Overlay & camera integrity (illustrative). Overlays originating outside the compositor's trusted path or persisting without a foreground owner SHOULD be dropped (OVERLAY_INJECTED). Unexpected camera enablement or buffer access during gated sessions SHOULD force HOLD (CAMERA_UNEXPECTED); evidence MAY include {cam_enable_source, cam_ts} as audit-only data.

Boundary/config protection (illustrative). Changes to safety-critical boundary/artifact files (e.g., room/chaperone bounds) SHOULD force HOLD(BOUNDARY_TOUCHED); changes are surfaced in EvidenceBundle for audit.

Child-safety (illustrative). If a classifier flags a plausible minor likeness or suspected "nudify" synthesis, profiles MAY set MINOR_LIKENESS_SUSPECTED and HOLD pending RPCT/guardian review; in School Mode, CYBER-BULLYING/CSAM_SUSPECTED MAY produce a school_escalation_ref transcript for policy workflows. Evidence is audit-only.

Takedown/compliance timers (illustrative). EvidenceBundle MAY record a removal_deadline_ts to assist platforms with statutory notice-and-removal windows; timings are evidentiary only.

RATS/EAT freshness options (overview). Deployments MAY use (i) nonce-based freshness, (ii) timestamp freshness (iat), or (iii) epoch-ID freshness with an epoch window; PROOF_PENDING MAY be treated as HOLD. TRC artifacts align with RATS roles (Attester→Verifier→Relying Party) as evidence-only.

Zero-Trust alignment (overview). TRC maps to ZTA concepts: policy engine/administrator correspond to PDP/PE/PA; the compositor-resident latch acts as the PEP. Policies are enforced per request within a frame budget (no implicit trust zones), with continuous re-evaluation (HOLD/FAIL on posture change).

Non-limiting statement. The overview above is for clarity and does not limit the invention; the claims set forth the scope.

BRIEF DESCRIPTION OF THE DRAWINGS

Drawing conventions (illustrative). Unless noted, solid arrows indicate control/pixel and decision flow, and dashed arrows indicate evidence-only references (e.g., receipts, proofs, certifications). Figures are illustrative and not to scale.

Figure 1:
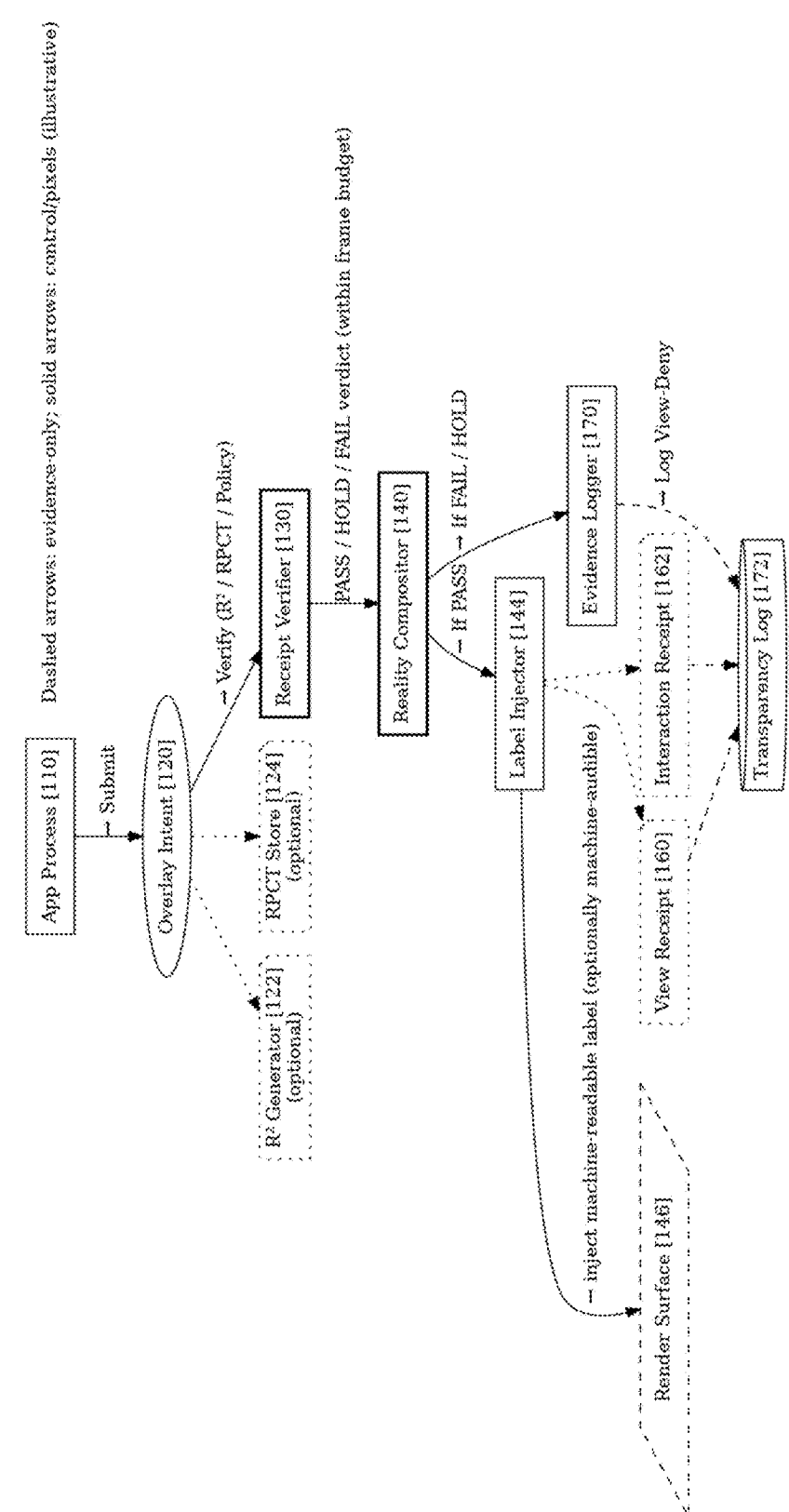
FIG. 1—TRC pipeline (block overview).

Device 100 receives camera/sensor input 101; a scene-digest unit 102 derives a scene digest. App/overlay process 110 submits overlay intent 120 (optionally with an R2 from 122) and references an RPCT store 124. Receipt verifier 130 (with STH cache 131, ETL client 132, and policy engine 134) issues a per-frame verdict to reality compositor 140. View-permit latch 142 either enables label injector 144 to draw on render surface 146 or drops the overlay; evidence logger 170 records allow/deny and emits receipts 160/162 committed to transparency log 172.

Figure 2:
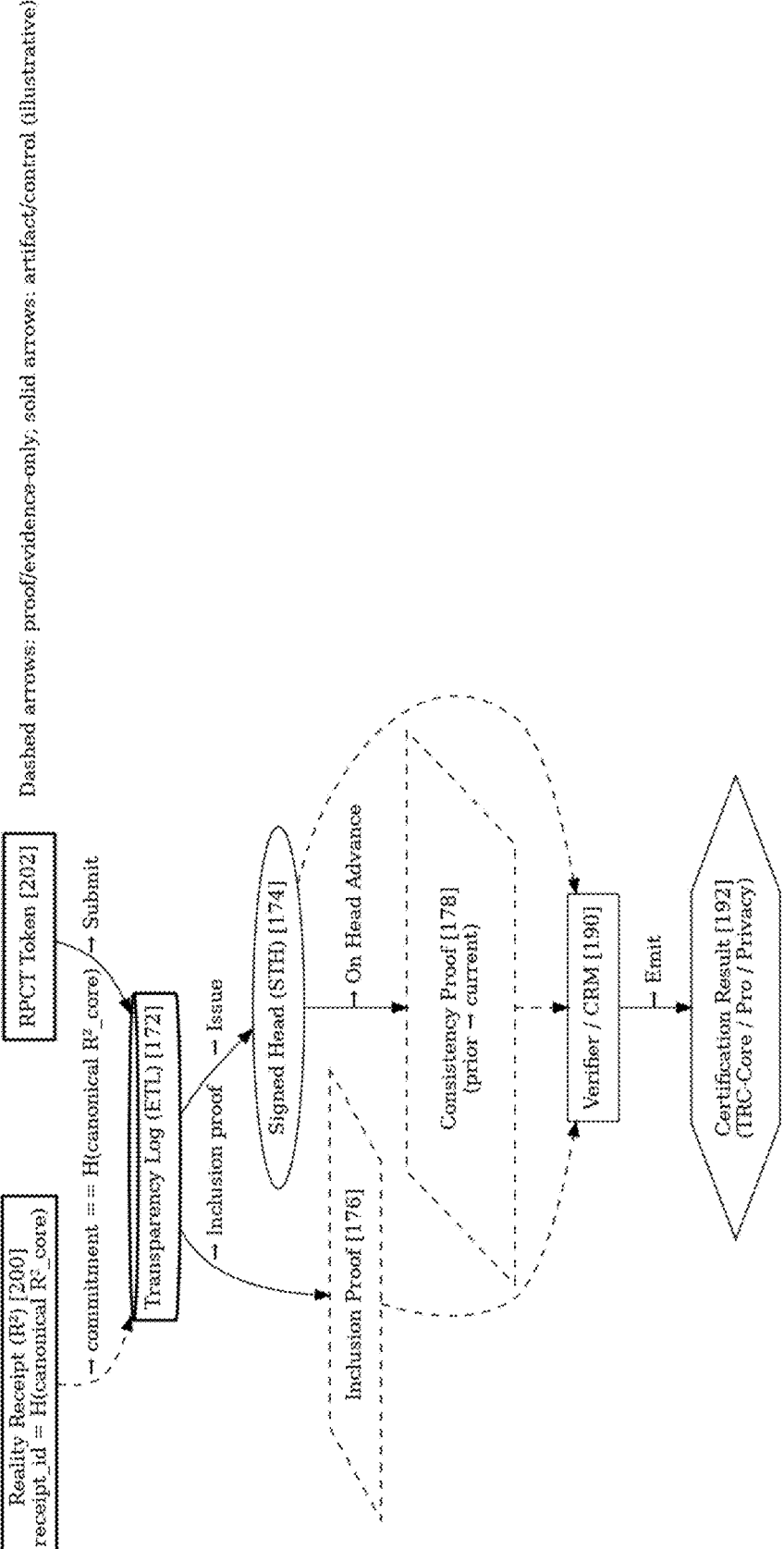

FIG. 2—Receipt artifacts and proofs (data-flow).

A Reality Receipt (R2) 200 and Right-of-Publicity Consent Token (RPCT) 202 are canonical receipt cores. Log 172 issues a signed head 174; inclusion proof 176 binds an R2 to the head; when the head advances, an append-only evolution (consistency) proof 178 links prior to current. Verifier/CRM 190 emits a Certification Result 192 (TRC-Core/Pro/Privacy).

Figure 3:
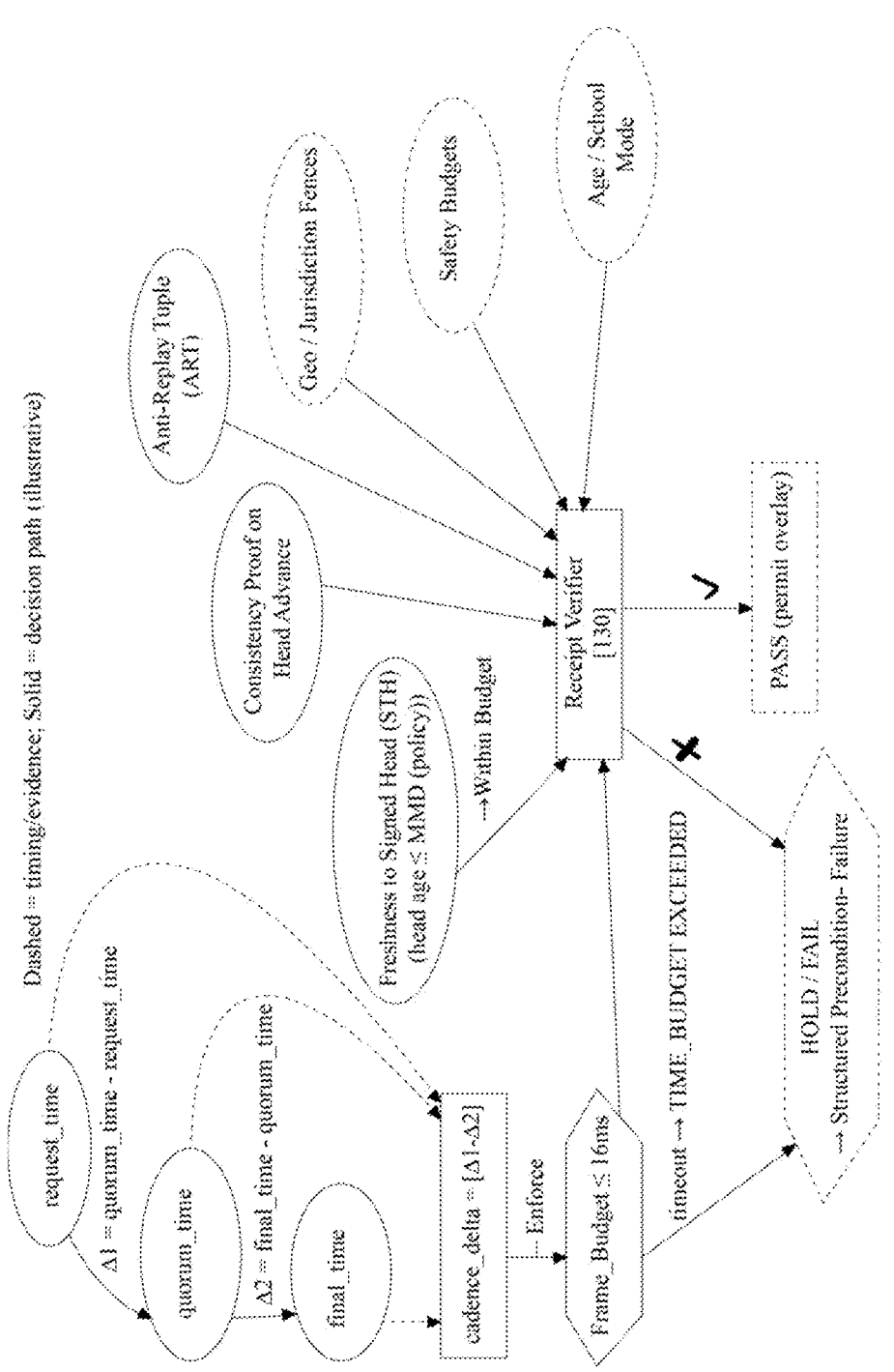

FIG. 3—Per-frame timing & predicates.

A timeline shows request_time→quorum_time→final_time and cadence_delta within a frame budget (e.g., ≤16 ms). The anti-replay tuple (ART) is evaluated alongside freshness to 174 and consistency 178; on violation, the compositor returns a Structured Precondition-Failure.

Figure 4:
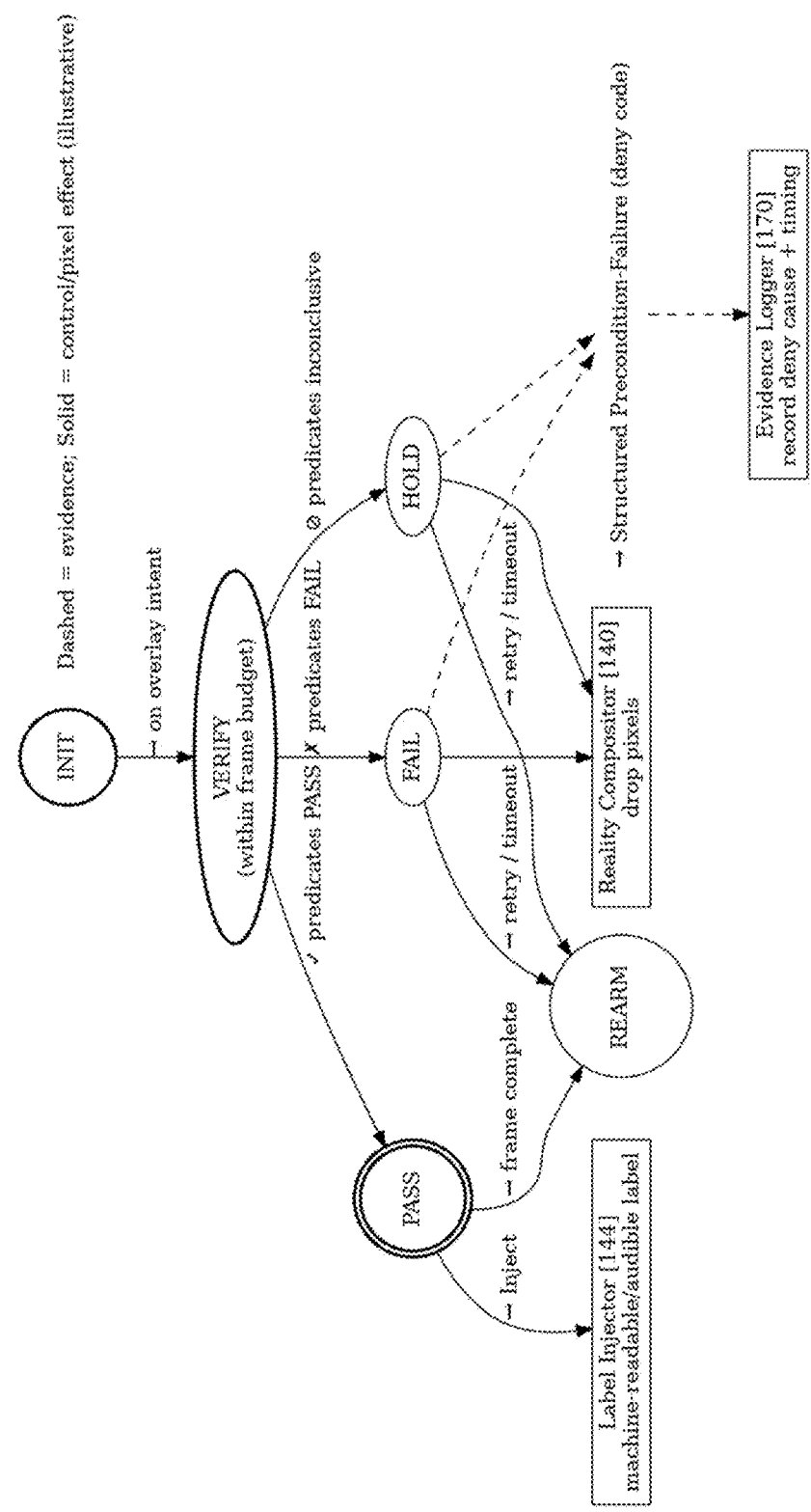

FIG. 4—View-permit latch state machine.

States: INIT→VERIFY→{PASS|HOLD|FAIL}→REARM. Transitions are driven by predicates from 130 (freshness, consistency, ART, fences, safety budgets, RPCT) within the frame budget. On PASS, 144 writes a machine-readable/-audible label; on HOLD/FAIL, 140 drops pixels and the path returns a Structured Precondition-Failure; 170 records deny code and timing.

Figure 5:
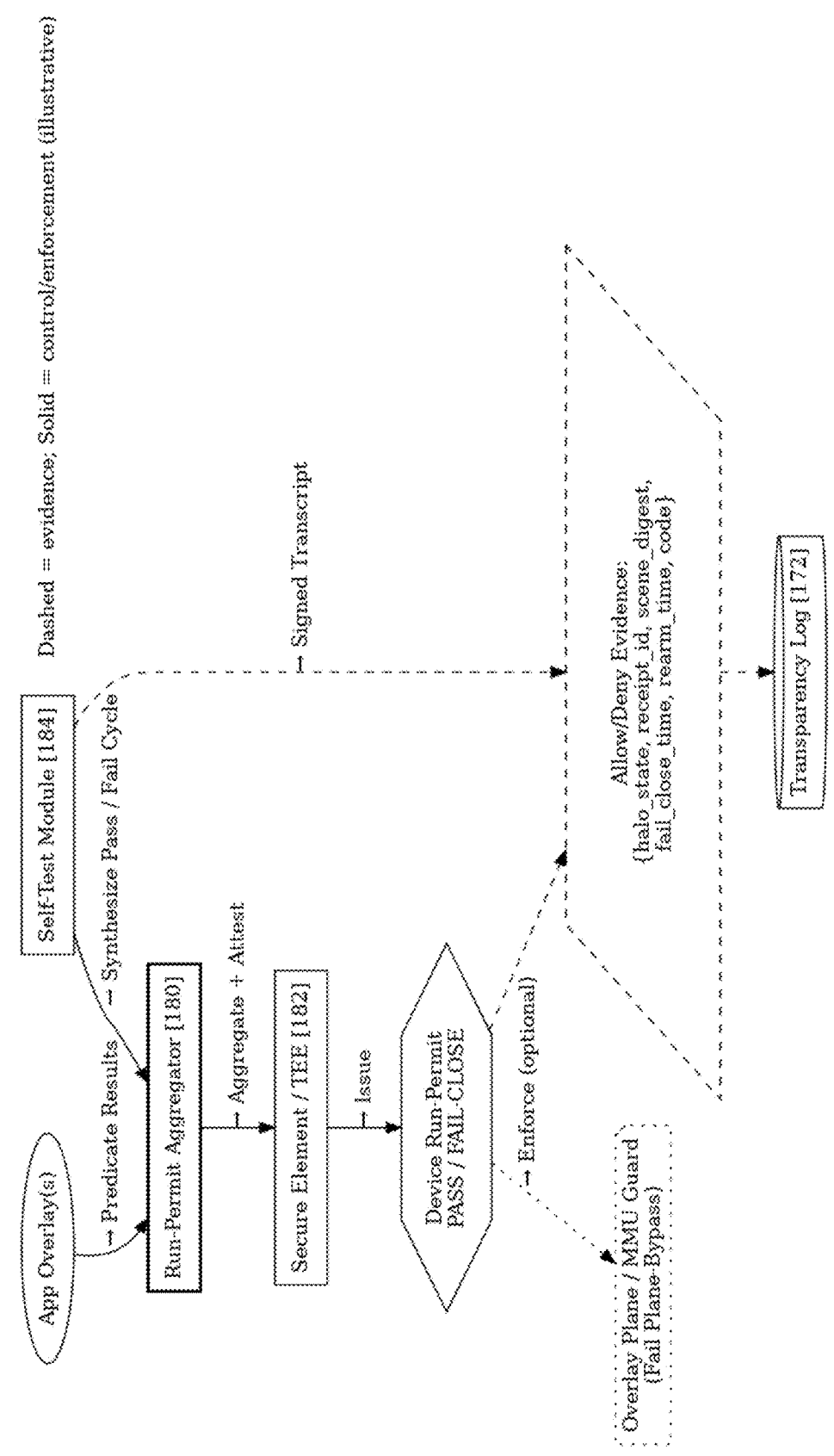

FIG. 5—Device run-permit aggregator (TEE/SE).

Multiple app predicate vectors converge at run-permit aggregator 180 inside secure element/TEE 182; a device run-permit gates the compositor path. Self-test module 184 synthesizes deny/allow cycles and posts a signed transcript to 172.

Figure 6:
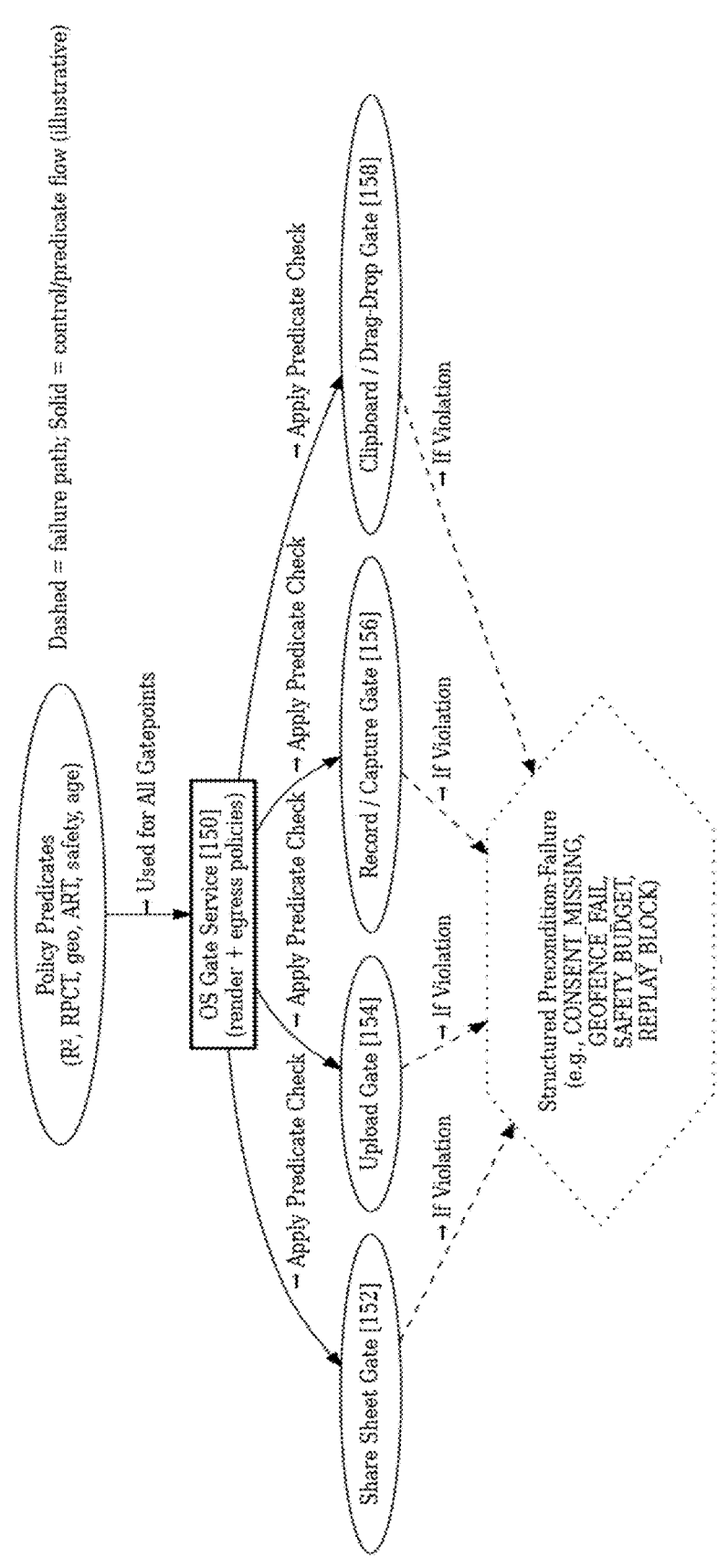

FIG. 6—Uniform OS gatepoints (egress).

OS gate service 150 fronts the compositor for Render, Share 152, Upload 154, Record/Capture 156, and Clipboard/Drag-Drop 158. Each gate calls 130; on violation, a Structured Precondition-Failure (code) is returned. Cast/mirror/remote egress paths enforce the same decision.

Figure 7:
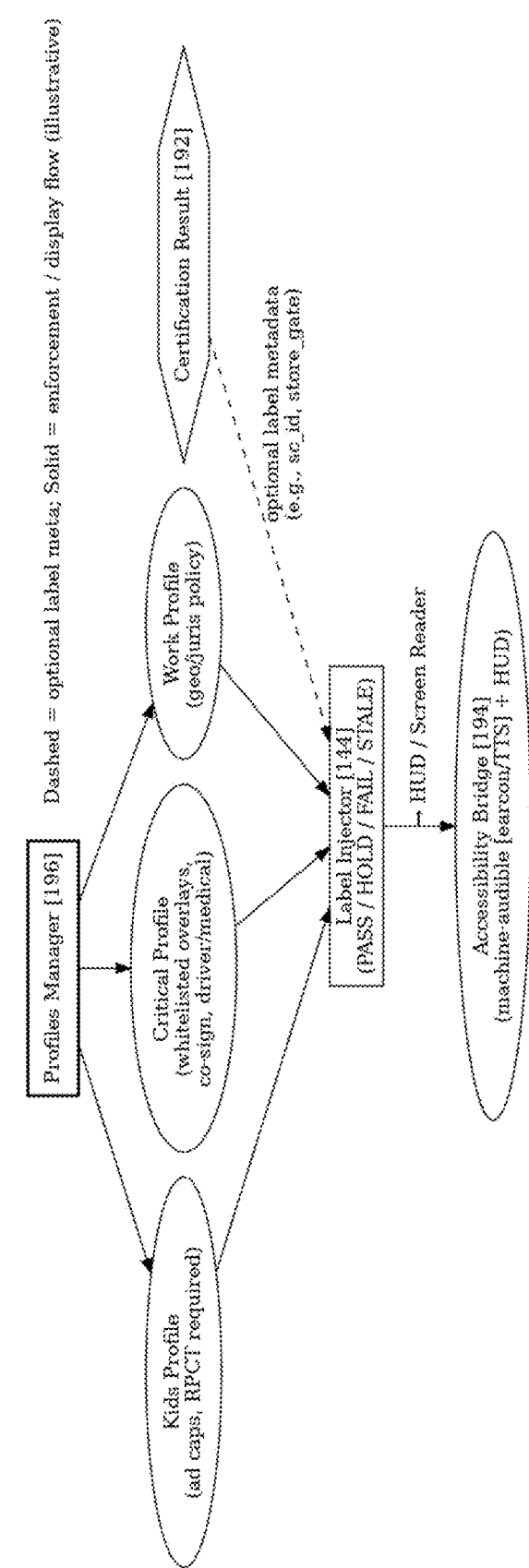

FIG. 7—Profiles & labeling (Kids/Critical/Work).

Profiles manager 196 selects policy packs (fences/budgets). Label injector 144 applies PASS/HOLD/FAIL/STALE and exposes state through accessibility bridge 194 for assistive technologies; 192 may annotate the label.

Figure 8:
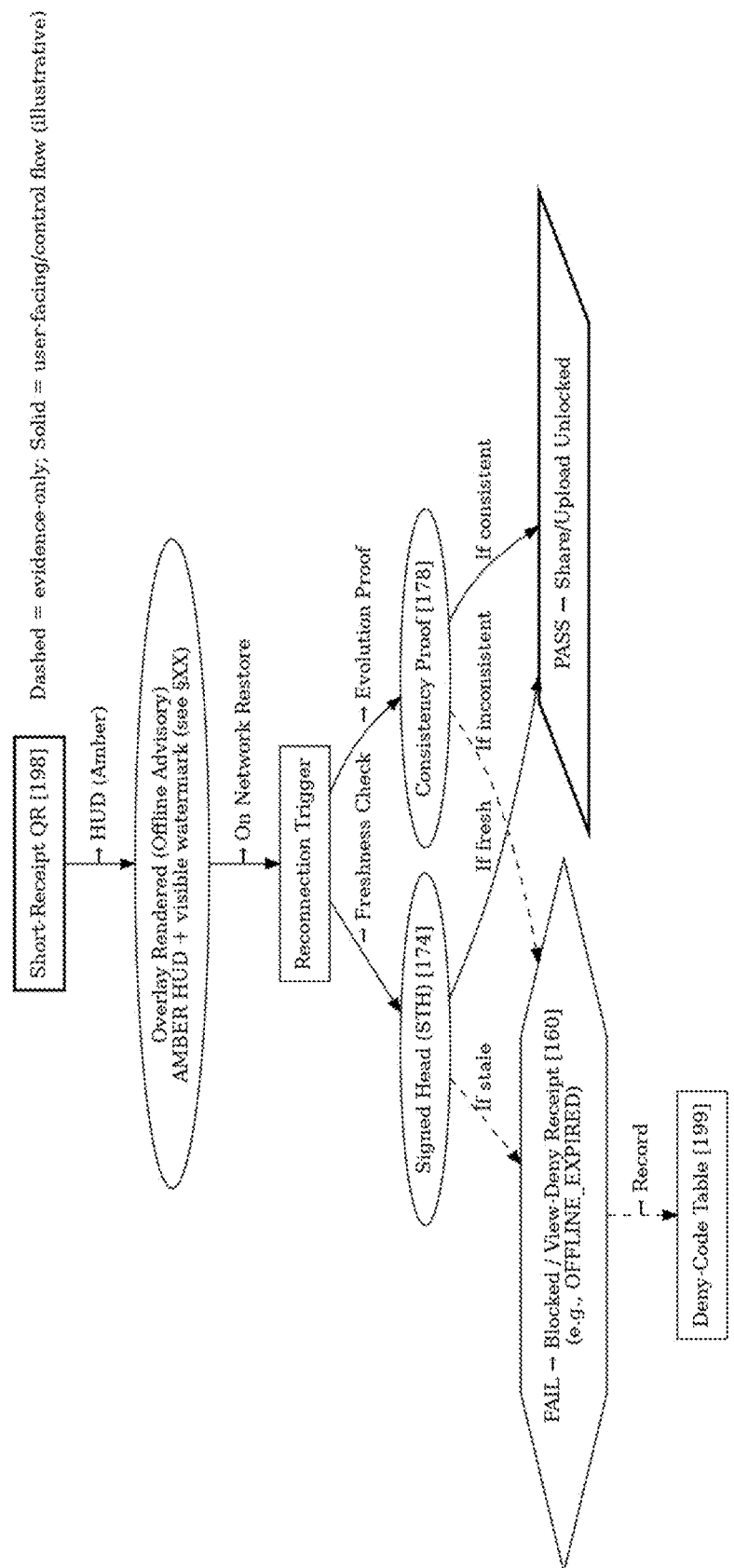

FIG. 8—Short-Receipt (offline/advisory).

Short-receipt QR 198 allows deferred verification when offline. Upon reconnection, head freshness 174 and evolution 178 are enforced; stale or non-conformant receipts yield deny codes table 199 and a View-Deny Receipt 160; otherwise PASS enables share/upload gates.

Figure 9:
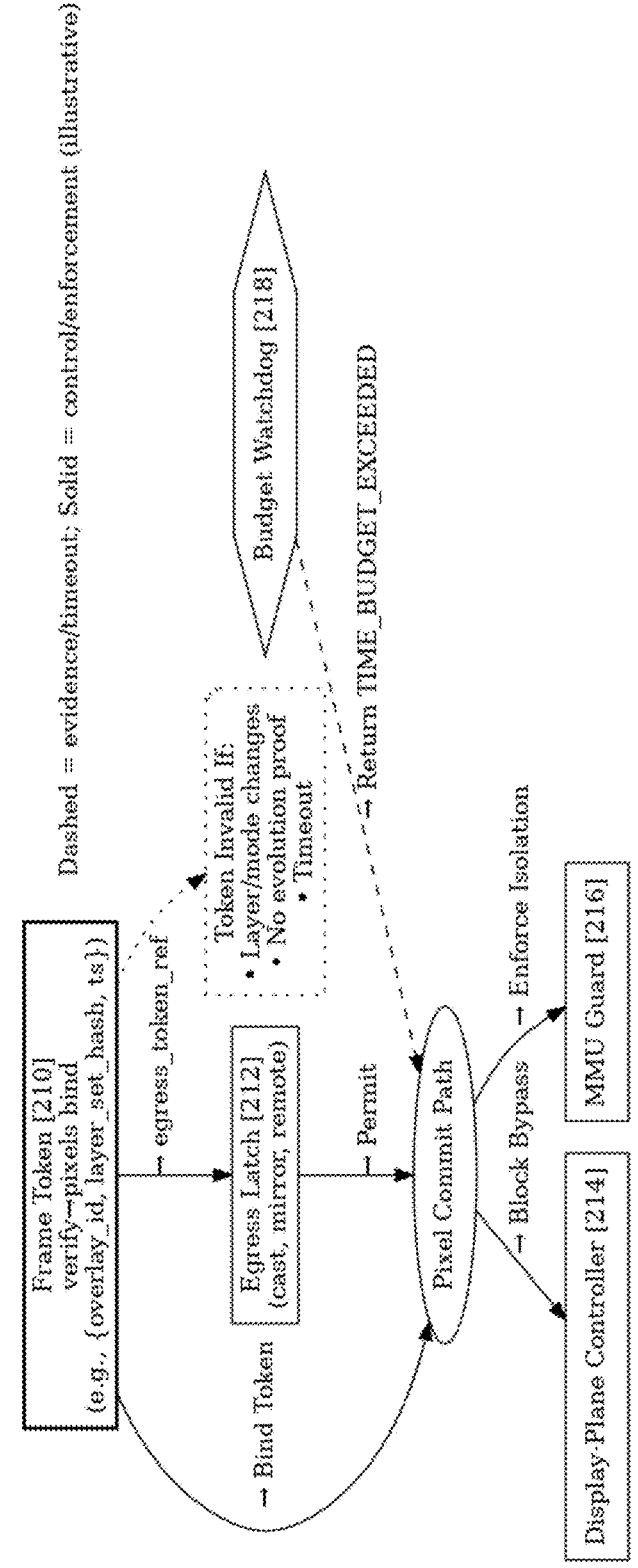

FIG. 9—Anti-bypass defenses (matrix).

(1) TOCTOU bind: per-frame token 210 ties verify-to-pixels; (2) cast/mirror egress latch 212 masks or drops overlays without a fresh token; (3) display-plane controller 214 and MMU guard 216 block plane-bypass; (4) budget watchdog 218 returns TIME_BUDGET_EXCEEDED on stalled verification.

Figure 10:
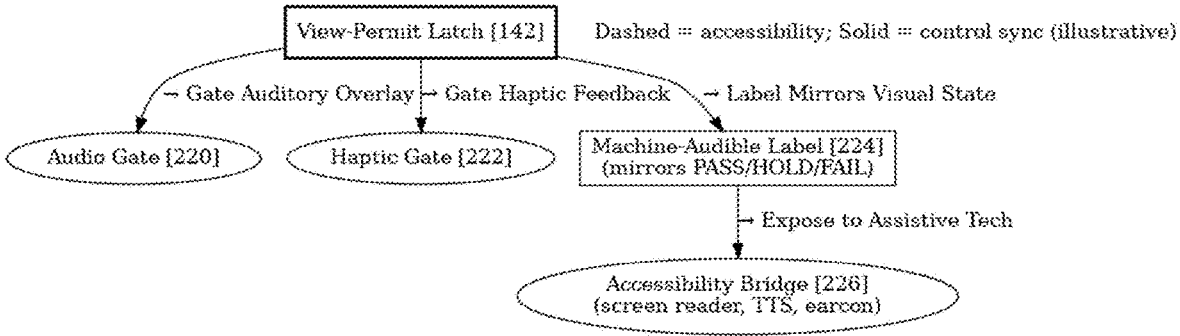

FIG. 10—Multimodal gating & accessibility.

Audio gate 220 and haptic gate 222 track the view-permit latch 142 so auditory/haptic overlays are gated in synchrony with visuals; machine-audible label 224 mirrors visual state and is exposed via the accessibility bridge 194/226.

Figure 11:
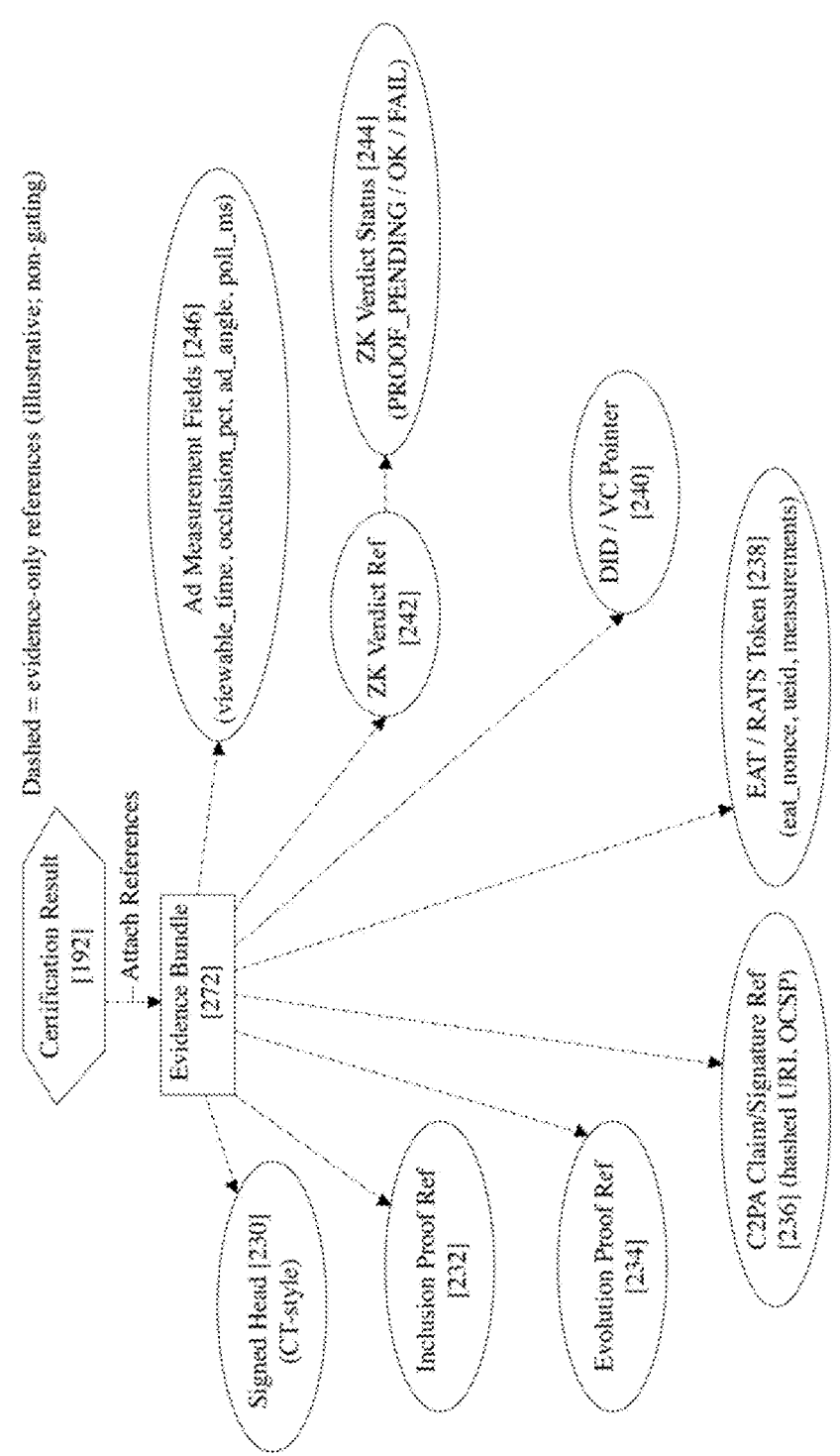

FIG. 11—Evidence & certification (interoperability).

Certification Result 192 and EvidenceBundle 272 may carry: signed-head refs 230 (e.g., CT STH) with inclusion 232 and evolution 234 proof refs; C2PA manifest refs 236 (hashed URIs/claim signature); attestation tokens 238 (EAT/RATS); identity pointers 240 (DIDs); ZK proof ref 242 with status 244; ad-measurement fields 246 (viewable_time_ms, occlusion_pct, ad_angle, poll_ms). All are evidence-only.

Figure 12:
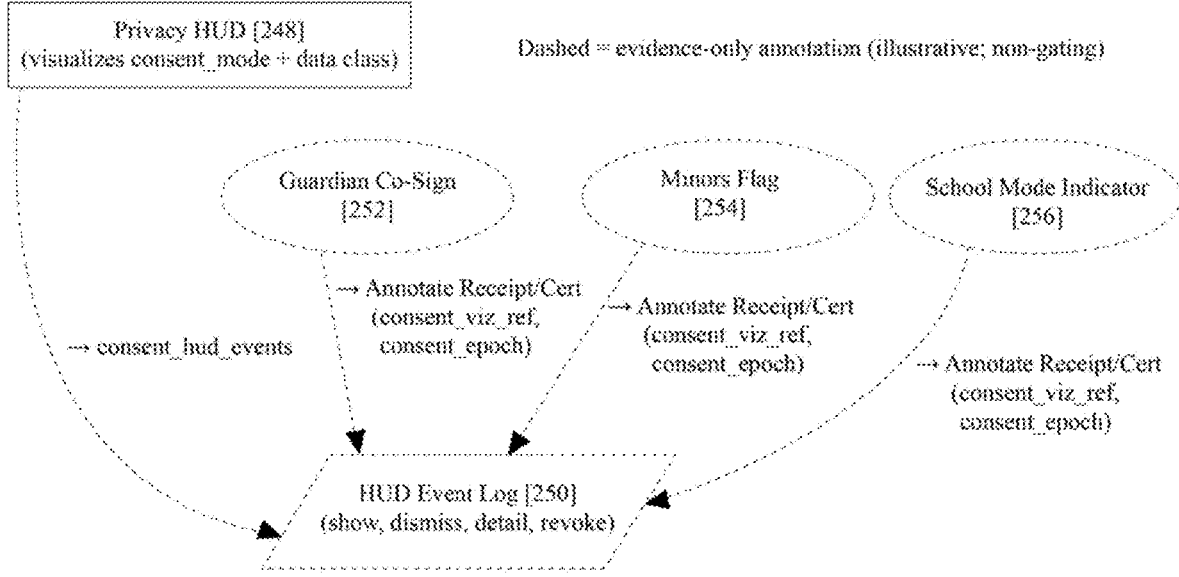

FIG. 12—Privacy HUD & consent (RPCT/guardian co-sign).

Privacy HUD 248 shows consent_mode/data classes and a one-tap revoke; consent_hud_events 250 are logged. Guardian co-sign 252 may be required under school/child-safety profiles; minors flag 254 and School Mode 256 annotate receipts/certs as audit-only.

Figure 13:
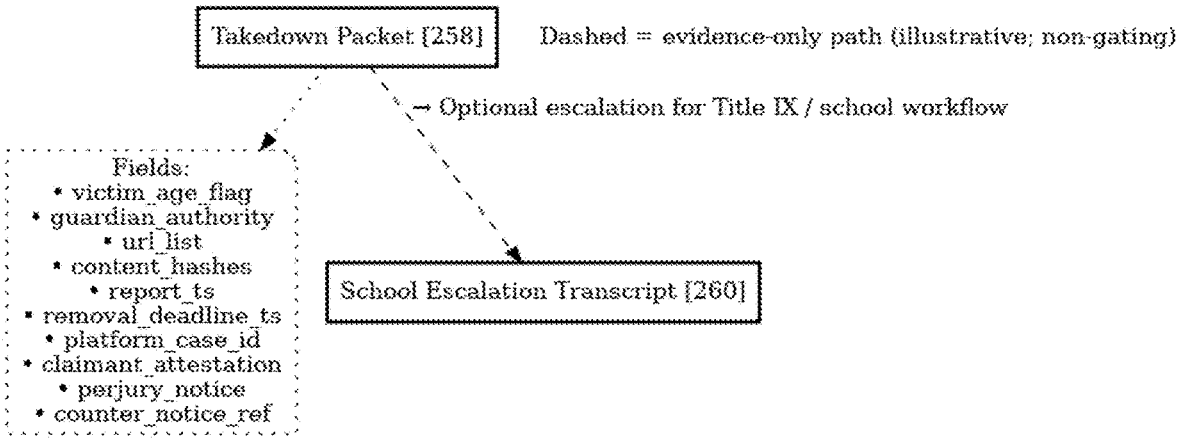

FIG. 13—Takedown & school escalation (policy workflows).

A takedown packet 258 (victim_age_flag, guardian_authority, url_list, content_hashes, report_ts, removal_deadline_ts, platform_case_id) flows to platform policy; school escalation transcript 260 feeds Title IX/school workflows. These artifacts are evidence-only.

Figure 14:
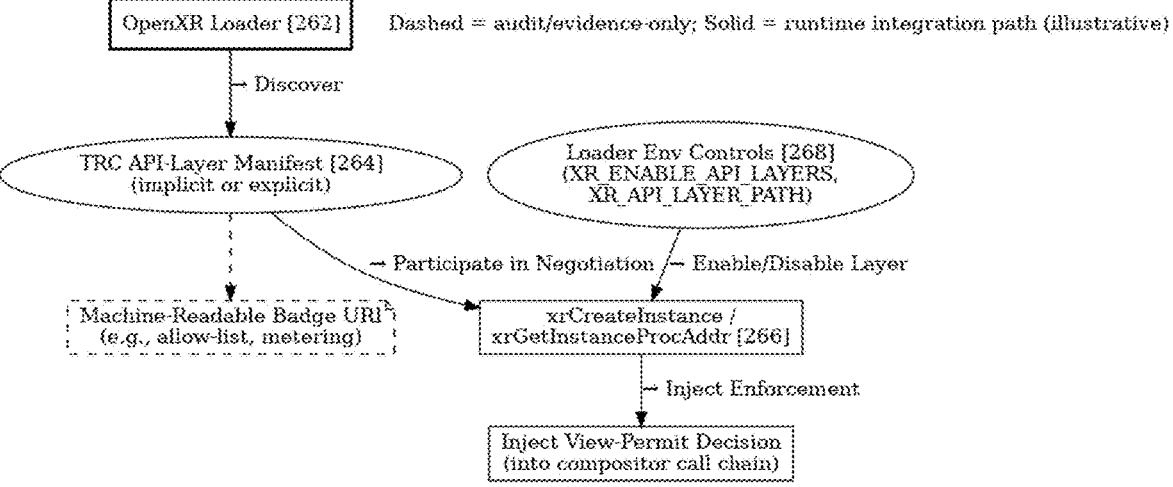

FIG. 14—OpenXR/API-layer deployment.

OpenXR loader 262 discovers a TRC API-layer manifest 264; the layer participates in xrCreateInstance/xrGetInstanceProcAddr (266), honors environment controls 268, and injects the view-permit decision into the compositor call chain. Packaging is illustrative.

REFERENCE NUMERALS (TRC)

Core & Pipeline
  100 device (phone/HMD/auto-HUD)
  101 camera/sensor input
  102 scene-digest unit (pose/depth/feature/timecode)
  110 app/overlay process
  120 overlay intent (render request)
  122 R2 generator (overlay's ReceiptCore emitter, optional)
  124 RPCT store (right-of-publicity tokens)
  130 receipt verifier (per-frame)
  131 signed-head cache (fresh head)

132 ETL/log client (inclusion/evolution API)

134 policy engine (fences, budgets, profiles)

140 reality compositor (OS compositor)

142 view-permit latch (compositor gate)

144 label injector (HUD badge/overlay)

146 render surface (display/canvas)

Gatepoints & Egress

150 OS gate service (Render/Share/Upload/Record/Clipboard)

152 share-sheet gate 154 upload gate 156 record/capture gate 158 clipboard/drag-drop gate Receipts & Logging 160 view receipt (render event)

162 interaction receipt (tap/buy/route)

170 evidence logger (allow/deny transcript)

172 transparency log (append-only)

174 signed head (log head)

176 inclusion proof 178 append-only evolution (consistency) proof 192 certification result (TRC-Core/Pro/Privacy)

272 EvidenceBundle (audit-only)

Profiles & Accessibility 194 accessibility bridge (label exposure)

196 profiles manager (Kids/Critical/Work)

199 deny-code table

Device & Security 180 run-permit aggregator (device-wide)

182 secure element/TEE (SE/TEE)

184 self-test module (deny/allow timing)

Anti-Bypass & Timing 210 frame token (verify-to-pixels bind)

212 egress latch (cast/mirror/remote)

214 display-plane controller

216 MMU guard 218 budget watchdog/TIME_BUDGET_EXCEEDED

Multimodal & Accessibility 220 audio gate 222 haptic gate 224 machine-audible label 226 accessibility API bridge Interop (Evidence-Only)

230 CT signed-head reference 232 inclusion-proof reference 234 evolution-proof reference 236 C2PA manifest/claim-sig reference 238 attestation token (EAT/RATS)

240 DID reference (subject/doc/verification-method)

242 ZK proof reference

244 ZK proof status (PROOF_PENDING/OK/FAIL)

246 ad-measurement fields (viewable_time_ms, occlusion_pct, ad_angle, poll_ms)

248 Privacy HUD 250 consent_hud_event 252 guardian co-sign reference 254 minors flag 256 School Mode indicator 258 takedown packet (evidence-only)

260 school escalation transcript

262 OpenXR loader

264 API-layer manifest/discovery

266 API-layer intercept points (xrCreateInstance/xrGetInstanceProcAddr)

268 environment controls (enable/disable flags)

198 short-receipt QR (offline/advisory)

DETAILED DESCRIPTION OF THE
INVENTION

Preamble; non-limiting terms. Headings are for convenience; the claims control. "MUST/SHOULD/MAY" denote interoperability guidance and are illustrative, non-limiting. Unless stated otherwise: text is UTF-8; JSON MAY use RFC 8785 (JCS) canonicalization; CBOR MAY use deterministic encoding per RFC 8949; timestamps use RFC 3339 UTC ("Z"); Base-N payloads follow RFC 4648 canonical rules (prefer base64url in URIs; reject non-alphabet characters; canonical padding). Evidence encodings are audit-only and do not alter gate semantics.

Definitions (Illustrative)

(a) Reality Compositor—OS graphics subsystem that merges sensor/liveness layers with synthetic overlays just before display.

(b) Reality Receipt (R2)—per-overlay, per-frame receipt that canonically identifies the overlay (e.g., overlay identifier, origin signature), binds the overlay to the scene (e.g., scene digest), carries policy predicates (e.g., geo/jurisdiction fences, safety budgets, age/school mode), and includes an inclusion proof to a signed head of an append-only public log such that independent parties can validate freshness and append-only evolution (consistency). Clarification: $R^2$ is runtime-oriented (scene-binding; in-frame verification) and distinct from PoPC's compute-time Minimal ReceiptCore; interoperation is illustrative and non-limiting. "R2" (pronounced "R-two") may appear as the typographic glyph "$R^2$" in text or figures; both denote the same construct. R2 is used in identifiers and hashing contexts (e.g., R2_core).

(c) RPCT—Right-of-Publicity Consent Token (consent/expiry/jurisdiction for face/voice/likeness).

(d) Scene Digest-hash over at least one of camera pose, depth/feature map, or camera-pipeline timecode that binds overlay to capture context.

(e) Anti-Replay Tuple (ART)—e.g., H (prefix|nonce|monotonic-counter|device_profile|policy_epoch|scene_digest) with domain-separated prefix.

(f) Profiles—verifier profiles (TRC-Core/Pro/Privacy) and device modes (Kids/Critical/Work) that parameterize policy without narrowing claims.

(g) View/Interaction Receipts—records of what rendered and what the user did (e.g., tap/buy/route), with audit/settlement hooks.

(h) Machine-Readable Deny—OS/firmware deny with a machine-readable code and optional detail fields; protocol mapping (e.g., HTTP 412) is illustrative only.

Cross-rail receipt vocabulary (illustrative; evidence-only). R2 (TRC runtime receipt) is distinct from URC (UPL Use Receipt Core, verify-then-write) and S2 (TSIL Sensor Receipt, verify-then-admit sensor events). For generative overlays, a Model-Load Receipt (AML-Gate) MAY evidence loader compliance. Artifacts MAY interoperate: an R2 MAY reference {s2_ref, model_load_receipt_ref, use_receipt_ref} for end-to-end chain-of-custody; such references are evidentiary only and do not alter TRC gates. When both rails are deployed, a policy MAY require that overlays labeled PASS reference S2 receipts from the current capture window (e.g., ≤Δt) as audit-only chain-of-custody; such references do not alter TRC gate predicates.

Referring to FIG. 1 (pipeline overview; 100-146, 160/ 162/170/172). For each frame an app 110 submits an overlay intent 120 (optionally with an R2 from 122) referencing an RPCT store 124. The compositor 140 invokes a receipt verifier 130 to evaluate the R2 within a frame budget against policy predicates (freshness, consistency on head change, ART, scene fences, safety budgets; RPCT where people appear; age/school mode). If predicates fail, the compositor drops the overlay and logs a View-Deny Receipt via 170; if they pass, the compositor injects a label via 144 on render surface 146 and MAY emit View/Interaction Receipts (160/ 162) with evidence committed to transparency log 172. Where TSIL is present, the compositor MAY include an S2→R$^2$ reference in View/Interaction Receipts as evidence-only chain-of-custody; gating semantics remain compositor-bound. Illustrative; non-limiting. Dashed arrows in FIG. 1 indicate evidence-only references; solid arrows indicate control/pixel and decision flow.

Referring to FIG. 2 (receipt artifacts & proofs; 172/174/ 176/178, 190/192, 200/202). A Reality Receipt 200 and an RPCT 202 are canonical receipt types. An append-only public log 172 issues a signed head (e.g., a CT Signed Tree Head (STH)) 174; an inclusion proof 176 binds an R2 to the head; when the head advances, an append-only evolution (consistency) proof 178 links prior to current. The verifier/ CRM 190 MAY emit a Certification Result 192 (e.g., TRC-Core/Pro/Privacy) summarizing status, codes, and evidence references (see Appendix E1). Evidence is audit-only and does not alter TRC gate semantics. Inclusion and evolution may be provided with the receipt or retrieved by the verifier; both are supported.

R2 identity & commitment (illustrative; evidence-only). Implementations MAY compute a receipt_id=H(canonical (R2_core)) using JCS/CBOR canonicalization and base64url encoding, where H(•) denotes a cryptographic hash (e.g., SHA-256). Where a log commitment is present, commitment equals H(canonical (R2_core)). The receipt_id is audit-only and does not alter TRC gate semantics.

Local catenate chaining (illustrative; evidence-only). Implementations MAY link successive receipts via prev_receipt_id=H(canonical (R2_core_prev)); links are audit-only and do not replace anchoring to a signed head. For avoidance of doubt, prev_receipt_id and other evidence-only fields (e.g., log, zk, ad_measurement, meter, ext) are not part of R2_core used to compute receipt_id/commitment.

Offline roll-up (illustrative; non-limiting). In constrained connectivity, a local accumulator MAY roll up authenticated R2 commitments and later anchor a batch to a signed head; subsequent verification accepts any continuity-preserving roll-up yielding valid inclusion under the freshness window. Transport is equivalent if signed-head freshness and append-only evolution are preserved.

Schema note (illustrative; evidence-only). Canonical skeletons for R2/RPCT/View/Interaction Receipts appear in Appendix B, with R2 schema extensions in Appendix J; these artifacts are evidentiary only and do not alter TRC gate semantics.

Referring to FIG. 3 (per-frame timing & predicates). A timeline depicts request_time→quorum_time→final_time, with cadence_delta remaining within a frame budget (values illustrative, e.g., ≤16 ms at 60 FPS). The verifier checks freshness to a current signed head, consistency on head advance, and the Anti-Replay Tuple (ART); predicate sets MAY also include geographic/jurisdictional fences, safety budgets, and age/school mode. Violations return a Structured Precondition-Failure (code).

Cadence & timeout (illustrative). The verifier enforces cadence_delta within the frame budget; if verification exceeds the budget, the path returns a Structured Precondition-Failure (code) with TIME_BUDGET_EXCEEDED. Under timeout, the latch MAY present an advisory AMBER state while egress remains blocked until proofs are obtained; mapping is illustrative and does not alter gate semantics.

Head handling & cache (illustrative). The verifier MAY keep a local signed-head cache and perform maximum-merge-delay (MMD)-bounded prefetch; evolution proofs are required only when the head advances. Implementations MAY record ms_fail_close and ms_rearm to demonstrate within budget operation; values are evidentiary.

Frame budget & VRR (illustrative; non-limiting). Implementations may derive a frame budget from the active refresh interval (e.g., 60/90/120 Hz) or variable-refresh-rate timing. Verification SHOULD complete within an implementation-defined slice of that budget using a local signed-head cache and warm-path proof prefetch. Exceeding the budget maps to TIME_BUDGET_EXCEEDED and the overlay is dropped for that frame (fail-closed). Numeric values are illustrative and non-limiting.

Protocol note (illustrative; evidence-only). A canonical verifier protocol & pseudocode (freshness, inclusion/append-only evolution, anti-replay, deny mapping) is provided in Appendix D for search efficiency; it is illustrative and does not alter gate semantics.

Referring to FIG. 4 (view-permit latch state machine; 142/144/170). The latch implements INIT→VERIFY→{PASS|HOLD|FAIL}→REARM. On PASS, pixels are composed and 144 injects a machine-readable (and optionally machine-audible) label; on HOLD/ FAIL, pixels are dropped and 170 logs deny cause/timing. Transitions are driven by outcomes from 130 (freshness, consistency, ART, fences, safety budgets, RPCT). Illustrative; non-limiting.

Referring to FIG. 5 (device run-permit; 180/182/184). A run-permit aggregator 180 in a secure element/TEE 182 MAY fail-close within the frame budget on violation, re-arm on satisfaction, and emit signed allow/deny evidence (e.g., {label_state, receipt_id, scene_digest, fail_close_time, rearm_time, code}) to the transparency log 172. A self-test module 184 MAY synthesize cycles and post a signed Self-Test Transcript (SELFTEST/1.0) for acceptance tests. Hardware realizations (e.g., display-engine overlay-plane controller and/or MMU guard) MAY deny plane-bypass attempts within the frame budget. Aggregator 180 MAY deduplicate verification across apps for the current head/ policy epoch, enforcing fail-closed results and emitting signed evidence.

First-boot acceptance (illustrative). Shipments MAY require an on-device self-test at first boot, producing a signed transcript {first_boot: true, ms_fail_close, ms_rearm, batch_id, device_serial_hash}. First-boot runs MAY record {first_boot: true, batch_id, device_serial_hash} in the Self-Test Transcript (Appendix E2) for acceptance/audit. For TRC-Core OEM acceptance, devices MUST produce a signed Self-Test Transcript at first boot. (Evidence-only; no predicate change.)

Referring to FIG. 6 (uniform OS gatepoints; 150/152/154/ 156/158). The same predicates MAY be applied at Render and at least one of Share 152, Upload 154, Record/Capture 156, or Clipboard/Drag-Drop 158 so egress paths honor the compositor decision. Non-conformant attempts SHOULD return a Structured Precondition-Failure (code) (e.g., CON- SENT_MISSING, GEOFENCE_FAIL, SAFETY_BUD-GET, REPLAY_BLOCK). See Appendix I for normative deny-code meanings (illustrative; gate semantics remain compositor-controlled).

Referring to FIG. 7 (profiles & labeling; 196/194/144/192). A profiles manager 196 selects Kids/Critical/Work packs (fences/budgets). Label injector 144 applies PASS/HOLD/FAIL/STALE and exposes label state via an accessibility bridge 194; 192 MAY annotate label context. Kids/Critical MAY elevate prompts, cap ad frequency, enforce whitelists (e.g., driver/medical contexts), or require guardian co-sign-without narrowing claim scope. Deny/allow timing metrics (e.g., ms_fail_close, ms_rearm) MAY be published to a public compliance board or school/OEM monitor (evidence-only; non-dispositive).

Certification Results 192 MAY annotate the label context (e.g., sc_id or store_gate) for policy consumers; such fields are evidence-only and do not alter gate semantics.

Referring to FIG. 8 (Short-Receipt/offline advisory; 198/174/178/199/160). A Short-Receipt QR 198 enables deferred verification offline. Upon reconnection, the system enforces freshness to 174 and evolution 178; stale/non-conformant receipts yield deny codes recorded in table 199 and a View-Deny Receipt 160. Advisory modes are illustrative and do not alter gate semantics; Share/Upload remain blocked until PASS. Watermarking an AMBER advisory render and OFFLINE_EXPIRED policy mapping are illustrative; see Appendix I.

Referring to FIG. 9 (anti-bypass; 210/212/214/216/218). (1) TOCTOU bind-a per-frame token 210 ties verify-to-pixels; (2) egress latch 212 enforces decisions on cast/mirror/remote paths; (3) display-plane controller 214 and MMU guard 216 block plane-bypass; (4) budget watchdog 218 returns TIME_BUDGET_EXCEEDED on stalled verification. Techniques are illustrative and do not limit claim scope.

TOCTOU frame-token design (illustrative; evidence-only). The compositor issues a per-frame token that binds verify-to-pixels by committing to {overlay_id, layer_set_hash, scene_digest, presentation_mode∈{local, cast, mirror, remote}, ts}. Tokens are valid only for the issuing frame (token_ttl_ms≈frame interval) and invalidate on {layer change, mode change, head advance without evolution proof, timeout}. Egress paths receive {frame-token_id, egress_token_ref}; a missing/mismatched token forces HOLD/FAIL. Receipts MAY include frame_token_id and layer_set_hash for audit. Interaction Receipts MAY echo the frame_token_id for actions occurring within the token TTL (evidence-only). Tokens are evidence-only and do not alter gate semantics.

Fast-path reuse (illustrative). When layer_set_hash and presentation_mode remain unchanged for a frame, prior verification MAY be reused using a lightweight token; if either changes, the latch enters HOLD/FAIL and re-verifies.

Egress transport binding (illustrative; evidence-only). Egress paths (cast/mirror/remote/headset audio) MAY bind an exporter value to the frame-token context; a missing/mismatched exporter MUST map to ENV_ATTEST_FAIL or FRAME_TOKEN_MISMATCH per policy. Receipts MAY record {transport_exporter} as evidence-only. Illustrative platform attestation. Channel binding MAY accept platform-attestation evidence (e.g., Android Verified Boot/VBMeta digest and rollback-index posture; Apple Secure Enclave OS-bound key or LocalPolicy/SSV posture) as evidence-only inputs to the binding decision; presence/absence is evidentiary and does not alter TRC gate semantics. For TRC-Core, exporter/platform binding is SHOULD; for TRC-Pro, it is MUST. A missing or mismatched exporter MUST map to ENV_ATTEST_FAIL or FRAME_TOKEN_MISMATCH. (Evidence-only binding inputs; gates remain compositor/egress-controlled).

Referring to FIG. 10 (multimodal & accessibility; 220/222/224/226). Audio gate 220 and haptic gate 222 track the view-permit latch 142 so auditory/haptic overlays are gated in synchrony with visuals; a machine-audible label 224 mirrors visual state and is exposed through an accessibility bridge 226.

Referring to FIG. 11 (evidence & certification interop; 192/272, 230/232/234/236/238/240/242/244/246). A Certification Result 192 and EvidenceBundle 272 MAY carry audit-only references: CT signed-head 230 with inclusion 232 and evolution 234 proof refs; C2PA manifest/claim-sig refs 236 (hashed URIs; timestamps/OCSP); EAT/RATS tokens 238 (e.g., eat_nonce, ueid, manifests, measurements); DID pointers 240; ZK verdict ref 242 with status 244 (PROOF_PENDING/OK/FAIL); and ad-measurement fields 246 (viewable_time_ms, occlusion_pct, ad_angle, poll_ms). These references are evidence-only and do not alter gate semantics.

Batch verification (illustrative). A verifier API MAY validate multiple receipts in one call and return a single signed attestation with per-item proof attribution to reduce network and signature costs; values are evidentiary only. TRC-Core verifiers SHOULD accept a freshness status_staple (or batch attestation) when available; stale or missing staples MUST map to STATUS_STAPLE_STALE (HOLD/FAIL per policy). (Evidence-only; gates unchanged.)

Cross-rail references (illustrative). An EvidenceBundle MAY carry {s2_ref, model_load_receipt_ref, use_receipt_ref, isl_settlement_receipt_ref} to link sensor admission (TSIL), model-load admission (AML-Gate), verify-then-write (UPL), and settlement (ISL); these references are evidence-only and do not alter TRC gate semantics.

CT bridge (evidentiary). Where available, certification MAY attach {set_ref, sth_id, inclusion_proof_ref, evolution_proof_ref} obtained via CT-style client calls (e.g., retrieve latest signed head; inclusion+evolution proofs) or the transparency_info TLS extension. Freshness policies MAY reference a log's maximum-merge-delay (MMD) and STH cadence; values are evidentiary only. Certification MAY include a head-age signal (e.g., sth_age_ms) for policy checks against MMD; values are evidentiary only.

History-tree proofs (evidentiary). Implementations MAY attach or reference history-tree membership and incremental proofs using O(log n) pruned trees, and Merkle aggregation proofs for attribute-filtered queries or safe-deletion attestations; all are evidence-only.

Proof equivalence (illustrative; evidence-only). Implementations MAY use functionally equivalent append-only verification proofs (e.g., accumulator or vector-commitment witnesses) provided they substantiate inclusion and append-only evolution (consistency) under a signed head. These references are evidence-only and do not alter TRC gate semantics.

Referring to FIG. 12 (Privacy HUD & consent; 248/250/252/254/256). A persistent Privacy HUD 248 MAY visualize consent_mode and data classes in use and log consent_hud_events 250 (show/dismiss/detail/revoke). Under school/child-safety profiles, a guardian co-sign 252, minors flag 254, or a School Mode indicator 256 may annotate receipts/certs. These are audit-only and do not affect gates.

Consent evidence (illustrative; evidence-only). Certification Results 192 MAY carry audit-only consent fields {consent_mode, consent_epoch, consent_viz_ref, consent_log_ref, erasable_link_ref}; these are evidentiary and do not alter TRC gates (see Appendix E1). For clarity, consent_epoch uses RFC 3339 UTC ("Z").

Referring to FIG. 13 (takedown & school escalation; 258/260). A takedown packet 258 MAY include {victim_age_flag, guardian_authority, url_list, content_hashes, report_ts, removal_deadline_ts, platform_case_id, claimant_attestation} to support statutory notice-and-removal windows; a school escalation transcript 260 MAY be emitted for Title IX/school workflows. These artifacts are evidence-only. School escalations MAY receive a signed receipt bundle with expiry timers (evidence-only) to support statutory deadlines.

Due-process signals (illustrative; evidence-only). Takedown packets MAY carry perjury_notice and counter_notice_ref fields; such signals are evidentiary and do not alter TRC gating (see Appendix E1/Appendix G).

Referring to FIG. 14 (OpenXR/API-layer; 262/264/266/268). An OpenXR loader 262 discovers a TRC API-layer manifest 264 (implicit/explicit); the layer participates in xrCreateInstance/xrGetInstanceProcAddr negotiation 266, honors environment controls 268 (e.g., XR_ENABLE_API_LAYERS, XR_API_LAYER_PATH), and injects the view-permit decision into the compositor call chain. Packaging is illustrative and does not limit claim scope. A machine-readable badge URI enables automated allow-lists and metering by policy consumers; badges are audit-only and do not alter gate semantics.

Layer enable/disable (illustrative). The API layer MAY be enabled or disabled by store policy or enterprise CI using loader environment controls without modifying applications; this is evidence-only and does not alter gate semantics.

Transports & encodings (illustrative). HTTP/gRPC/SSE/MQTT transports are equivalent if R2 semantics and canonicalization are preserved. Merkle/accumulator/vector-commitment proofs and alternative trust roots are functionally equivalent when they yield signed heads with inclusion and append-only evolution proofs. Deterministic JCS/CBOR and RFC 4648 base-N hygiene MAY be used to stabilize evidence hashing. All are evidence-only and do not alter gate semantics. Unknown fields and codes MUST be preserved in receipts ("forward-compatible").

Scope. The description above is illustrative and non-limiting. Variations will be apparent to persons of ordinary skill in the art. The claims define the scope of the invention.

TECHNICAL EFFECTS AND COMPUTER SECURITY IMPROVEMENTS

Specific improvements to computer functionality (illustrative; non-limiting). TRC enforces receipt-verified, per-frame gating at the OS compositor, so that an overlay cannot be shown unless its Reality Receipt (R2) validates under a fresh signed head with append-only evolution (consistency) and anti-replay satisfied. This relocates verification from app-level "badges" and post-hoc logs to the last shared pixel choke-point, producing bounded-latency, fail-closed decisions that are uniform across apps. These effects—deterministic deny semantics, verified freshness, replay resistance, and cross-app standard labels—are not reliably achievable with application-level mechanisms alone.

Binding verify-to-pixels (illustrative). By binding the verification outcome to a per-frame token and having the compositor enforce the view-permit latch before scan-out, TRC removes an entire class of app-level badge spoofing and eliminates window-race/TOCTOU paths. Worst-case hazard exposure in driver/medical contexts is reduced, and deny behavior becomes consistent and deterministic across surfaces and cast/mirror pipelines.

Portable, independently verifiable evidence (illustrative). PoPC-compatible signed-head inclusion/evolution proofs and structured receipts/certificates give platforms, auditors, and regulators a machine-verifiable trail (who/what/where/when/why) with stable canonical encodings (JCS/CBOR) and base-N hygiene for hashing/signing. Because evidence is audit-only, TRC's gate semantics remain unchanged while inspection, incident response, and forensics are accelerated.

Uniform OS gatepoints and multi-modal integrity (illustrative). Applying the same predicates at Render and at least one of Share, Upload, Record/Capture, or Clipboard/Drag-Drop ensures that downstream egress cannot outpace the compositor decision. Audio/haptic gates track the visual latch so overlays are gated in synchrony, and machine-audible labels make outcomes available to accessibility tools.

Anti-bypass posture (illustrative). TRC simultaneously covers: (i) TOCTOU (verify-to-pixels frame token), (ii) cast/mirror/remote egress latches, (iii) display-plane/MMU hardware guards, and (iv) a budget watchdog (e.g., TIME_BUDGET_EXCEEDED) to prevent "wait-to-win." Each mitigation is illustrative, and none narrows the claims.

Policy consumers (illustrative; non-limiting). Certification Results are machine-consumable by app stores, insurers, and regulators to gate distribution, monetization, coverage, or conformance. Because TRC decisions occur at the compositor and return Structured Precondition-Failures with codes, platforms can automate policy enforcement-not possible with app-level badges or ad-hoc logs.

Eligibility statement (illustrative; non-limiting). The disclosed techniques improve the operation of computer-graphics subsystems by relocating verification to the compositor's render/scan-out path, binding verification state to the exact pixels via a per-frame token, and enforcing uniform deny semantics across compositor surfaces and egress paths. These are pipeline-level control paths and hardware guards, not mental steps or mere data labeling; they reduce worst-case hazard exposure and prevent application-level bypass.

EXEMPLARY IMPLEMENTATIONS (REFERENCE BUILDS)

Mobile AR (illustrative). A lightweight shim injects an OS PASS label on verified renders; the Share gate returns HTTP 412 (Precondition Failed) with code CONSENT_MISSING or GEOFENCE_FAIL. View/Interaction Receipts carry scene digests and proof references for settlement/audit.

HMD/VR (illustrative). A compositor plug-in enables Critical policy for surgical training; only whitelisted overlays render under strict safety budgets and scene fences. Labels propagate through accessibility APIs; HOLD/FAIL deny unsafe or unproven overlays in-frame.

Automotive HUD (illustrative). A driver speed fence and lane-only guidance dictate overlay budgets; ad overlays fail closed. Cast/mirror paths enforce the latch at egress; TIME_BUDGET_EXCEEDED protects against stalled verification.

Retail/Work (illustrative). Staff RPCT is required for face-bound price tags; POS flows emit Interaction Receipts and Certification Results so affiliate splits settle on verified evidence; ad exchanges may price PASS/HOLD/FAIL differently.

The above builds are illustrative reference patterns; implementations vary by OS, device, and policy profile.

INDUSTRIAL APPLICABILITY (PCT RULE 5)

Applicability (illustrative; non-limiting). TRC applies to smartphones, tablets, head-mounted displays, automotive HUDs, AR TVs/projectors, kiosks/billboards, and any OS with a compositor that merges sensor feeds and synthetic layers.

Adtech & affiliate (illustrative). Interaction Receipts enable attribution and fraud reduction for AR commerce/ ads; exchanges MAY price PASS/HOLD/FAIL differently. Certification/EvidenceBundle MAY expose viewability fields aligned with IAB/MRC AR guidelines—e.g., viewable_time_ms, occlusion_pct, ad_angle, poll_ms (default 200 ms), idle_policy, min_size_pct—as audit-only data. (TRC gate semantics unchanged.)

HUD/focus modes (illustrative). In vehicles or high-hazard contexts, a Critical profile MAY enforce "focus mode" (reduced notifications; whitelisted overlays only) while deny/label semantics remain governed by the frame-budget gate.

Safe-zone orientation (illustrative). Deployments MAY attach hazard orientation artifacts—e.g., color-coded hazard overlays (splash zones, overhead path), safe-view zones, stepwise prompts—as audit-only training evidence; these do not alter TRC gating.

TOCTOU audit (illustrative). View/Interaction Receipts MAY include {frame_token_id, layer_set_hash} so platforms can corroborate verify-to-pixels binding in incident reviews; fields are evidence-only.

Minor-safety interop (illustrative). Given state-level prohibitions on sexual deepfakes of minors, deployments MAY expose machine-readable fields (minor_flag, rpct_status, k-12_context) and a KIDS_POLICY deny semantics to help schools/platforms meet policy/Title IX obligations—without altering TRC gates.

Takedown packets & due-process signals (illustrative). Certification/Evidence MAY include a platform-consumable takedown packet ({victim_age_flag, guardian_authority, url_list, content_hashes, report_ts, removal_deadline_ts, platform_case_id}) and DMCA-style safeguards ({claimant_attestation, authority_type, perjury_notice, counter_notice_ref}) as evidence-only fields. TRC gate semantics are unchanged.

Privacy/DPIA interop (illustrative). Deployments MAY export transparency artifacts ({consent_mode, consent_epoch, personalization_categories, inference_summary_ref}) to assist with privacy impact assessments; outputs are audit-only and do not alter TRC gating.

EU AI Act alignment (illustrative). Deployments MAY export audit-only bundles aligned with record-keeping & transparency (Arts. 12-15), human oversight/robustness/cybersecurity (Art. 15), and post-market monitoring/serious-incident reporting (Arts. 61-62). TRC receipts/certs provide evidentiary hooks; nothing herein imposes legal standards nor changes TRC gates.

RAISE alignment (illustrative; non-limiting). Deployments MAY expose safety_plan_ref and incident_report_ref for compliance programs; these artifacts are evidentiary only and do not alter TRC gating.

Ethical posture (illustrative). See Appendix K for illustrative public-interest and humanitarian licensing posture; these measures are business-level and do not alter TRC gates or claims.

Regulator Safe Mode (illustrative; evidence-only). A regulator-issued token MAY force HOLD for specified overlay classes during an incident window; {safe_mode_token_ref} is audit-only and does not alter gate semantics.

BEST MODE IMPLEMENTATIONS AND PARAMETER RANGES

Performance envelopes (illustrative; non-limiting). Typical targets include: frame budget $\leq 16$ ms (60 FPS) or $\leq 11$ ms (90 FPS HMD); device fail-close within the frame budget; re-arm $\leq 100$ ms after PASS. These figures are illustrative, not required.

Freshness & proofs (illustrative). A freshness policy MAY reference a log's maximum-merge-delay (MMD) and head cadence; inclusion and append-only evolution proofs MAY be cached, pre-fetched, or verified via CT-style clients or equivalent APIs. Optional quorum (e.g., k=2 of m=3 logs) MAY be used in TRC-Pro profiles. Numbers are illustrative, not required.

Operator diversity (TRC-Pro; illustrative). A k-of-m quorum MAY require independent network paths and at least two distinct operators (e.g., cloud A+OEM B); evidence-only. Illustratively, quorum logs are operator-diverse (e.g., distinct clouds or trust roots); evidence-only.

Scene digest & anti-replay (illustrative). A scene digest MAY include at least one of camera pose, depth/feature map, or camera-pipeline timecode. The ART MAY include (nonce, monotonic counter, device_profile, policy_epoch, scene_digest) with a domain-separated prefix. Formats are illustrative and do not alter TRC gate semantics.

Labeling & accessibility (illustrative). Label palettes (color/shape/icon), PASS/HOLD/FAIL/STALE semantics, and accessibility exposure are illustrative; machine-audible labels MAY mirror visual outcomes for assistive technologies. Choices are evidence-only and do not alter gates.

Packaging (illustrative). TRC MAY be delivered as an OS module, browser/HUD/HMD compositor component, OpenXR API layer, and/or device firmware with a cloud/on-device verifier. Packaging choices do not limit the claims.

COMPUTER PROGRAM PRODUCT (CRM)

Computer program product (illustrative; non-limiting). A non-transitory computer-readable medium stores instructions that, when executed by one or more processors, cause the system to: (i) verify a Reality Receipt (R2) (and, where applicable, an RPCT) per frame; (ii) compute scene digests and anti-replay tuples (ART); (iii) enforce the view-permit latch and inject machine-readable/-audible labels; (iv) apply the same predicates at Render and at least one of Share, Upload, Record/Capture, or Clipboard/Drag-Drop; (v) emit View/Interaction Receipts and EvidenceBundle; (vi) perform self-tests and post signed transcripts; and (vii) synchronize signed-head anchors, proof references, and certification transcripts. (Illustrative; claims control.)

SDK/API surface & versioning (illustrative; non-limiting). A reference SDK MAY expose stable methods—e.g., verify(receipt), issueToken(scope), settle(tx), revoke(id), label(state, ref)—with semantic version negotiation (e.g., X-TRC-API-Version) and graceful downgrades. API design is illustrative and does not alter gate semantics.

Receipts & Evidence Hooks (Illustrative; Non-Limiting)

Forensics hooks. Implementations MAY include, in View/ Interaction Receipts and EvidenceBundle, optional fields such as: session_state (e.g., OpenXR-style READY/VIS- IBLE/FOCUSED/STOPPING), thread_id_class (input vs. render), layer_bindings (surface handle, z-order, CRC), caller_identity (signed app-call provenance), and boundary_version (room/chaperone file hash). These are evidentiary only and do not alter TRC gating.

Consent HUD events. EvidenceBundle MAY carry consent_hud_events [{ts, action E {show, dismiss, detail_view, revoke}}, hud_version] and privacy_notice_refs. Values are audit-only and do not affect gates.

Layer Telemetry (Illustrative; Non-Limiting)

Compositor metrics. EvidenceBundle MAY include compositor-layer telemetry—e.g., TW_ms (timewarp time), LCnt (layer count), LM_merges (merged layers), DevicePPD/LayerRenderedPPD, texture_res, recommended_res—and layer IDs from system logs/visualizers (e.g., visualizeLayers). Values are evidentiary only and do not alter the frame budget or gating rules.

OS-level logs. Implementations MAY attach pointers to per-layer properties (type/size/visibility) and compositor counters; data is audit-only and does not affect decisions.

Content Credentials (C2PA) Interop (illustrative; non-limiting)

Manifest references. EvidenceBundle MAY reference a co-resident or external C2PA Manifest Store using hashed URIs (e.g., self #jumbf) or hashed-ext-URIs (HTTP/S) with the manifest's declared hash algorithm. References are evidence-only.

Claim/time-stamp/OCSP. Certification Results MAY embed: (i) a link to the C2PA Claim (COSE-signed), (ii) an RFC 3161 time-stamp token captured at signing, and (iii) OCSP status stapled for the signer chain. TRC does not depend on any specific C2PA profile; fields are audit-only.

TEE attestation evidence. EvidenceBundle MAY carry references such as {quote_ref, qve_report_ref, pck_chain_ref, collateral_version, fmspc, root_ca_crl_ref} or a pointer to the Quote Verification log; these are evidentiary and do not change gate semantics.

Canonical Evidence Encodings (Illustrative; Non-Limiting)

JSON (JCS). When JSON is used, implementations MAY produce JCS-canonical evidence (no superfluous whitespace; ECMAScript-exact numbers/strings; deterministic property sorting) so hashes/signatures are stable across stacks. Evidence-only; gates unchanged.

CBOR (deterministic). When CBOR is used, implementations MAY emit deterministic CBOR (preferred serialization; definite lengths; map-key order per RFC 8949) to reduce ordering ambiguity. Evidence-only.

Base-N hygiene. When Base-N encodings appear in receipts/bundles, implementations SHOULD follow RFC 4648 canonical rules: no line-feeds unless specified; reject non-alphabet characters; pad bits set to zero; prefer base64url in URIs; omit padding only when length is implied. Evidence-only.

DID Interop (Illustrative; Non-Limiting)

DID references. EvidenceBundle MAY include references to Decentralized Identifiers (DIDs) and DID Documents (e.g., controller, verification methods, services) to bind overlay sources, consent authorities, or provenance registries. Conformance is not tied to any DID method; DID syntax/URLs/data model follow DID Core. Audit-only; gates unchanged.

Conformance & Certification Program Hooks (Illustrative; Non-Limiting)

Badge/registry fields. Certification Results MAY carry {profile_id, badge_id, registry_uri, issued_at} so app stores/ enterprises can automate policy (e.g., allow-list TRC-Core). These values are evidence-only.

Self-test vectors & acceptance. Runtime self-tests MAY record {test_vector_ref, transcript_ref, pass_pct} for audit; failure MAY set HOLD until remediation. Fields are audit-only.

Policy-pack IDs. Evidence MAY include {policy_pack_id, policy_version, policy_sig} to indicate which Kids/Critical/Work or TRC-Pro/Privacy pack was active; illustrative only.

Billing & Metering Hooks (Illustrative; Non-Limiting)

Meter stub. Certification/receipts MAY include a meter object {class∈{verify, settle, actuation}, units} so OEMs/ exchanges can meter usage for licensing. Metering is evidence-only and does not affect gates or claims.

Policy Plug-In Interface (Illustrative; Non-Limiting)

Plug-in provenance. Deployments MAY record {policy_plugin_id, plugin_hash, plugin_sig} for policy modules that supplied additional predicates (e.g., caveat tokens, ZK verifiers). Values are audit-only.

Sandbox & Test Mode (Illustrative; Non-Limiting)

Safe integration. Receipts MAY annotate {sandbox: true} and include {test_vector_ref} during onboarding/QA; sandbox flags are evidence-only and do not alter gate semantics.

Data Retention & Redaction (Illustrative; Non-Limiting)

Retention/redaction pointers. Evidence MAY reference {retention_policy_ref, redaction_profile_ref} indicating how long artifacts are retained and which regulator-view redactions apply; pointers are audit-only.

Non-limiting statement. Section XIV and its subsections are illustrative and non-limiting. They increase interoperability, auditability, and licensing value without altering TRC gate semantics. The claims define the scope.

CLAIM CONSTRUCTION AND INTERPRETATION

Headings; examples; control. Section headings and figure captions are for convenience only and do not limit the claims. Examples, profiles, and options shown herein are illustrative and non-limiting. The claims control.

Open terms & inclusive language. "Comprise/including" and variants are open-ended. "Or" is inclusive (A or B or both). "At least one of A, B, or C" means any one or any combination of the listed items. Singular includes plural and vice-versa unless context indicates otherwise.

Order; concurrency. Unless expressly stated, claimed steps need not occur in the order written and may execute concurrently or be pipelined by the implementation.

Configured to/capable of. "Configured to," "for," "operative to," and "capable of" encompass hardware, firmware, software, or combinations that implement the recited functionality; they do not require static or permanent configuration unless expressly stated.

§ 112 (f) disclaimer. No claim element is intended to invoke 35 U.S.C. § 112 (f) (pre-AIA § 112, 16) unless the claim expressly uses "means for" or "step for".

Signed head; proofs; logs. "Signed head of an append-only public log" encompasses certificate-transparency style heads and functionally equivalent heads from vector-commitment or accumulator logs, provided they support proofs of inclusion and proofs of append-only evolution (consistency). Any reference to "STH/SSH" includes such signed heads.

Freshness & frame budget. "Freshness" means validation under a policy that the referenced commitment is included under a current signed head (and, on head advance, that consistency holds). "Within a frame budget" means bounded latency appropriate to the target pipeline (e.g., HMD/AR/ auto HUD); numeric values are illustrative, not limiting. Freshness can be satisfied by embedded proofs, referenced proofs, or verifier-retrieved proofs under the configured policy.

Machine-readable deny & labels. "Machine-readable deny" is a programmatic deny accompanied by a structured code and optional details; protocol mappings (e.g., HTTP 412) are illustrative. "Machine-readable/-audible label" includes any programmatically consumable label state and optional accessibility renderings.

Follow-On Privilege (FOP) & MAV. "Follow-On Privilege" includes, without limitation, capability tokens, session/entitlement activation, device RUN_PERMIT, and egress permissions (Share/Upload/Record/Capture/Clipboard). "Mint-After-Verify (MAV)" means no FOP is issued or activated unless the verification requirements (e.g., inclusion under a fresh signed head and consistency on head advance) are satisfied; otherwise paths fail closed.

Computer program product. "Non-transitory computer-readable medium (CRM)" excludes transitory propagating signals or carrier waves and includes tangible media storing instructions executable by one or more processors.

Evidence-only references. References to JCS/CBOR, RFC 4648 base-N, CT/SCT, C2PA, EAT/RATS, DIDs, IAB/ MRC, and FHIR are interoperability aids and mark evidence-only fields; they do not change gate semantics or limit claim scope.

No disavowal. Absent clear and unmistakable disclaimer, nothing in the description should be read as disavowing scope otherwise supported by the claim language.

COMPLIANCE PROFILES & STANDARD MAPPINGS (NORMATIVE*)

*Profiles support conformance and licensing. They do not limit patent claim scope.

TRC-Core Profile 1.0 (conformance). A platform conforms to TRC-Core if the reality compositor (i) enforces per-frame verification of an R2 under a fresh signed head with append-only evolution validation on head advance and anti-replay checks; (ii) drives a view-permit latch that fail-closes non-conformant overlays and injects machine-readable/-audible labels on PASS; (iii) applies the same predicates at Render and at least one of Share, Upload, Record/ Capture, or Clipboard/Drag-Drop; and (iv) emits View/ Interaction Receipts and Certification Results with audit-only evidence references. (Illustrative; claims control.)

Label semantics (machine-readable). Implementations MAY expose a label state (e.g., PASS/HOLD/FAIL/STALE) with policy-defined presentation (color/icon/TTS/earcon) and publish Structured Precondition-Failure codes for denies. Presentation is illustrative; the machine-readable state is normative for conformance.

Conformance manifest & registry (licensing enabler). Implementations MUST publish a TRC-Core Conformance Manifest containing at least: {profile_id, api_version, gatepoints_supported, label_states, deny_codes, accessibility_exposure, freshness_policy_ref, audit_endpoints, badge, registry_uri}. A registry MAY issue a badge and registry URL for automated policy in app stores and enterprise CI. (Evidence-only; does not alter gates.)

Standard mappings (illustrative; interop).

(a) Provenance: TRC consumes signed provenance receipts (e.g., C2PA manifests/claim-sigs) as $R^2$ evidence but relies on runtime verification; metadata alone is insufficient.

(b) Transparency: Signed-head inclusion/evolution proofs (e.g., CT-style heads and APIs) substantiate freshness; policy may reference MMD/STH cadence as audit-only values.

(c) Encodings: JCS/CBOR canonical encodings and RFC 4648 base-N hygiene stabilize evidence hashing.

(d) Attestation: EAT/RATS tokens (e.g., eat_nonce, ueid, manifests, measurements) may wrap receipts/certs as evidence only.

(e) Identity: DIDs may bind overlay sources, consent authorities, or registries as audit-only references.

(f) Measurement: For AR ads rendered under a view-permit, viewability/IVT fields (e.g., viewable_time_ms, occlusion_pct, ad_angle, poll_ms, idle_policy, min_size_pct) may be exposed for auditors; gates unchanged.

(g) Healthcare: FHIR AuditEvent/security labels may reference TRC outcomes for clinical logs; gates unchanged.

Accessibility & machine-audible labels. The label injector SHOULD expose label state through an accessibility bridge and MAY emit an earcon or TTS snippet (e.g., "Receipt Verified/Hold/Denied") synchronized with the frame. Accessibility output is illustrative and does not alter gate semantics.

Profiles & legal regimes (illustrative). Kids mode MAY require RPCT for depicted faces/voices and cap ad frequency; Critical mode MAY enforce strict whitelists and speed/scene fences; Work/Enterprise MAY incorporate geo/ juris policies. Profile behavior is illustrative and does not narrow claims.

Certification Results (policy consumer). A verifier/CRM MAY emit Certification Results that app stores, insurers, and regulators consume to gate distribution, monetization, coverage, or conformance. Optional evidence-only fields MAY include:

(a) Policy-enforcer hooks: {status∈{PASS,HOLD,FAIL, REVOKED}, codes[ ], issued_at}.

(b) ZK verdict reference: {proof_ref, proof_status∈{PROOF_PENDING, PROOF_OK, PROOF_FAIL}}.

(c) Multimodal signals: {av_sync_score, gan_fp_score, modalities_used, explainability_ref}.

(d) Safety-tool interop: hooks for mute/block/report/safezone workflows.

(e) School context: {school_context∈{k-12,higher_ed, none}, title_ix_contact_ref, mandated_reporter_flag, incident_refs}.

(f) Minor-likeness/RPCT status: {minor_flag∈{present, unknown}, rpct_status∈{OK,MISSING,EXPIRED}, kid_profile∈{CSP-01, none}}.

(g) Takedown packet: {victim_age_flag, guardian_authority, url_list, content_hashes, report_ts, removal_deadline_ts, platform_case_id, claimant_attestation, counter_notice_ref}.

(h) Consent evidence: {consent_mode∈{text, HUD,object_locked}, consent_epoch, consent_viz_ref, privacy_settings_snapshot_ref}.

(i) Personalization transparency: {personalization_categories, inference_summary_ref}.

(j) C2PA refs: {c2pa_manifest_ref, c2pa_claim_sig_ref, tsa_token_ref, ocsp_staple_ref}.

(k) CT refs: {set_ref, sth_id, head_ts, mmd_policy, inclusion_proof_ref, evolution_proof_ref}.

(l) Post-deployment monitoring: {deny_distribution, remediation_latency_ms, monitor_policy_ref}.

(m) EAT/DID/FHIR: {eat_token_ref, did_subject/did_doc_ref, fhir_auditevent_ref, fhir_label_set}.

(n) zk_hint: {scheme: "Groth16|PLONK| . . . ", vk_ref: "url: . . . ", proof_size_bytes: n} (evidence-only).

(o) group_sig_ref: "url: . . . ", opening_authority: "did: . . . " (BBS short-group signature attestation; evidence-only).

(p) sth_age_ms: n, freshness_policy_ref: "url: . . . " (CT age/SLA signals; evidence-only).

(q) consent_log_ref: "url: . . . ", erasable_link_ref: "url: . . . " (dynamic-consent/GDPR pointers; evidence-only).

(r) safety_plan_ref: "url: . . . ", incident_report_ref: "url: . . . " (RAISE-style plan/report; evidence-only).

(s) Safety-critical tag: {sc_id: DRIVER|SURGERY|K-12} (evidence-only; helps OEMs/insurers gate by context).

(t) Store-gate hint: {store_gate: ALLOW|RESTRICT-|DENY} (derived from label mapping; evidence-only; aids automated store/exchange enforcement).

All such fields are audit-only and do not alter TRC gating semantics or narrow claims.

Conflict policy. Transparency-log disagreement SHOULD yield HOLD with a signed conflict record (e.g., listing diverging heads/proofs) and SHOULD unblock only upon resolution; PASS resumes without app restart. (Illustrative.)

Conflict Record (illustrative; evidence-only). A Conflict Record MAY include {prior_sth_id, prior_tree_size, prior_ts, current_sth_id, current_tree_size, current_ts, log_ids[ ], verifier_sig}.

Conformance artifacts (report-only). Implementations SHOULD publish a conformance manifest enumerating: {profile_id, api_version, gatepoints_supported, label_states, deny_codes, accessibility_exposure, freshness_policy_ref, audit_endpoints} and MAY report indicative performance (e.g., frame-budget targets, watchdog behavior). Numeric values are report-only; gates remain claim-controlled.

Industrial applicability TRC-Core applies to smartphones, HMDs, auto HUDs, and any OS with a compositor that merges sensor feeds and synthetic layers; sector-specific mappings (e.g., adtech, healthcare) are illustrative and do not limit claims.

Non-limitation. TRC-Core and the standard mappings above facilitate interoperability, certification, and licensing. They are illustrative and non-limiting; alternative profiles (TRC-Privacy/Pro) are equivalent if they preserve per-frame verification, fail-closed gating, and label injection. The claims define the scope.

AUDIO & HAPTIC OVERLAYS (ENABLEMENT)

Scope (illustrative; non-limiting). "Overlay" includes audio (speech, earcons, spatialized sound) and haptic stimuli. The view-permit latch gates audio/haptic emission in lock-step with visual rendering; a PASS permits synchronized emission, while HOLD/FAIL mutes or suppresses overlay audio/haptics.

Machine-audible label (illustrative). On PASS, the compositor MAY emit a short earcon/TTS marker synchronized to the visual label; on HOLD/FAIL, a distinct earcon and overlay audio/haptic mute/duck SHOULD occur. Protocol examples (e.g., WebAudio mute, AudioTrack duck) are illustrative only; equivalent APIs are within scope.

ZK detection proof hook (illustrative; evidence-only). A Certification Result MAY embed or reference a succinct zero-knowledge proof that a client-side model classified an overlay as real/fake without disclosing frames, with proof_status∈{PROOF_PENDING, PROOF_OK, PROOF_FAIL}. This is audit-only and does not alter latch decisions.

Recorded content (illustrative). Where capture is permitted, recorded media MAY embed a label track (AUX audio channel or timed metadata) referencing the overlay's $R^2$ so downstream tools can verify render provenance. For TRC-Core conformance, Record/Capture MUST embed a label track referencing the overlay's $R^2$ on PASS; watermark AMBER on Short-Receipt. (Evidence-only; does not alter gates.)

Accessibility (illustrative). Label state SHOULD be exposed through assistive APIs for deaf/hard-of-hearing and blind/low-vision users; machine-audible labels MAY mirror visual outcomes. Exposure is illustrative and does not alter gate semantics.

Audio & Haptic Enforcement Details (Illustrative; Non-Limiting)

Synchrony & budget. Audio and haptic emission MAY track the compositor's view-permit latch with the same frame-budget semantics; on HOLD/FAIL, overlay audio MAY be muted or ducked and haptic actuation MAY be suppressed within the frame budget (illustratively ≤16 ms @60 FPS). Timing values are illustrative and non-limiting.

Label→earcon/haptic mapping (illustrative). Label states MAY map to machine-audible earcons and haptic patterns (e.g., PASS→A1, HOLD→A2, FAIL→A3, STALE→A4). Presentation is illustrative; the machine-readable label state controls gating (see Appendix F [F1]).

Egress enforcement (audio paths). For audio casting, mirroring, or remote/audio egress (e.g., wired or Bluetooth headsets), the view-permit latch MAY be enforced at the egress path; streams lacking a bound, fresh frame token MAY be ducked or dropped. Where applicable, deployments MAY record EGRESS_UNBOUND in audit artifacts; codes are illustrative (see Appendix I).

Short-Receipt cues (illustrative). Under Short-Receipt, a HOLD advisory state MAY add a short machine-audible chime and a low-amplitude haptic pulse; Share/Upload remain blocked until freshness resolves.

Safety budgets (audio/haptic). Haptic amplitude/frequency and audio SPL/crest-factor policies MAY be treated as safety budgets; exceeding thresholds MAY deny with HAPTIC_OVERLOAD or a vendor-namespaced acoustic risk code (codes are non-exhaustive; see Appendix I).

Recorded-media verification (illustrative). Recorded media SHOULD embed a label track (auxiliary audio channel or timed metadata) referencing the overlay's $R^2$ so downstream tools can verify render provenance. Values are evidentiary and do not alter TRC gating.

Consent UX Patterns (Illustrative; Non-Limiting)

Pattern taxonomy. TRC implementations MAY surface consent state via three non-exclusive patterns: (i) infrastructure-locked (environmental cues such as virtual fences/marked recording zones), (ii) object-locked (indicators bound to a data-collecting object), and (iii) user-centered HUD elements persistent in the field of view.

Redundancy & accessibility. Consent/deny state SHOULD be conveyed redundantly-visual, audio, and haptic-so users with different perceptual abilities perceive gating/labels without disrupting immersion.

Temporal dynamics. Consent MAY be renegotiated in-session (e.g., gesture shortcuts, context-aware prompts), with transitions recorded in View/Interaction Receipts; such records are evidence-only and do not alter TRC gating.

Cross-reality boundary. When experiences span virtual→physical contexts, TRC SHOULD render an explicit boundary indicator and require fresh consent for physical-world extensions; labels MUST distinguish VR/AR-only permissions from real-world permissions.

K-12 School Mode. In school contexts, deployments MAY enable a School Mode that elevates prompts, logs a guardian co-sign handshake when applicable, and records transitions in receipts for audit (evidence-only).

Cyberbullying classification. Deployments MAY set policy_tags (e.g., CYBERBULLYING) when overlays impersonate or sexualize minors; tags are evidentiary only and do not alter TRC gating.

Parent-facing labels. For minors, TRC SHOULD surface labels across visual/audio/haptic channels and present plain-language explanations for PASS/HOLD/FAIL; wording is illustrative and non-limiting.

Privacy HUD. Implementations MAY render a persistent, user-anchored Privacy HUD that communicates: (i) current consent_mode (text/HUD/object-locked), (ii) data classes in use (e.g., gaze, pose/gait, scene digest), and (iii) a one-tap path to revoke/renegotiate consent; HUD changes MAY be logged as consent_hud_events (evidence-only).

Inference transparency. Because VR personalization can be invisible, TRC SHOULD provide just-in-time visualization of personalization/inference categories (e.g., ambience tuning, targeting) with plain-language summaries; visualizations are evidence-only.

Caveat-token interop. Deployments MAY accept a short-lived caveat token (e.g., macaroon-style) whose caveats constrain audience/scope/time and may require a third-party discharge (e.g., guardian/school). Tokens are evidentiary inputs; gates remain frame-budget/label-based.

GENERATIVE OVERLAYS (MODEL ATTESTATION)

Model provenance (illustrative). If an overlay is produced by a generative model, the $R^2$ SHOULD include model_id, model_version, prompt_hash, and a safety_verdict from a policy classifier. Deny codes MAY include MODEL_UNATTESTED and PROMPT_UNBOUND.

Where available, an overlay produced via a compliant loader MAY reference a model_load_receipt_ref (AML-Gate) as audit-only evidence; TRC gates remain runtime/scene-bound.

API-layer lifecycle (illustrative). A TRC API layer MAY be packaged as an OpenXR API layer discovered by the loader via JSON manifests (implicit/explicit), enabled by app request or environment, and linked into the call chain at xrCreateInstance/xrGetInstanceProcAddr negotiation. Packaging is illustrative and does not limit claims.

Discovery & env-controls (illustrative). Desktop distributions MAY honor standard environment controls (e.g., XR_ENABLE_API_LAYERS, XR_API_LAYER_PATH) so developers, stores, or OEMs can enable/disable TRC layers without modifying applications.

Scene binding. Generative overlays MUST bind to the scene digest and respect geo/jurisdiction fences and safety budgets; otherwise, REPLAY_BLOCK or NONCONFORMANT_RECEIPT applies.

Labeling (illustrative). The label injector MAY surface a compact model tag (e.g., icon) alongside PASS/HOLD/FAIL state.

Privacy (illustrative). Model IDs/prompt hashes MAY be redacted under TRC-Privacy using zero-knowledge predicates described herein.

ZERO-KNOWLEDGE (ZK) PREDICATES

Purpose (illustrative). TRC-Privacy MAY accept ZK proofs that an overlay satisfies a policy (e.g., "ad source ∈ prohibited set", "age ≥13") without revealing the underlying identity or list.

Age predicate (illustrative). A canonical statement "age ≥threshold" MAY be verified by a ZK proof using a reference verifying key {zk_hint.vk_ref}; verdict is PROOF_OK|PROOF_FAIL|PROOF_PENDING; audit-only.

Transcript (illustrative). ZK verification outcomes MAY be placed in View Receipts and the Certification Result under codes[ ] and/or proofs[ ] with an optional proof_ref/proof_status.

Failure (illustrative). Missing/invalid proof MAY yield PRIVACY_ZK_FAIL deny and HOLD/FAIL at the latch.

Equivalence (illustrative). Accumulators/Merkle-membership sets are equivalent to zk-SNARK/other schemes if they preserve freshness/consistency semantics described herein.

OFFLINE SHORT RECEIPTS & WATERMARKING

Amber holding state (illustrative). For Short Receipts, render AMBER with a visible watermark and block Share/Upload until freshness and evolution resolve.

Expiry (illustrative). Upon exceeding policy MMD, deny with OFFLINE_EXPIRED; recorded content retains the watermark.

Reconciliation (illustrative). When back online, the compositor replaces AMBER→PASS if all predicates satisfy; otherwise FAIL with a View-Deny Receipt emitted.

Audit (illustrative). The evidence logger records the offline→online transition with ms_fail_close and ms_rearm timings.

REFERENCE BUILDS (ENABLEMENT EXAMPLES)

XR graphics interface layer (illustrative). A TRC API layer interposes at the layer-submit boundary of an XR graphics interface and refuses non-conformant layers, returning Structured Precondition-Failure (code) to the caller.

Mobile compositor wrapper (illustrative). A mobile OS compositor module wraps surfaces with a view-permit latch that injects labels and drives Render/Share/Upload/Record/Clipboard gatepoints.

HMD plug-in—Critical (illustrative). A head-mounted display plug-in enforces Critical profile for surgery/driver contexts: whitelisted overlays only; SPEED fence; RPCT required for staff faces.

Auto HUD (illustrative). A HUD runtime enforces lane-only guidance; denies unsafe ad overlays; emits Interaction Receipts for driver consents.

Camera pipeline shim (illustrative). A camera app uses TRC to block filters lacking RPCT or violating ad-frequency caps; PASS labels are burned into recorded content.

TEE run-permit (illustrative). The device run-permit within SE/TEE aggregates predicate vectors from multiple apps and fails-closed within the frame budget.

Self-test (illustrative). A built-in self-test toggles deny→allow cycles and posts a signed transcript.

Compositor integration surfaces (illustrative). On mobile/desktop/XR stacks, the latch is realizable at the OS compositor or XR runtime's layer submit/commit/present boundary; naming examples are illustrative and non-limiting.

Non-limiting. The above are reference builds; equivalent API layers and compositor hooks are within scope if they preserve the gate semantics described herein.

LATENCY BUDGET & BENCHMARKING

Frame-budget verification (illustrative). The verifier SHOULD complete within the pipeline's frame budget (e.g., ≤16 ms @60 FPS; ≤11 ms @90 FPS) using a local signed-head cache and ART checks; numbers are illustrative.

Benchmark harness (illustrative). A harness MAY measure ms_fail_close and ms_rearm by inducing synthetic policy violations and logging View-Deny Receipts; results MAY be stored in the transparency log for acceptance.

Warm-path cache (illustrative). The verifier SHOULD prefetch heads/proofs for active overlays within MMD windows and reuse verification artifacts where safe.

Determinism (illustrative). Implementations SHOULD expose a deterministic mode (e.g., single-threaded verify) for auditor reproduction; jitter targets MAY be ±2 ms.

Quorum (illustrative). TRC-Pro MAY require k-of-m logs (e.g., k=2, m=3) with independent network paths and a HOLD-on-disagreement policy.

Timeout policy (illustrative). On verifier timeout, treat as precondition-failure with TIME_BUDGET_EXCEEDED and drop the overlay.

Non-limiting ranges. Numeric bounds are illustrative; equivalent ranges apply if safety/compliance semantics are preserved.

INDUSTRIAL APPLICABILITY ADDENDUM (PILOTS)

Insurer pilots (illustrative). For automotive HUDs, TRC reduces distraction incidents by denying non-whitelisted overlays in Critical profile; Interaction Receipts support claims adjudication.

Regulatory pilots (illustrative). Certification Results enable regulators to audit conformance to runtime labeling/gating policies; app stores may refuse distribution for FAIL/REVOKED.

FRAND-style licensing (illustrative). Licensing MAY be offered under fair, reasonable, and non-discriminatory terms for safety/compliance uses; commercial tiers MAY include per-verified-event pricing and annual floors (evidence-ready meter fields support settlement).

Kids mode (illustrative). A Kids profile enforces age policy, RPCT, and ad-frequency caps; denies include KIDS_POLICY with audit-only minors fields.

Medical/driver criticality (illustrative). Critical profile enforces scene/geo fences and whitelists; denies include DRIVER_DISTRACTION; evidence is portable for safety cases.

Inception hygiene (illustrative). TRC MAY flag short-lived home anomalies (home-exit→micro-home→app foreground) as INCEPTION_SUSPECTED, verify app-call authenticity (signed caller identity) and surface DEV_MODE_ACTIVE as a risk flag; these records are audit-only and do not alter gates.

APPENDICES

Appendix A—Definitions, Glossary & Normative Semantics

[A000] Purpose & Use

This Appendix defines capitalized terms used in the specification and claims. Normative words ("MUST", "SHOULD", "MAY") clarify intended operation and are non-limiting unless expressly recited in a claim. Examples and numeric ranges are illustrative. Cross-references aid understanding and do not limit claims.

A. Alphabetical Glossary

[A001] Accessibility Bridge. OS facility exposing Label State and deny causes to assistive technologies (screen readers, captions, earcons/TTS). See FIG. 7.

[A002] Ad Frequency Cap. Policy limiting ad overlay cadence; violations MUST deny with SAFETY_BUDGET or KIDS_POLICY. See claim 14.

[A003] Amber Label. A HOLD/STALE visual and/or audible indicator signaling constrained rendering (e.g., Short-Receipt, conflict). Distribution status: RESTRICT.

[A004] Anti-Replay Tuple (ART). Domain-separated digest binding overlay to context H(prefix|nonce|monotonic_counter|device_profile|policy_epoch|scene_digest). Replay failure MUST deny with REPLAY_BLOCK.

[A005] App-Store Policy Consumer. A platform that reads Certification Results to gate distribution/monetization.

[A006] Certification Result. Verifier/CRM output (e.g., {profile, status, codes[ ], signed_head[ ]}) consumable by stores/insurers/regulators. See Appendix E1; claims 4, 21.

[A007] Clipboard/Drag-Drop Gate. OS egress gate that MUST apply the same predicates as Render/Share/Upload/Record and return Structured Precondition-Failure (code) on violation. See FIG. 6.

[A008] Consistency Proof (Append-Only Evolution). Proof that a new Signed Head descends from a prior head; absence MUST yield CONSISTENCY_REQUIRED (HOLD). See FIG. 2; claim 6.

[A008A] Append-Only Evolution (Consistency) Proof. Alias for Consistency Proof; both terms refer to a proof that a newer Signed Head descends from a prior head. (Illustrative; non-limiting.)

[A009] Critical Profile. Device profile for safety-critical contexts (driver/medical); enforces whitelists and geo/speed fences; suppresses non-critical overlays. Deny codes may include DRIVER_DISTRACTION.

[A010] Device Run-Permit (Latch). SE/TEE-anchored permit aggregating predicate vectors across apps; fails-closed within the Frame Budget; re-arms after PASS. Evidence MUST be signed. See FIG. 5; claim 3.

[A011] Deny Code. Machine-readable code describing a precondition failure; see Registry Section E. A Deny SHOULD be accompanied by a View-Deny Receipt. See claims 17 and 25.

[A012] ETL (Event Transparency Log). Append-only log issuing Signed Heads; stores receipts, transcripts, and conflict records. See FIG. 2.

[A013] Evidence Record. Signed allow/deny transcript {label_state, receipt_id, scene_digest, fail_close_time, rearm_time, code}. See claim 27.

[A013A] Label State (equivalence; evidence-only). "label_state" may be referred to as "halo_state" in device evidence examples; the terms are equivalent for audit purposes and do not alter TRC gate semantics.

[A014] Fail-Close Time. Max elapsed time to drop non-conformant overlays (illustratively ≤16 ms @60 FPS). A failure to fail-close MUST NOT occur.

[A015] Frame Budget. Per-frame verification time bound (illustratively ≤16 ms @60 FPS; ≤11 ms @90 FPS). Exceeding the budget yields TIME_BUDGET_EXCEEDED.

[A016] Generative Overlay. Overlay produced by a generative model; $R^2$ SHOULD include {model_id, model_version, prompt_hash, safety_verdict}; missing attestation MAY yield MODEL_UNATTESTED or PROMPT_UN-BOUND.

[A017] Geo/Juris Fence. Constraints on geography/jurisdiction; violations MUST deny with GEOFENCE_FAIL or JURIS_FAIL.

[A018] Green Label. PASS indicator; overlay permitted; distribution ALLOW.

[A019] Inclusion Proof. Proof that a receipt is included under a current Signed Head; absence yields ANCHOR_STALE. See FIG. 2; claim 6.

[A020] Interaction Receipt. Signed record of a user action (e.g., tap/buy/route/save) bound to overlay and Scene Digest. See Appendix B4; claim 2.

[A021] Kids Profile. Device profile for minors; enforces RPCT, ad caps, and content class; violations include KIDS_POLICY. See claim 14.

[A022] Label Injector. Compositor submodule writing a machine-readable and machine-audible label (PASS/HOLD/FAIL/STALE/REVOKED) onto the render surface and recorded content.

[A023] Label State. One of PASS/HOLD/FAIL/STALE/REVOKED with store mapping (ALLOW/RESTRICT/DENY). Color/icon are illustrative; an Accessibility Bridge is REQUIRED. See Appendix F.

[A023A] Label Track. Timed-metadata or auxiliary audio channel embedded into recorded content conveying Label State and a Receipt reference.

[A024] Machine-Audible Label. Earcon/TTS synchronized to frame timing conveying PASS/HOLD/FAIL/STALE. Required where audio/haptics are gated.

[A025] Maximum-Merge-Delay (MMD). The system of claim 1, wherein the receipt verifier validates freshness to a signed head obtained within a maximum-merge-delay window and, responsive to observing a newer head, validates a prior-to-current append-only evolution (consistency) proof.

[A026] Non-Conformant Receipt. $R^2$ that violates schema or policy; deny with NONCONFORMANT_RECEIPT. See claim 25.

[A027] Overlay Intent. Application request to render an overlay, optionally referencing $R^2$ and RPCT. See FIG. 1.

[A028] Privacy Proof (ZK). Zero-knowledge predicate proving compliance (e.g., "ad source € prohibited set", "age ≥13") without disclosing underlying data; missing/invalid proof MAY deny with PRIVACY_ZK_FAIL.

[A029] Profiles (Verifier). TRC-Core (minimal), TRC-Pro (adds quorum, TEE attestation), TRC-Privacy (adds ZK).

[A030] Profiles (Device). Kids, Critical, Work—device/runtime packs that do not narrow claim scope.

[A031] Reality Compositor. OS graphics subsystem merging sensor/liveness and synthetic overlays with a View-Permit Latch.

[A032] Reality Receipt ($R^2$). Per-overlay/per-frame ReceiptCore with origin, scene/object claims, fences/budgets, ART, and inclusion/evolution proofs to a Signed Head, optional ZK, and signature. See Appendix B1.

[A032A] $R^2$ vs. PoPC Minimal ReceiptCore. $R^2$ serves runtime compositor gating and scene-binding; PoPC's Mini-mal ReceiptCore serves compute-time attested execution. Artifacts may interoperate; purposes and field sets differ. (Illustrative.)

[A032B] $R^2$ alias—In text/figures, "$R^{2}$" is used typographically for "R2". They are equivalent; all identifiers and hashes use ASCII "R2".

[A032C] Compositor (Equivalents). As used herein, "compositor" means the OS-level composition subsystem that merges visual layers/surfaces into a final frame for display (e.g., scene-graph commit and present scheduling). Functionally equivalent hardware/software pipelines are included, such as GPU composition, overlay-plane promotion in display engines, and hardware-composer interfaces. Examples are illustrative and non-limiting.

[A032D] URC (UPL). Use Receipt Core computed in a trusted boundary and anchored to a signed head; used to gate model memory writes in UPL; referenced here as audit-only cross-rail evidence.

[A032E] S2 (TSIL). Sensor Receipt for verify-then-admit on sensor ingress; referenced as audit-only cross-rail evidence in TRC artifacts.

[A032F] Model-Load Receipt (AML-Gate). Receipt evidencing model loader compliance prior to execution; referenced as audit-only cross-rail evidence in generative overlay flows.

[A032G] THP (Trusted Human Presence) (illustrative; evidence-only). An RTC presence rail that produces session-bound Presence Tokens (PT) and OS-enforced render/record/share gating based on a presence state (e.g., HUMAN, AUTHORIZED_CLONE, UNDETERMINED); referenced here as audit-only interop.

[A032H] Presence Token (PT) (illustrative; evidence-only). A signed, session-bound token conveying liveness evidence digests, device/session bindings, anti-replay, and optional Authorized Clone Token (ACT) reference; referenced here for audit-only cross-rail evidence.

[A032I] Cross-rail abbreviations (evidence-only; illustrative). TFR=Training/Fine-Tune Receipt; IPR=Inference Provenance Receipt; CCT=Creator Consent Token; CLM=Composable License Manifest; BIC=Bounded-Impact Certificate; IFC=Index-Forgetting Certificate; OIC receipt=One-Intent Checkout policy-compliance receipt. Names are audit-only and do not alter TRC gate semantics.

[A033] ReceiptCore Canonicalization. UTF-8; canonical key order; locale-independent numerics; RFC 3339 ("Z") timestamps; optional JCS/CBOR canonical encodings; whitespace trimmed.

[A034] Record/Capture Gate. OS gate that MUST watermark AMBER content for Short-Receipts and embed label metadata on PASS.

[A035] Re-Arm Time. Max elapsed time to return to PASS after prior deny (illustratively ≤100 ms).

[A036] Right-of-Publicity Consent Token (RPCT). Token evidencing consent for face/voice/likeness; absence/expiry MUST deny with CONSENT_MISSING. See claim 5.

[A037] Scene Digest. Hash binding overlay to captured reality (at least one of pose, depth/feature map, or pipeline timecode). See claim 8.

[A038] Secure Element/Trusted Execution Environment (SE/TEE). Hardware-anchored environment for signatures, run-permit, and self-test transcripts. See claim 3.

[A039] Self-Test Transcript. Signed record from a built-in self-test enumerating {ms_fail_close, ms_rearm, result} for acceptance/audit. See Appendix E2.

[A040] Share/Upload Gate. OS gates applying the same predicates as Render; on failure MUST return Structured Precondition-Failure.

[A041] Short-Receipt. Offline/deferred $R^2$ enabling provisional display under AMBER with watermark; expires to OFFLINE_EXPIRED if freshness not achieved within MMD.

[A041A] Short-Receipt QR. Compact, offline scannable encoding of a Short-Receipt; verification deferred to reconnection before Share/Upload is permitted.

[A042] Signed Tree Head (STH). Transparency-log head with tree size and timestamp; used for freshness/consistency. See FIG. 2; claim 6.

[A042A] CT Signed Tree Head. An instance of a Signed Head issued by a Certificate Transparency log; treated as equivalent if inclusion and append-only evolution proofs are available. (Illustrative.)

[A042B] Public log (equivalence; illustrative). "Public log" includes certificate-transparency-style append-only logs that publish signed tree/set heads, and functionally equivalent accumulator or vector-commitment heads that provide signed-head freshness and append-only evolution (consistency) proofs (illustrative; non-limiting).

[A042C] Platform Attestation (illustrative; evidence-only). Evidence such as Android Verified Boot/VBMeta digests and rollback-index posture, or Apple Secure Enclave OS-bound keys and LocalPolicy/SSV posture, MAY be referenced as inputs to channel-binding decisions; such references are evidentiary only and do not alter TRC gate semantics.

[A042D] BR-alignment (illustrative; evidence-only). Optional evidence fields (e.g., 'status_staple' timing and 'ct_compatible_heads') mirror CA/B Forum BR-style status and CT head semantics for audit/export; gate semantics remain compositor/egress-bound.

[A043] Structured Precondition-Failure (code). OS-level error (code+optional fields) returned at Render/Share/Upload/Record/Clipboard gates; MUST be machine-readable. See claim 10.

[A044] TRC-Core Profile. Minimal runtime conformance: per-frame verify; fail-closed latch; label injection; receipts; deny codes; accessibility exposure. See Appendix F.

[A045] TRC-Pro Profile. Adds quorum across logs and/or TEE attestation; conflict→HOLD with signed conflict record. See claim 12.

[A046] TRC-Privacy Profile. Adds ZK predicates and redaction rules; failing proofs→PRIVACY_ZK_FAIL. See claim 13.

[A047] View-Permit Latch. Compositor gate refusing non-conformant overlays, injecting labels on PASS; synchronized across Render/Share/Upload/Record/Clipboard. Sec FIG. 4; claim 1.

[A048] View Receipt. Signed PASS/HOLD/FAIL/STALE record for a render event, including codes and Label State. See Appendix B3; claims 2, 17.

B. Label Semantics (Normative)

[A049] PASS. All predicates satisfied within Frame Budget; overlay SHALL render; GREEN label; distribution ALLOW. View Receipt recorded.

[A050] HOLD. Predicates partially satisfied (e.g., Short-Receipt freshness pending; conflict recorded); overlay MAY render with masking/reduced prominence; AMBER label; watermark for captured media; distribution RESTRICT.

[A051] FAIL. One or more predicates failed (e.g., RPCT missing; geo/juris violation; replay; time budget exceeded); overlay MUST NOT render; RED badge optional as advisory. Distribution DENY. View-Deny Receipt required.

[A052] STALE. Stale head/receipt; treat as HOLD(AMBER) with limited operation until updated; transitions to PASS/FAIL upon resolution.

[A053] REVOKED. Explicit revocation of $R^2$ or RPCT; overlay MUST NOT render; distribution DENY. See Appendix B2.

C. Gatepoints (Unified Semantics)

[A054] Render Gate. Real-time gating at the compositor; PASS injects a label; non-conformant overlays MUST drop pixels within Fail-Close Time. See FIG. 4.

[A055] Share Gate. Share-sheet gating; non-conformant attempts MUST return Structured Precondition-Failure. See FIG. 6.

[A056] Upload Gate. Network submission gating; non-conformant content MUST be blocked or confined to RESTRICT.

[A057] Record/Capture Gate. Media capture gating; for Short-Receipts, MUST watermark and label AMBER; on FAIL, capture MAY be disabled.

[A058] Clipboard/Drag-Drop Gate. Clipboard export and drag-drop transfer are egress paths that MUST honor the same gating decision and predicate set applied at the Render gate and at any enabled Share, Upload, or Record/Capture gate, and MUST return a Structured Precondition-Failure (code) on violation.

D. Timing, Performance & Determinism

[A059] Budget. Verify within Frame Budget ($\leq 16$ ms @60 FPS; $\leq 11$ ms @90 FPS). Exceeding yields TIME_BUDGET_EXCEEDED.

[A060] Fail-Close/Re-Arm. Illustratively $\leq 16$ ms fail-close; $\leq 100$ ms re-arm. Deterministic mode SHOULD cap jitter $\leq 2$ ms. See XXII.

[A061] Warm-Path Cache. Verifier SHOULD prefetch heads/proofs to meet budgets; stale cache→ANCHOR_STALE. See XXII.

E. Deny Code Registry (Non-Exhaustive; Normative Meanings)

[A062] Canon. Codes are machine-readable strings; platforms SHOULD preserve unknown codes. Trigger→ action→typical gatepoints:

SIG_INVALID—Bad receipt signature→FAIL→Render/ Share/Upload.

ANCHOR_STALE—Head too old (beyond MMD)→HOLD/STALE→Render/Share/Upload.

CONSISTENCY_REQUIRED—Head advanced; no evolution proof→HOLD→Render/Upload.

REPLAY_BLOCK-ART—duplicate/mismatch→ FAIL→Render.

GEOFENCE_FAIL/JURIS_FAIL—Out-of-policy location→FAIL→All gates.

SAFETY_BUDGET—Driver/medical budget exceeded→FAIL→Render/Record.

CONSENT_MISSING—RPCT absent/expired→ FAIL→Render/Share/Upload/Record.

NONCONFORMANT_RECEIPT—Schema/policy violation→FAIL→All gates.

TIME_BUDGET_EXCEEDED—Verify exceeded frame time→FAIL→Render.

OFFLINE_EXPIRED—Short-Receipt expired before freshness→FAIL→Share/Upload/Record.

MODEL_UNATTESTED—Missing model attest fields→FAIL→Render.

PROMPT_UNBOUND—Prompt hash mismatch/absent→FAIL→Render.

PRIVACY_ZK_FAIL—ZK proof invalid/missing→FAIL/HOLD→Render/Upload.

KIDS_POLICY—Kids mode rule violated (e.g., ad cap)→FAIL→All gates.

DRIVER_DISTRACTION—Critical profile distraction rule violated→FAIL→Render.

Vendors may extend with vnd.<org>.<code>; conflicts SHOULD be logged as signed conflict records. See claims 25-27.

F. Audio & Haptic Semantics

[A063] Audio/Haptics Gating. Audio/haptic overlays MUST be gated synchronously with visuals; on HOLD/FAIL, non-conformant audio/haptics MUST mute/suppress. See XVII.

[A064] Machine-Audible Label Track. Recorded content SHOULD include an auxiliary audio track or timed metadata conveying Label State and Receipt reference.

G. Generative & Privacy Semantics

[A065] Model Attestation. For generative overlays, $R^2$ SHOULD include {model_id, model_version, prompt_hash, safety_verdict}; absence/mismatch MAY deny with MODEL_UNATTESTED/PROMPT_UNBOUND. See claim 29.

[A066] ZK Predicates. Under TRC-Privacy, ZK proofs MAY demonstrate compliance without revealing raw attributes; failures map to PRIVACY_ZK_FAIL.

H. Equivalence, Interop & Cryptographic Agility

[A067] Proof Systems. Merkle proofs, vector commitments, accumulators, and zk-SNARK/zk-STARK schemes are equivalent if freshness/consistency semantics and timing are preserved.

[A068] Transports. HTTP/gRPC/MQTT/SSE are equivalent for verifier APIs if canonicalization holds. See claim 10 (method dependent).

[A069] Crypto Agility. Algorithms MAY rotate (e.g., signing/hash) without departing from scope if ReceiptCore semantics, timings, and security properties hold.

I. Compliance & Conformance

[A070] TRC-Core Conformance Manifest. Implementations SHOULD publish: frame budget; fail-close/re-arm; MMD; gatepoints; accessibility exposure; deny codes supported; label mapping; audit endpoints. See Appendix F.

[A071] Audit Artifacts. View/Interaction Receipts, Evidence Records, Self-Test Transcripts, and Conflict Records SHOULD be retained per policy (e.g., ≥12 months) for acceptance and incident review. See Appendix E.

J. Notes on Claim Construction (Non-Limiting)

[A072] Open Terms. "Comprise/Include" are open-ended; singular includes plural; "or" is inclusive unless context dictates otherwise.

[A073] Means-Plus-Function. No claim element is intended to invoke 35 U.S.C. § 112 (f) unless "means for" or "step for" is expressly used.

K. Cross-References

[A074] Schemas. Sec Appendix B ($R^2$, RPCT, View/Interaction Receipts), Appendix E (Certification Result, Self-Test Transcript), and Appendix F (TRC-Core label mappings).

[A075] Figures. See FIGS. 1-14 for pipeline, proofs, timing, latch machine, run-permit, unified gatepoints, profiles/labels, short-receipt flow, anti-bypass, multimodal/accessibility, evidence/certification, consent/school, takedown, and API-layer packaging.

[A075A] Interoperability. This work interoperates with Receipt-Anchored Policy-Compliant Execution (PoPC) notably anchoring/freshness and inclusion/consistency semantics, verifier/signed-verification responses, and device-side RUN_PERMIT. References are illustrative and not incorporated by reference.

[A075B] Illustrative/Non-Limiting. These references aid understanding only; they do not narrow or limit the claims, are not incorporated by reference, and are not an admission of prior art.

L. Reserved Names & Extension Registry

[A076] Reserved Codes. Deny codes in Section E are reserved. Vendors MAY register additional codes with prefix vnd.<org>.<code>. Unknown codes MUST NOT break gating and MUST be surfaced in receipts.

[A077] Field Extensions. New ReceiptCore fields MAY appear under an ext object with namespaced keys to preserve forward compatibility. See Appendix B1.

[A078] session_state. Optional receipt/evidence field denoting runtime state transitions (e.g., READY/VISIBLE/FOCUSED/STOPPING).

[A079] thread_id_class. Optional field indicating input vs. render execution threads for receipts/evidence.

[A080] layer_bindings. Optional field describing surface handle, z-order, and CRC at composition.

[A081] av_sync_score/gan_fp_score/modalities_used/explainability_ref. Optional certification fields for multimodal safety diagnostics.

[A082] Infrastructure-Locked Consent. Environment-embedded cues (e.g., virtual fences/recording zones). (Illustrative.)

[A083] Object-Locked Consent. Indicators bound to requesting objects (e.g., capture devices). (Illustrative.)

[A084] User-Centered HUD. Persistent, user-anchored consent/label surface. (Illustrative.)

[A085] Compositor Metrics. Optional evidence fields {TW_ms, LCnt, LM_merges, DevicePPD, LayerRenderedPPD, . . . }. (Illustrative.)

[A086] Focus/Car Mode. A Critical profile that suppresses non-essential overlays/notifications in vehicle or high-hazard contexts. (Illustrative.)

[A087] Privacy HUD. Persistent, user-anchored overlay that visualizes consent state and data classes in use. (Illustrative.)

[A088] personalization_categories/inference_summary_ref. Optional certification fields disclosing active personalization/inference classes (evidence-only).

[A089] Signed Head. Log "head" object used to validate inclusion and append-only evolution proofs.

[A090] MMD. Maximum-Merge-Delay policy for Signed Heads.

[A091] SCT. Signed Certificate Timestamp (CT).

[A092] Quote/QvE/PCK Chain. SGX DCAP attestation evidence classes.

[A093] transparency_info. TLS extension through which CT artifacts can be conveyed.

[A094] Caveat Token/Discharge Macaroon. Bearer token with constraining caveats and third-party discharge; evidence-only input.

[A095] Decentralized Identifier (DID). Identifier+DID Document per DID Core; used here only as an audit reference.

[A096] Zero-Trust Roles. Mapping of policy engine/administrator and the compositor PEP to ZTA PDP/PE/PA concepts (illustrative).

[A097] Base-N(RFC 4648). Canonical base64/base64url/base32 rules for evidence payloads (no LFs; correct padding; reject non-alphabet).

[A098] FHIR AuditEvent/Security Labels. Audit/logging and label vocabularies for health deployments (evidence-only).

[A099] Short Group Signature (BBS). Privacy-preserving group membership signature with optional tracing/revocation; used here only to attest that an authorized signer set issued a Certification Result (evidence-only).

[A100] zk_hint. Optional Certification field naming a succinct-proof scheme (e.g., Groth16) and verifying-key reference; hints verification only (evidence-only).

[A101] sth_age_ms. Milliseconds between issued_at and the Signed Head used by the certification; aids policy checks against MMD (evidence-only).

[A102] safety_plan_ref/incident_report_ref. URLs to published safety/security plan and incident reports, if applicable (evidence-only).

[A103] consent_log_ref/erasable_link_ref. Pointers to user-facing consent timeline and erasure workflow; evidence-only, gates unchanged.

[A104] TOCTOU Binding. A per-frame association that ties the verification outcome to the exact pixel composition for that frame; any change in layers or presentation mode not covered by the token forces HOLD/FAIL. (Illustrative.)

[A105] Frame Token. Ephemeral, per-frame identifier binding {overlay_id, layer_set_hash, scene_digest, presentation_mode, ts}; propagated to egress for enforcement; evidence-only field in receipts. (Illustrative.)

[A106] Receipt Identifier (receipt_id). Hash of canonical R2_core; audit-only handle for caching/audit.

[A107] Commitment Identity. The log commitment equal to H(canonical R2_core) when the receipt is anchored; audit-only.

[A108] Rolling Receipt (illustrative). Successive frames MAY reuse prior R2_core when unchanged; receipt_id remains stable; audit-only optimization.

[A109] Transparency Report. Optional public-communication of audit-only statistics (Appendix L); non-technical and does not alter gates.

[A110] Ethical-Use Covenant. Illustrative posture describing public-interest intent and humanitarian/FRAND licensing (Appendix K); non-limiting.

[A111] SC-ID. Optional safety-critical conformance tag (e.g., DRIVER, SURGERY, K-12); evidence-only.

[A112] store_gate. Optional ALLOW/RESTRICT/DENY indicator derived from label mapping; evidence-only.

[A113] safe_mode_token_ref. Optional reference to a regulator-issued hold directive; audit-only.

[A114] first_boot. Optional boolean indicating that the Self-Test Transcript was produced at device first boot; evidence-only.

[A115] batch_id. Optional manufacturing/QA lot identifier recorded in a Self-Test Transcript; evidence-only.

[A116] device_serial_hash. Optional hash of device serial (privacy-preserving) recorded in a Self-Test Transcript; evidence-only.

[A117] H(x). Cryptographic hash of x (e.g., SHA-256); notation used for receipt_id/commitment. (Illustrative.)

[A118] R2_core. Canonical JSON/CBOR subset of an $R^2$ used to compute receipt_id/commitment; excludes evidence-only fields (e.g., prev_receipt_id, log, zk, ad_measurement, meter, ext). (Illustrative.)

[A119] Time Sanity (illustrative; evidence-only). "time_sanity_ref" denotes an audit reference to corroboration across independent time sources (e.g., TEE monotonic, OS/network time, policy epoch, and head_ts) within the configured freshness window; evidentiary only, gates unchanged.

[A120] Display Binding (illustrative; evidence-only). "display_binding" denotes an audit crumb binding a permitted frame to presentation artifacts (e.g., {panel_id_hash, present_fence_id}); evidentiary only, gates unchanged.

[A121] TCIL (alias; communication-only). In this disclosure, "TCIL" denotes the subset of TRC's non-render gatepoints (Share/Upload/Record/Clipboard) when referenced as a content-ingress/egress layer. Semantics are identical to TRC gatepoints; "TCIL" is a communication label only and does not alter claim scope.

[A122] Conformance Manifest. Machine-readable summary of a TRC deployment's capabilities (e.g., profile_id, gatepoints, deny codes, accessibility exposure, freshness_policy_ref, audit_endpoints). Evidence-only; does not alter TRC gates. (See Appendix F5.)

[A123] Badge (Conformance Badge). A cryptographically signed artifact (e.g., JSON/CBOR object) referencing a Conformance Manifest and profile_id; used by policy consumers to automate allow-lists. Evidence-only; gates unchanged. (See Appendix F6.)

[A124] Public Registry/Registry URI. A public, append-only or attestable registry that issues and/or lists badges and their status, addressable by a registry URI. Evidence-only.

[A125] Valid Badge. A Badge whose signature verifies against the registry's public key material, whose referenced Conformance Manifest is current (non-expired/non-revoked), and whose profile_id corresponds to a recognized TRC profile (e.g., TRC-Corc/Pro/Privacy). Equivalents that provide substantially similar authenticity and revocation semantics are included. Evidence-only; does not alter TRC gates.

[A126] Enterprise Continuous-Integration (CI) System. An automated build/release pipeline that consumes Certification Results, Conformance Manifests, and Badges to gate distribution or egress of overlays during build, test, or deploy. Evidence-only; does not alter TRC gates.

[A127] Parity Receipt. A pair (or set) of receipts demonstrating that cast/mirror/desktop-mode pipelines produce decisions consistent with the local pipeline; divergence yields HOLD/FAIL under TRC-Pro. Evidence-only.

[A128] Status Staple. A short-lived, signed status artifact (OCSP-like) accompanying a Certification Result to reduce verifier load; stale/missing staples map to STATUS_STAPLE_STALE (policy-defined HOLD/FAIL). Evidence-only.

Appendix B—Normative Schemas & API Skeleton

Conventions. UTF-8; timestamps RFC 3339 UTC; JSON JCS-canonical (RFC 8785) recommended; CBOR deterministic (RFC 8949) recommended; base-N RFC 4648 (base64url in URIs); binary fields documented as b64u strings. Fields labeled (opt.) are evidence-only and do not alter gate semantics. Versioning via type and api_version. For identifiers and hashing, use ASCII names (e.g., "R2", "R2_core"; not the glyph "R2").

[B1] Reality Receipt (R$^2$)

"ts": "2025-09-05T12:00:16Z",
"result": "PASS|HOLD|FAIL|STALE",
"codes": ["CONSENT_MISSING"],
"label_state": "GREEN|AMBER|RED",

```
{
   "type": "R2/1.0",
   "api_version": "1.0",              // (opt.) schema versioning (report-only)
   "canon": "JCS",               ·    // (opt.) JCS-canonical JSON for stable hashing
   "prev_receipt_id": "sha256:...",        // (opt.) audit-only; local catenate link to previous
receipt
                       //    NOT part of R2_core (does not affect
receipt_id/commitment)
   "receipt_id": "sha256:...",        // (opt.) audit-only; H(canonical(R2_core))
   "s2_refs": ["s2:..."],         // optional TSIL Sensor Receipt references; evidence-only
   "s2_time_bound_ms": 120,           // optional audit hint for capture→overlay window; evidence-
only
   "commitment": "sha256:...",            // (opt.) equals H(canonical(R2_core)) when
anchored
                       //    (binds to transparency-log commitment)
   "overlay_id": "ovl:...",
   "origin": { "app_id":"app:...","signer":"did:...","attested":true },
     "scene": {
        "digest":"sha256:...",
        "pose":{"qx":0.0,"qy":0.0,"qz":0.0,"qw":1.0},   // (opt.)
        "timecode":"ptp:...",            // (opt.)
        "features":"sha256:..."          // (opt.)
     },
     "claims":[ {"kind":"nav-arrow","bbox":[...]}, {"kind":"ad","slot":"..."} ],
     "fences":{"geo":["US-CA"],"juris":["EEA"],"speed_kph_max":120},
     "budgets":{"safety":"driver","kids":false,"ad_freq_cap":3},
     "rpct_refs":["rpct:..."]},
"gen":{"model_id":"mod:...","model_version":"...","prompt_hash":"sha256:...","safety_verdict
":"OK|WARN|FAIL"},
     "art":"sha256:...",                // Anti-Replay digest H(prefix||...)
     "log":
        "log_id":"log:...",
        "signed_head_id":"sth:...",
        "inclusion_proof_ref":"url:..."
        "evolution_proof_ref":"url:..."
     },
     "zk":{"proof_ref":"url:...","proof_status":"PROOF_PENDING|PROOF_OK|PROOF_FAIL"},
   // (opt.)
     "c2pa_manifest_ref":"hashuri:self#jumbf",                // (opt.)
     "eat_token_ref":"eat:...",                     // (opt.)
     "did_subject":"did:org:...",                   // (opt.)
     "ad_measurement":{"viewable_time_ms":1200,"occlusion_pct":12.5,"ad_angle":{"x":5,"y":0,"z
":0},"poll*ms":200,"idle_policy":"auto","min_size_pct":1.5}, // (opt.)
     "meter":{"class":"verify","units":1},              // (opt.)
     "expires_at":"2025-09-05T12:00:33Z",              // (opt.)
     "ts":"2025-09-05T12:00:00Z",
     "ext":{"vnd.example.vendor_field":"..."},              // (opt.)
     "signature":"b64u:..."            // base64url (RFC 4648)
   signature over canonical R2_core
}
```

[B2] RPCT (Right-of-Publicity Consent Token)
```
   {
   "type": "RPCT/1.0",
   "subject_id": "did: person: . . . ",
   "scope": ["face", "voice"],
   "jurisdiction": ["US-CA", "EEA"],
   "guardian": {"id": "did: guardian: . . . ", "attestation":
      "b64u: . . . "}, //(opt.)
   "expiry": "2028-12-31T00:00:00Z",
   "revocation": {"uri": "https:// . . . /revoke/ . . . ", "ts":
      "2026-01-01T00:00:00Z"}, //(opt.)
   "issued_at": "2025-09-01T00:00:00Z",
   "signature": "b64u: . . . "}
   }
```

[B3] View Receipt
```
   {
   "type": "VIEW/1.1",
   "ovl_ref": "ovl: . . . ",
   "scene_digest": "sha256: . . . ",
   "frame_token_id": "uuid: . . . ",
   "layer_set_hash": "sha256: . . . ",
   "signed_head_id": "sth: . . . ",
   "inclusion_proof_ref": "url: . . . ",
   "evolution_proof_ref": "url: . . . ",
   "zk": {
   "proof_ref": "url: . . . ",
   "proof_status":        "PROOF_PENDING|PROOF_OK-
      |PROOF_FAIL"},
   }
   "meter": {"class": "verify", "units": 1},
   "transport_exporter": "exp: . . . ",
   "time_sanity_ref": "tsref: . . . ",
   "display_binding": {"panel_id_hash": "sha256: . . . ",
      "present_fence_id": "uuid: . . . "},
   "s2_ref": "s2: . . . ",
   "model_load_receipt_ref": "mlr: . . . ",
   "use_receipt_ref": "urc: . . . ",
   "isl_settlement_receipt_ref": "isl: . . . ",
```

"tfr_ref": "tfr: . . . ",
"ipr_ref": "ipr: . . . ",
"cct_ref": "cct: . . . ",
"clm_ref": "clm: . . . ",
"bic_ref": "bic: . . . ",
"ifc_ref": "ifc: . . . ",
"oic_receipt_ref": "oic: . . . ",
"thp_pt_ref": "thp:pt:sha256: . . . ",
"thp_state":
"HUMAN|AUTHORIZED_CLONE|UNDETERMINE-D|EXPIRED|DOWNGRADE_DETECTED",
"signature": "b64u: . . . ",
"ext": { }
[B3N] Notes (evidence-only; non-dispositive).

The fields time_sanity_ref and display_binding (panel_id_hash, present_fence_id), and the fields transport_exporter, s2_ref, model_load_receipt_ref, use_receipt_ref, isl_settlement_receipt_ref, tfr_ref, ipr_ref, cct_ref, clm_ref, bic_ref, ifc_ref, oic_receipt_ref, frame_token_id, layer_set_hash, thp_pt_ref, thp_state, zk, meter, and signed_head_id are optional and evidence-only; they do not alter TRC gate semantics.

Parsers SHOULD ignore unknown fields; 'ext' is reserved for forward compatibility.

Implementations MAY continue to emit "type": "VIEW/1.0"; the optional fields above remain valid under that minor.

[B4] Interaction Receipt
{
"type": "ACT/1.0",
"ovl ref": "ovl: . . . ",
"action": "tap|buy|route|save",
"meta": {"sku": " . . . ", "price_cents": 1234, "currency": "USD"}, //(opt.)
"idempotency": "uuid: . . . ", //(opt.)
"ts": "2025-09-05T12:00:17Z",
"signature": "b64u: . . . "
}
[B5] APIs (Illustrative; Versioned; Evidence-First)
Headers (recommended): X-TRC-API-Version: 1.0; X-TRC-Profile: TRC-Core|TRC-Pro|TRC-Privacy; X-TRC-Request-ID: uuid.
Auth (illustrative): OAuth2/OIDC (or mTLS) per deployment.
Verify
POST/r2/verify→200 OK
Request: R$^2$ (JCS/CBOR). Response:
{
"status": "PASS|HOLD|FAIL|STALE",
"codes": [" . . . "], "label_state": "GREEN|AMBER|RED",
"ms": 5.8,
"signed_head_id": "sth: . . . ", "inclusion_proof_ref": "url: . . . ", "evolution_proof_ref": "url: . . . ",
"zk": {"proof_status": "PROOF_OK"}, //(opt.)
"meter": {"class": "verify", "units": 1}//(opt.)
}
Gatepoints
POST/gate/render|share|upload|record|clipboard→200|412
{"status": "PASS|HOLD|FAIL", "code": "STRUCTURED_PRECONDITION_FAILURE| . . . "}
Certification
POST/certify→Certification Result (see Appendix E1)
Self-Test
POST/runpermit/selftest→ {"pass": true, "ms_fail_close": . . . , "ms_rearm": . . . }

Evidence Intake
POST/evidence→accepts proof refs, takedown packets, school escalation transcripts (audit-only).
Status mapping (illustrative): PASS→200 OK, HOLD→206 Partial/Advisory or 200 with label_state: "AMBER", FAIL→412 Precondition Failed.

Appendix C—Claim↔Figure Mapping Ledger

Purpose. Aids search↔examination; non-limiting and not an admission.
Independent Claims
claim 1 (System)↔FIGS. 1-4, 6, 10.
claim 2 (Method)↔FIGS. 1, 3, 6, 11.
claim 4 (Verifier/CRM)↔FIGS. 2, 7, 8, 11.
Representative Dependents
Run-permit (3)↔FIGS. 5, 9.
RPCT (5)↔FIGS. 1-2, 7.
Freshness/Consistency (6)↔FIGS. 2-3.
Anti-Replay (7)↔FIG. 3.
Scene Digest (8)↔FIG. 1.
Content-Credentials (9)↔FIG. 11.
Gatepoints Method (10)↔FIG. 6.
CT Bridge Method (11)↔FIG. 11.
Quorum/Pro (12)↔FIG. 11.
ZK/Privacy (13)↔FIG. 11.
Kids/Critical (14, 15)↔FIG. 7.
Geo/Jurisdiction Fences (16)↔FIGS. 4, 8.
View-Deny Receipt (17)↔FIGS. 1, 8, 10.
Present-path surfaces (18)↔FIGS. 4, 9.
Accessibility (19)↔FIG. 10.
CRM (20)↔FIG. 11.
Badge/Registry (21)↔FIG. 11.
Short-Receipt (22)↔FIG. 8.
TOCTOU bind (23)↔FIG. 9.
Egress latch (24)↔FIGS. 6, 9.
Plane/MMU guard (25)↔FIGS. 5, 9.
Conflict record (26)↔FIG. 2.
Evidence record (27)↔FIG. 5.
ZK Verdict Ref (28)↔FIG. 11.
Generative (29)↔FIG. 11.
Policy Consumer (30)↔FIG. 11.
Notes. Figure cites are illustrative of supporting disclosure and are not admissions of essentiality, priority, or claim mapping. Where multiple figures are listed, any one or more may support the recited limitation; other places in the specification may also provide support.

Appendix D—Protocols & Verifier Algorithm
(Illustrative)

[D1] Canonicalization
JSON SHOULD be JCS (RFC 8785); CBOR SHOULD be deterministic (RFC 8949).
Base-N SHOULD follow RFC 4648 (base64url; canonical padding; reject non-alphabet).
Timestamps: RFC 3339 UTC.
[D1A] Receipt identity (illustrative). The verifier MAY recompute receipt_id=H(canonical(R2_core)) and, when present, confirm commitment equals H(canonical (R2_core)); mismatches log NONCONFORMANT_RECEIPT (evidence-only).
[D2] Freshness & Consistency
Freshness policy references a current Signed Head (e.g., CT-style STH) with MMD constraints.
On head advance, require append-only evolution proof (prior to current).

[D3] Anti-Replay & Scene Binding

Reject repeated ART tuples (nonce reuse, non-monotonic counter, mismatched scene_digest).

Scene binding MUST match declared fences/budgets (e.g., driver/medical).

[D3A] TOCTOU enforce. The compositor SHALL compare the current {layer_set_hash, presentation_mode} to the bound values for frame_token_id; mismatch→HOLD/FAIL. Tokens expire at token_ttl_ms and MUST NOT be reused across frames. (Illustrative; enforcement semantics are claim-controlled by the latch.)

[D4] Verifier Pseudocode (illustrative)

def verify_R2 (r2, policy, cache): #0) Signature/schema if not sig_ok(r2): return FAIL("SIG_INVALID")

if not schema_ok(r2): return FAIL("NONCONFOR-MANT_RECEIPT")

1) Freshness & signed head head=cache.get_signed_head(r2.log.log_id)

if not fresh_enough(head, policy.mmd): return HOLD ("ANCHOR_STALE")

if head.advanced and not consistency_ok (r2.log.evolution_proof_ref, head):
    return HOLD("CONSISTENCY_REQUIRED")

2) Anti-replay & scene binding if not replay_ok(r2.art, r2.scene.digest): return FAIL ("REPLAY_BLOCK")

if not fences_ok(r2.fences): return FAIL("GEOFENCE_ FAIL") # includes juris if not budgets_ok(r2.budgets): return FAIL("SAFETY_ BUDGET")

3) Consent/minors/profiles if requires_rpct(r2, policy) and not rpct_ok(r2.rpct_refs):
    return FAIL("CONSENT_MISSING")

if policy.profile=KIDS and not kids_ok(r2):
    return FAIL("KIDS_POLICY")

4) Generative attestation (optional)

if is_generative(r2):
    if not model_ok(r2.gen):
        return FAIL("MODEL_UNATTESTED")
    if not prompt_ok(r2.gen.prompt_hash):
        return FAIL("PROMPT_UNBOUND")

5) ZK predicates (TRC-Privacy)

if policy.requires_zk and not zk_ok(r2.zk):
    return HOLD("PRIVACY_ZK_FAIL") # or FAIL per policy return PASS ( )

[D5] Decision→Label & Gatepoints

PASS→compose pixels; Label State=GREEN; allow egress by default.

HOLD→compose advisory/masked; Label=AMBER; Share/Upload/Record block.

FAIL→drop pixels; Label (advisory)=RED; all egress deny.

[D6] Timeout & Watchdog

If verify exceeds Frame Budget, return FAIL("TIME_ BUDGET_EXCEEDED") and drop pixels.

[D7] HTTP Mapping (illustrative)

PASS→200 OK; HOLD→206 Partial (or 200 with label_state: "AMBER"); FAIL→412 Precondition Failed.

Return JSON {status, code(s), label_state, ms}.

[D8] Conflict Handling®

If logs disagree, emit signed conflict record, return HOLD("CONSISTENCY_REQUIRED"), retry per policy.

[D9] Quorum (TRC-Pro)

Validate k-of-m heads & inclusion/evolution proofs; HOLD on disagreement; PASS on quorum.

Appendix E—Transcript & Certificate Schemas

Conventions. UTF-8; RFC 3339 UTC timestamps; binary as base64url (b64u:). JSON MAY be JCS-canonical; CBOR MAY be deterministic. Fields marked (opt.) are evidence-only and do not affect gate semantics.

[E1] Certification Result (TRC-Core/Pro/Privacy)

```
{
  "type": "CERT/1.0",
  "profile": "TRC-Core/1.0",            // TRC-Core | TRC-Pro | TRC-Privacy
  "status": "PASS|HOLD|FAIL|STALE|REVOKED",
  "codes": ["..."],                     // deny/hint codes (Appendix I)
  "issued_at": "2025-09-05T12:00:16Z",
  "cert_id": "uuid:...",
  "issuer": { "did": "did:org:platform", "key_id": "did:org:platform#k1" },
  "subject": { "ovl_ref": "ovl:...", "app_id": "app:..." },
  "receipt_id": "sha256:...",           // (opt.) audit-only; H(canonical R2_core)
  // --- Evidence-only interoperability (all optional; does not affect gates) ---
  "signed_heads": ["sth:..."],
  "inclusion_proof_ref": "url:...",
  "evolution_proof_ref": "url:...",
  "sth_age_ms": 12345,
  "freshness_policy_ref": "https://.../mmd-policy",
  "cross_rail_refs": {
  "s2_ref": "s2:...",                   // TSIL (already present)
  "model_load_receipt_ref": "mlr:...",      // AML-Gate (already present)
  "use_receipt_ref": "urc:...",         // UPL (already present)
  "isl_settlement_receipt_ref": "isl:...",  // ISL (already present)
  "tfr_ref": "tfr:..."          // CCR²: Training/Fine-Tune Receipt
  "ipr_ref": "ipr:...",         // CCR²: Inference Provenance Receipt
  "cct_ref": "cct:...",         // CCR²: Creator Consent Token
  "clm_ref": "clm:...",             // LBTC: Composable License Manifest
  "bic_ref": "bic:...",         // R²UA: Bounded-Impact Certificate
  "ifc_ref": "ifc:...",         // R²UA: Index-Forgetting Certificate
```

-continued

```
    "oic_receipt_ref": "oic:...",          // OIC: Policy-compliance purchase receipt
    "time_sanity_ref": "tsref:...",
    "thp_pt_ref": "thp:pt:...",
    "thp_verification_result_id": "thp:vrid:..."
  },
  "status_staple": {
    "ocsp_like": true,
    "this_update": "2025-09-16T12:00:00Z",
    "next_update": "2025-09-16T12:05:00Z"
  },
  "ct_compatible_heads": true,
    "zk": { "proof_ref": "url:...", "proof_status":
    "PROOF_PENDING|PROOF_OK|PROOF_FAIL" },
    "zk_hint": { "scheme": "Groth16|PLONK|...", "vk_ref": "url:...", "proof_size_bytes": 1234 },
    "c2pa_manifest_ref": "hashuri:self#jumbf",
    "eat_token_ref": "eat:...",
    "did_subject": "did:org:...",
    "fhir_auditevent_ref": "fhir: AuditEvent/...",
    "consent_log_ref": "https://.../consent/...",
    "erasable_link_ref": "https://.../gdpr/erase/...",
    "safety_plan_ref": "https://.../safety-plan",
    "incident_report_ref": "https://.../incidents/...",
    "group_sig_ref": "url:...",              // (opt.) short group signature on this cert
    "opening_authority": "did:...",           // (opt.) tracing/revocation authority
    "ad_measurement": {                       // (opt.) audit-only
       "viewable time_ms": 1200,
       "occlusion_pct": 12.5,
       "ad_angle": {"x": 5, "y": 0, "z": 0 },
       "poll_ms": 200,
       "idle_policy": "auto",
       "min_size_pct": 1.5
    },
    "school_context": "k-12|higher_ed|none",     // (opt.) audit-only
    "takedown_packet_ref": "url:case/...",       // (opt.) audit-only
    "sc_id": "DRIVER|SURGERY|K-12",              // (opt.) evidence-only
    "store_gate": "ALLOW|RESTRICT|DENY",         // (opt.) evidence-only
    "redaction_profile_ref": "https://.../regulator-view-redaction", // (opt.) audit-only
    // --- Conformance & licensing enablers (optional; evidence-only) ---
    "badge": {
       "badge_id": "trc-core:2025-09:abcd1234",
       "registry_uri": "https://registry.example.org/trc/badges/abcd1234"
    },
    "meter": { "class": "verify|settle/actuation", "units": 1 },
    // --- Signature (base64url; RFC 4648) ---
    "signature": "b64u:..."
}
```

[E1N] Notes (evidence-only; non-dispositive).

The object 'cross_rail_refs' and all fields under "Evidence-only interoperability" are optional and evidence-only; they do not alter TRC view/permit gate semantics. Parsers SHOULD ignore unknown fields; 'ext' is reserved for forward compatibility. For TRC-Core conformance, Certification Results MUST include meter: {class,units} (one of verify|settle|actuation) to enable automated accounting. (Evidence-only; no gate impact.)

'time_sanity_ref MAY appear either at the top level of this object or within 'cross_rail_refs'; in either location it (and any display-binding references present in receipts) is optional and evidence-only and does not alter TRC view/permit gate semantics.

'status_staple' and 'ct_compatible_heads' are optional and evidence-only; they do not alter TRC gate semantics.

[E2] Self-Test Transcript

```
{
  "type": "SELFTEST/1.0",
  "first_boot": true,                 // (opt.) this transcript was produced at first boot
  "batch_id": "mfg:lot-2025-09-XX",          // (opt.) manufacturing/QA lot identifier
  "device_serial_hash": "sha256:...",          // (opt.) hash of device serial (privacy-preserving)
  "test_vector_ref": "url:tv/...",          // (opt.) test vector / plan reference
  "ms_fail_close": 12,
  "ms_rearm": 78,
  "result": "PASS|FAIL",
  "ts": "2025-09-05T12:00:00Z",
  "transcript_ref": "url:etl/selftest/...",   // (opt.) link to signed transcript in ETL
  "signature": "b64u:..."          // base64url (RFC 4648) signature over canonical body
}
```

[E3] Conflict Record (evidence-only)
```
{
"type": "CONFLICT/1.0",
"prior_sth_id": "sth: . . . ", "prior_tree_size": 123, "pri-
    or_ts". " . . . Z",
"current_sth_id": "sth: . . . ", "current_tree_size": 456,
    "current_ts": " . . . Z",
"log_ids":["log:a", "log:b"],
"verifier_sig":"b64u: . . . "
}
```
[E3N] Badges are cryptographically signed and revo-
cable; a revocation event MAY be published to the same
append-only log family for audit (evidence-only).

Appendix F—TRC-CORE Profile 1.0 (Normative
for Conformance; Scope-Neutral for Claims)

Purpose. This section enables certification & licensing
and is scope-neutral for the patent claims.

[F1] Label Mapping (normative)
```
{
    "profile": "TRC-Core/1.0",
    "labels": {
    "PASS": {"label_state": "GREEN", "store_gate":
        "ALLOW"},
    "HOLD": {"label_state": "AMBER", "store_gate":
        "RESTRICT"},
    "FAIL": {"label_state": "RED", "store_gate":
        "DENY"},
    "STALE": {"label_state": "AMBER", "store_gate":
        "RESTRICT"},
    "REVOKED": {"label_state": "RED", "store_gate":
        "DENY"}
    }
}
```
Note. In safety contexts, exchanges SHOULD accept only
store_gate: "ALLOW" (PASS) inventory. (Evidence-only;
gates unchanged.)

[F2] Conformance Checklist (normative high-level)

Per-frame verify under fresh signed head; consistency on
head advance.

Fail-closed latch; Label injection (machine-readable/-au-
dible).

Gatepoints: Render and ≥1 of Share/Upload/Record/Clip-
board.

Accessibility: label state via OS accessibility; carcon/TTS
optional.

Evidence: View/Interaction Receipts+deny transcripts.

Deny codes: see Appendix I.

Conformance manifest published (profile id, API version,
gatepoints, deny codes, label mapping, accessibility
exposure, audit endpoints).

Badge/registry: machine-readable badge URI (for app
stores/enterprises to auto-enforce).

Forward-compatibility: unknown fields/codes MUST be
preserved (do not error).

Numbers (frame budget, etc.) are report-only, not claim-
limiting.

TOCTOU report-only: implementation SHOULD report
{frame_token:true, token_ttl_ms: . . . } in the Confor-
mance Manifest; report-only, not claim-limiting.

receipt_id equals H(canonical(R2_core)) (report-only;
evidence-only).

Transparency (optional): operator MAY publish a quar-
terly transparency report (Appendix L).

First-boot self-test transcript present (report-only).

For TRC-Core OEM acceptance, devices MUST produce
a signed Self-Test Transcript at first boot. (Evidence-
only; no predicate change.)

TRC-Pro MUST include display_binding: {panel_id_
hash,present_fence_id} in View Receipts; mismatches
SHALL be reported as DISPLAY_FENCE MIS-
MATCH. (Evidence-only; gates unchanged.)

Certification Results and the Conformance Manifest
SHOULD be machine-readable (JSON/CBOR) for CI
ingestion by app stores and enterprises.

Report-only vectors (evidence-only):

"ENV_ATTEST_FAIL" (exporter mismatch on egress).

"CROSS_RAIL_CHAIN" (R2↔s2_ref/model_load_
receipt_ref/use_receipt_ref present).

"TIME_SANITY_DRIFT" (detectable discrepancy
across time sources beyond policy)

"DISPLAY_FENCE_MISMATCH" (present-fence or
panel-binding mismatch observed)

CAST_PARITY: mirrored/cast/desktop-mode outputs
produce parity receipts for local and remote pipelines;
any divergence yields HOLD/FAIL with a labeled
reason. (Report-only; evidence-only.)

DESKTOP_MODE_PARITY: parity receipts during
desktop-mode composition; divergence yields HOLD/
FAIL. (Report-only; evidence-only.)

THP_DOWNGRADE_DETECTED (signaling capability
missing/stripped in RTC overlay context; labeled
HOLD/LABEL in UI; report-only)

THP_UNDETERMINED_LABEL (presence unknown;
label-only state for RTC tiles; report-only)

TRC-Pro MUST emit parity receipts for local vs. cast/
mirror/desktop-mode paths, and HOLD on divergence.
(Evidence-only.)

Certification Results and the Conformance Manifest
SHOULD be machine-readable (JSON/CBOR) for CI inges-
tion by app stores and enterprises.

[F3] Provenance Mapping (illustrative; interop)

$R^2$'s origin.signer and claims[ ] bind to the platform's
provenance manifest (e.g., C2PA); runtime verification
is still required within the frame budget.

Inclusion/evolution proofs bind receipts to Signed Heads;
failures return Structured Precondition-Failure (code)
(e.g., HTTP 412 Precondition Failed).

Functional equivalents (illustrative). Where partner plat-
forms use alternative names or units, functionally
equivalent viewability/IVT measures (e.g., exposure
time, on-screen area %, occlusion %, viewing angle,
polling cadence, inactivity policy, min size %) MAY be
substituted; these values are audit-only and do not alter
TRC gates.

[F4] Service-Level Signals (report-only; audit-only)

Purpose. Shorten enterprise review and speed procure-
ment; does not affect gate semantics or conformance out-
come.

```
{
  "service": {
    "availability_slo": "99.9%",        // monthly, report-only
    "p50_verify_ms": 5,
```

```
    "p95_verify_ms": 40,
    "p99_verify_ms": 150,
    "p99_end_to_end_ms": 220,            // optional
    "watchdog_policy": "TIME_BUDGET_EXCEEDED@frame_budget",
    "signed_head_age_slo_ms": 600000,      // e.g., MMD reference
    "mmd_policy_ref": "https://.../mmd-policy", // reference only
    "cache_hit_rate_pct": 85,            // verify cache target
    "quorum_policy": "k-of-m (2/3)",        // TRC-Pro only; optional
    "quorum_diversity": ">=2 distinct operators", / report-only; distinct orgs/paths
    "proof_depth_logN": true,            // report-only: O(log n) proof depth supported
    "incident_ack_slo": "PT1H",            // optional: policy incident acknowledge SLO
    "conflict_resolution slo": "PT5M",          // ISO-8601 duration
    "audit_endpoint": "https://.../audit",
    "support_contact": "mailto:trc-support@...",
    "security_contact": "mailto:security@..."
  }
}
```

Interpretation. Values are report-only for partners/regulators and do not change TRC gate decisions or patent scope. 20

[F5] Conformance Manifest (machine-readable; report-only)

Purpose. Power store/enterprise CI pipelines; not claim-limiting.

```
{
  "profile_id": "TRC-Core/1.0",
  "api_version": "1.0",
  "schema_refs": [
    "https://.../schemas/cert/1.0",
    "https://.../schemas/selftest/1.0",
    "https://.../schemas/conflict/1.0"
  ],
  "capabilities": [
    "frame_token",
    "egress_latch",
    "plane_mmu_guard",
    "short_receipt",
    "conflict_record",
    "quorum",
    "zk_verdict",
    "evidence_bundle_export",
    "cross_rail_refs",
    "status_stapling",
    "ct_compatible_heads",
    "cast_parity",
    "audio_focus_gating",
    "thp_presence_ref"
  ],
  "api_layer_id": "org.example.trc",            // report-only: OpenXR layer name/ID
  "loader_manifest_ref": "https://.../openxr/layer.json", // report-only: URL to JSON layer
manifest
  "gatepoints_supported": ["render","share", "upload","record","clipboard"],
  "label_states": ["PASS","HOLD","FAIL", "STALE","REVOKED"],
  "deny_codes_supported": ["..."],              // Appendix I "accessibility_exposure": ["screen_reader", "tts","earcon"],
  "freshness_policy_ref": "https://.../freshness",
  "audit_endpoints": ["https://.../evidence","https://.../certs"],
  "badge": {
    "badge_id": "trc-core:2025-09:abcd1234",
    "registry_uri": "https://registry.example.org/trc/badges/abcd1234"
  },
  "sla_ref": "https://.../sla/trc-core"            // links service-level signals (F4)
}
```

[F6] Badge Object (machine-readable; evidence-only)
```
{
  "badge_id": "trc-core:2025-09:abcd1234",
  "issued_at": "2025-09-05T12:00:00Z",
  "issuer": "did: org: registry #k1",
  "manifest_ref":  "https://  . . .  /manifests/trc-core/
    abcd1234",
  "signature": "b64u: . . . "
}
```
Used by app stores/enterprises to auto-enforce allow-lists and meter verified events. Evidence-only; no gate impact.

Appendix G—App Store/Policy Template (One-Pager; Illustrative)

Title: Runtime Provenance & Consent for OS-Level Overlays (TRC-Core Conformance)

1. Requirement. Apps that render overlays targeting drivers, minors, or depicting faces/voices MUST use TRC-Core runtime gating & labeling.
2. Submission. Stores receive a Certification Result and Conformance Manifest per build. Conformance badge and Certification Result MUST be machine-readable (JSON) for CI ingestion.
3. Runtime. Non-conformant overlay calls return Structured Precondition-Failure (codes per Appendix I); unknown codes must not crash the gate.
4. Distribution Gate. FAIL/REVOKED may be refused distribution or routed to Restricted channels.
5. Audit. Developers retain View/Interaction Receipts and Self-Test transcripts ≥12 months.
6. Privacy (TRC-Privacy). ZK proofs MUST verify per Appendix D semantics; no raw frames required.
7. Ad Supply. Exchanges SHOULD accept only PASS-labeled inventory for safety contexts.
8. Coverage. Insurers MAY require TRC-Core for specified risk classes (e.g., driver HUD, telesurgery).
9. Minor-likeness & RPCT. Platforms SHOULD deny MINOR_LIKENESS_SUSPECTED unless RPCT: OK; KIDS_POLICY codes MUST be exposed via APIs.
10. School Incident Pack. Schools SHOULD maintain {policy_tags, title_ix_contact_ref, school_escalation_ref, incident_refs} and train staff on mandated-reporter timelines.
11. 48-hour Takedown. Platforms SHOULD accept takedown packet and return {case_id, removal_status}; counter-notice/corroboration SHOULD be supported to reduce false claims.
12. Restorative Pathways (K-12). Favor counseling/education flags over carceral responses; TRC artifacts are audit-only.
13. Hardware egress. USB-C/HDMI/DP capture and mirroring paths SHALL inherit the egress latch; overlays without a bound, fresh token are masked or dropped (see Appendix I: EGRESS_UNBOUND). (Illustrative.)

Enterprise CI: Release pipelines SHOULD require a valid TRC badge and SHALL reject FAIL/REVOKED artifacts (see label mapping). (Evidence-only; gates unchanged.)

Note. In safety contexts, exchanges SHOULD accept only store_gate: "ALLOW" (PASS) inventory. (Evidence-only; gates unchanged.) This template is illustrative and does not alter TRC gate semantics or claim scope.

Appendix H—Reference Builds (Openxr/Mobile/Wearables/Webxr/Cloud)-Illustrative

[H1] OpenXR API-Layer (illustrative; evidence-only). Participates in xrCreateInstance/xrGetInstanceProcAddr negotiation; intercepts compositor submissions; validates R2/RPCT within the frame budget; enforces the view-permit latch; injects a machine-readable label on PASS; honors XR_ENABLE_API_LAYERS and XR_API_LAYER_PATH. Gate semantics unchanged.

[H2] Mobile Compositor Module (illustrative; evidence-only).
Fronts Render/Share/Upload/Record/Clipboard gate-points; returns Structured Precondition-Failure (code) on violation; the egress latch verifies a transport_exporter binding and maps mismatches to ENV_ATTEST_FAIL or FRAME_TOKEN_MISMATCH. Gate semantics unchanged.

[H3] HUD Runtime (Critical) (illustrative; evidence-only).
Enforces whitelists, speed/scene fences, and RPCT; denies unsafe ad overlays; emits Interaction Receipts. Gate semantics unchanged.

[H4] MDM/TEE-anchored run-permit aggregator (illustrative; evidence-only).
In enterprise/OEM deployments with mobile-device-management or trusted-execution attestation, the run-permit aggregator obtains a hardware-rooted device attestation and binds freshness/evolution verification to an attested frame-unique token. Attestation TTLs and revocation lists MAY be enforced; on timeout or revocation the view-permit latch remains fail-closed until re-arm. Gate semantics unchanged.

[H5] Wearable smartglasses runtime (illustrative; evidence-only). A low-power runtime enforces the view-permit latch for on-device display and applies the egress latch on the phone-uplink (photos/video/calls); parity receipts are emitted for local and uplink paths; mismatches yield HOLD/FAIL with labeled reason. Gate semantics unchanged.

[H6] WebXR/WebView API-Layer (illustrative; evidence-only). Interposes at WebXR/W3C Immersive Web (or a WebView runtime); intercepts compositor submissions; validates R2/RPCT within the frame budget; enforces the view-permit latch; applies the egress latch for Share/Upload/Clipboard surfaces; honors browser feature/permissions policy. Gate semantics unchanged.

[H7] Cloud Render/Edge-Streaming Compositor (illustrative; evidence-only). For remote or edge compositing (cloud XR/VDI/live video overlays): a server-side compositor enforces the view-permit latch before encode; the network/egress path applies a transport_exporter binding; parity receipts are emitted for server and client pipelines; any divergence yields HOLD/FAIL with labeled reason. Gate semantics unchanged.

Builds are enablement examples; equivalents are within scope if they preserve the gate semantics described herein.

Appendix I—Deny Code Table (Extended; Non-Exhaustive; Normative Meanings)

Canon. Codes are machine-readable strings; platforms SHOULD preserve unknown codes. Each entry lists Trigger→Action→Typical Gatepoints.

Canon & aliases. Each deny code has a single canonical string (e.g., ANCHOR_STALE). Implementations SHOULD preserve unknown codes and MAY log aliases (e.g., "STALE_ANCHOR") mapping to the canonical name for telemetry; aliases are non-normative.

SIG_INVALID—Bad receipt signature→FAIL→Render/Share/Upload

ANCHOR_STALE—Head older than MMD→HOLD/STALE→Render/Share/Upload

CONSISTENCY_REQUIRED—Head advanced; no evolution proof→HOLD→Render/Upload

REPLAY_BLOCK—ART duplicate/mismatch→FAIL→Render

GEOFENCE_FAIL/JURIS_FAIL—Out-of-policy location→FAIL→All gates

SAFETY_BUDGET—Driver/medical budget exceeded→FAIL→Render/Record

CONSENT_MISSING—RPCT absent/expired→FAIL→Render/Share/Upload/Record

NONCONFORMANT_RECEIPT—Schema/policy violation→FAIL→All gates

TIME_BUDGET_EXCEEDED—Verify exceeded frame time→FAIL→Render

OFFLINE_EXPIRED—Short-Receipt expired pre-freshness→FAIL→Share/Upload/Record

MODEL_UNATTESTED—Missing model attest fields→FAIL→Render

PROMPT_UNBOUND—Prompt hash mismatch/absent→FAIL→Render

PRIVACY_ZK_FAIL—ZK predicate invalid/missing→FAIL/HOLD→Render/Upload

KIDS_POLICY—Kids profile rule violation (e.g., ad cap)→FAIL→All gates

QUORUM_UNAVAILABLE—Required quorum not available→HOLD→Render/Upload

MINOR_LIKENESS_SUSPECTED—Face/voice age/identity heuristics or policy signals indicate a minor likeness and RPCT/guardian path is required→HOLD (guardian co-sign/RPCT verification)→Render/Share/Upload/Record PLATFORM_ATTEST_FAIL—Platform attestation/verifiable-boot posture missing or mismatched→HOLD/FAIL→Render/Share/Upload/Record.

STATUS_STAPLE_STALE—Evidence staple (this_update/next_update) stale or missing→HOLD/FAIL→Share/Upload/Record Vendors may extend with vnd.<org>.<code>; conflicts SHOULD be logged as signed conflict records.

Appendix J—R2 Schema Extensions

Note. All fields are optional and non-limiting. Backward-compatible with Appendix B.

```
{
  "type":"R2/1.1",
  "api_version":"1.1",
  "overlay_id":"ovl:...",
  "origin": {"app_id":"app:...","signer":"did:...","attested":true},
"gen": {"model_id":"mod:...", "model_version":"...", "prompt_hash":"sha256:...","safety_verdict":"PASS|WARN|BLOCK"},
"scene": {"digest":"sha256:...", "pose": {"qx":...,"qy":..., "qz":...,"qw":...}, "timecode":"ptp:..."},
    "claims":[{"kind": "nav-arrow", "bbox":[...]}, {"kind":"ad","slot":"..."}],
    "fences": {"geo":["US-CA"], "juris":["EEA"],"speed_kph_max":120},
    "budgets": {"safety":"driver","kids":false,"ad_freq_cap":3},
    "rpct_refs":["rpct:..."],
    "zk":[{"type":"set-membership","statement":"ad_source ∉ prohibited", "proof_ref": "url:...","proof_status":"PROOF_OK"}],
    "art":"sha256:...",
"log": {"log_id":"log:...","signed_head_id":"sth:...","inclusion_proof_ref":"url:...", "evolution_proof_ref":"url:..."},
"ad_measurement": {"viewable_time_ms":1200,"occlusion_pct": 12.5,"ad_angle": {"x":5,"y":0,"z":0},"poll_ms":200,"idle_policy":"auto", "min_size_pct":1.5},
    "meter": {"class": "verify|settle|actuation", "units":1},
    "cxt": {"vnd.example.vendor_field":"..."},        // future-proofed namespaced extensions
    "ts":"2025-09-05T12:00:00Z",
    "signature":"b64u:..."
}
```

DRIVER_DISTRACTION—Critical profile distraction rule violated→FAIL→Render

OVERLAY_INJECTED—Layer outside trusted path→FAIL/HOLD→Render/Upload

CAMERA_UNEXPECTED—Camera enable/video buffer access during gated session→HOLD/FAIL→Record/Render BOUNDARY_TOUCHED—Room/chaperone bounds changed mid-session→HOLD→Render INCEPTION_SUSPECTED—Short-lived home anomaly/impersonated shell→HOLD→Render EGRESS_UNBOUND—Hardware egress without bound frame token→HOLD/FAIL→Share/Upload/Record FRAME_TOKEN_MISMATCH—Frame token missing/mismatched for current layer/mode→HOLD/FAIL→Render/Upload ACOUSTIC_RISK—Audio SPL/crest-factor risk threshold exceeded→HOLD/FAIL→Render/Record ENV_ATTEST_FAIL—Channel binding/exporter mismatch→HOLD/FAIL→Render/Share/Upload/Record

Appendix K—Ethical-Use & Public-Interest Covenant (Illustrative; Non-Limiting)

[K000] Purpose statement (illustrative; non-limiting). Deployments MAY refuse rendering or egress based on configured dignity- and vulnerability-protection policies (e.g., minors, exploited individuals), with the aim of prioritizing human dignity and protection of the vulnerable; this statement is policy-oriented and non-dispositive of TRC gate semantics.

[K001] This appendix expresses the public-interest intent of the work: to reduce AI-enabled manipulation and mimicry, deter fraud and harassment, and protect minors and vulnerable users. It is illustrative and non-limiting; the claims control.

[K002] Human dignity & minors. Deployments SHOULD prefer defaults that minimize the risk of sexual exploitation, harassment, and identity misuse. Child-safety posture includes KIDS_POLICY denies, RPCT checks for likenesses, and School Mode escalation. See Appendix I.

[K003] Prohibited-use examples (illustrative). Platforms MAY refuse uses such as: mass surveillance of protected classes; persecution; coercive social-credit scoring; sexual deepfakes of minors; impersonation intended to defraud. These examples are business posture only and do not limit claim scope.

[K004] Humanitarian & FRAND posture. Licensing MAY include humanitarian carve-outs and FRAND-like terms for safety/education/public-interest deployments. Such terms are contractual, non-technical, and do not alter TRC gate semantics or the claims.

[K005] Restorative pathways (K-12). In K-12 contexts, deployments SHOULD favor counseling/education responses over carceral responses for minor offenders, consistent with school policy; artifacts (takedown packet, school_escalation_ref) are audit-only.

[K006] Accessibility & inclusion. Labels SHOULD be exposed via accessibility channels (visual/audio/haptics) and explained in plain language for diverse audiences; see Appendix A.

[K007] Transparency & accountability. Operators MAY publish periodic transparency reports that summarize deny distributions, KIDS_POLICY events, takedown packet counts, and remediation latencies using audit-only fields (see Appendix L). These reports are non-technical and do not alter gates.

[K008] Privacy-by-design. TRC-Privacy MAY use ZK predicates and regulator-view redactions so evidence is auditable without exposing raw personal data; see Appendix E1.

[K009] Digital Shepherd Mode (illustrative; evidence-only).

Deployments MAY activate a "Shepherd Mode" profile in which vulnerable users (e.g., children, persons under guardianship, or users flagged for elevated risk) receive heightened protections: overlays MUST satisfy stricter consent checks; ambient manipulation features MAY be disabled; and user actions MAY be recorded to a tamper-evident log for guardian or regulator review. This profile is policy/configuration only and does not alter TRC gate semantics; examples are illustrative and non-limiting.

[K010] Interoperability. These public-interest practices are compatible with TRC-Core/Pro/Privacy profiles and do not constrain implementations. References herein are illustrative and not incorporated by reference.

[K011] Non-limiting statement. This appendix aids understanding of ethical goals and licensing posture; it does not limit or interpret any claim.

[K012] Licensing note (communication-only; not part of gate semantics). Licensing terms are separate from this specification and have no effect on claim scope or gate semantics; any covenant-based licensing the Applicant may adopt is contractual and non-dispositive here.

Appendix L—Transparency Report (Illustrative; Audit-Only)

[L1] Quarterly transparency (illustrative). Operators MAY produce a public report:

```
{
  "period": "2025-Q4",
  "generated_at": "2026-01-15T00:00:00Z",      // (opt.) RFC 3339 UTC
  "totals": {"pass": 1234567,"hold":2345,"fail":6789,"stale":321},
  "deny_by_code": {
```

-continued

```
    "CONSENT_MISSING":120,
    "KIDS_POLICY":75,
    "REPLAY_BLOCK":64,
    "DRIVER_DISTRACTION":11
  },
  "kids_profile_events": 102,
  "takedown_packets": 29,
  "school_escalations": 7,
  "egress_unbound_events": 12,        // (opt.) matches Appendix I: EGRESS_UNBOUND
  "frame_token_mismatch": 5,          // (opt.) matches Appendix I: FRAME_TOKEN_MISMATCH
  "remediation_latency_ms_p50": 8000,
  "remediation_latency_ms_p95": 36000
}
```
Values are report-only and do not alter TRC gate semantics.

What is claimed is:

1. A computer-implemented system comprising one or more processors and a non-transitory memory storing instructions that, when executed by the one or more processors, cause the system to:

(a) include a system-level compositor pipeline, the system-level compositor pipeline comprising a reality compositor configured to merge a sensor or liveness layer with at least one synthetic overlay for presentation on a render surface;

(b) execute, in a compositor render path of the system-level compositor pipeline and before scan-out, a receipt verifier comprising receipt-verification logic that is executed by the one or more processors and configured to validate, within a frame budget and under a freshness policy, a Reality Receipt (R2) associated with the synthetic overlay, the R2 comprising at least:

(i) an overlay identifier;

(ii) an origin signature;

(iii) a scene digest;

(iv) one or more policy predicates including geographic fences, jurisdictional fences, and safety budgets; and (v) an inclusion proof for the R2 or for a commitment derived from the R2 relative to a current signed head of an append-only public log and, responsive to head advance under the freshness policy, a consistency proof demonstrating append-only evolution of the append-only public log; and (c) enforce, in the compositor render path and before scan-out, a view-permit latch that is coupled to the reality compositor and comprises compositor-resident gating logic that determines whether the synthetic overlay is eligible to be rendered based on an outcome of the validation in (b), the view-permit latch being configured to:

(i) refuse rendering of the synthetic overlay and return a Structured Precondition-Failure code when the validation in (b) fails any requirement; and (ii) inject a machine-readable label onto the render surface when the validation in (b) succeeds.

2. The system of claim 1, deployed on a device comprising a trusted execution environment (TEE) or secure element and further comprising a run-permit latch coupled to a graphics control path, the system configured to: aggregate per-application predicate results; enforce fail-closed behavior within a frame budget upon violation; re-arm upon satisfaction; and emit allow and deny evidence records including a hardware-secured signature, a scene digest, a fail-close time, and a re-arm time.

3. The system of claim 1, wherein the R2 further references a Right-of-Publicity Consent Token (RPCT) for a face, voice, or likeness present in the overlay, and the view-permit latch refuses rendering when the RPCT is missing or expired.

4. The system of claim 1, wherein the receipt verifier validates freshness to a signed head obtained within a maximum-merge-delay (MMD) window and, responsive to observing a newer head, validates a prior-to-current consistency proof demonstrating append-only evolution of the append-only public log between the prior signed head and the newer signed head.

5. The system of claim 1, wherein the receipt verifier verifies an anti-replay tuple comprising a nonce, a monotonic counter, a device profile identifier, a policy epoch, and the scene digest, and refuses reuse of the anti-replay tuple.

6. The system of claim 1, wherein the scene digest comprises at least one of camera pose, a depth map, a feature map, or a camera-pipeline timecode computed at capture time.

7. The system of claim 1, wherein a Kids device profile enforces age policies and ad-frequency caps and the view-permit latch denies overlays that exceed the cap with a KIDS_POLICY code.

8. The system of claim 1, wherein a Critical device profile denies overlays not whitelisted for driver or medical contexts and emits a DRIVER_DISTRACTION code on violation.

9. The system of claim 1, wherein the receipt verifier denies overlays that violate geographic/jurisdictional fences with a deny code selected from GEOFENCE_FAIL or JURIS_FAIL.

10. The system of claim 1, wherein the presentation pipeline includes at least one of:
  (i) layer admission or submit;
  (ii) scene-graph commit;
  (iii) present scheduling with a token-bound present fence;
  (iv) overlay-plane promotion in a display engine;
  (v) hardware composition or atomic present;
  (vi) egress duplication for cast/mirror/remote composition paths; or
  (vii) snapshot/export paths including Record/Capture and Clipboard/Drag-Drop, provided gating occurs before scan-out or subscriber visibility.

11. The system of claim 1, wherein the reality compositor further gates audio and haptic overlays in synchrony with visual overlays and injects a machine-audible label corresponding to PASS, HOLD, FAIL, or STALE.

12. The system of claim 1, wherein the receipt verifier validates an offline Short-Receipt and defers Share or Upload until freshness is obtained; stale receipts are denied, and Short-Receipt renders carry a watermark corresponding to a HOLD label state until PASS.

13. The system of claim 1, wherein the compositor binds verify-to-pixels by associating the validation outcome with a frame token, and any change in layers, surfaces, or presentation mode that would display pixels not covered by the verified token forces FAIL or HOLD and drops the overlay enforce time-of-check-to-time-of-use (TOCTOU) binding.

14. The system of claim 1, wherein for screen casting, mirroring, or remote composition, the view-permit latch is enforced at an egress path, and overlays without a bound, fresh frame token associated with the validation outcome are masked or dropped.

15. The system of claim 1, wherein the latch is implemented in a display-engine overlay-plane controller or guarded by a system memory management unit (MMU), or both, and attempts to bypass the compositor plane are denied within the frame budget.

16. The system of claim 1, wherein the system emits allow and deny evidence records that include fields comprising label_state, receipt_id, scene_digest, fail_close_time, rearm_time, and code, each signed with a hardware-secured key and posted to a transparency-style log.

17. The system of claim 1, wherein a verifier timeout is treated as a Structured Precondition-Failure code with TIME_BUDGET_EXCEEDED, and the overlay is dropped within the frame budget.

18. The system of claim 1, wherein the R2 further comprises model_id, model_version, prompt_hash, and a safety_verdict for overlays produced by a generative model, and the view-permit latch returns a deny code selected from MODEL_UNATTESTED and PROMPT_UNBOUND upon validation failure.

19. A computer-implemented method comprising: receiving an overlay intent; validating, within a frame budget and under a freshness policy, a Reality Receipt (R2) associated with the overlay; when validation succeeds, rendering the overlay and injecting a machine-readable label; when validation fails, dropping the overlay and returning a Structured Precondition-Failure code; and emitting View Receipts for renders and Interaction Receipts for user actions associated with the overlay.

20. The method of claim 19, further comprising applying the same predicates at Render and at least one of Share, Upload, Record/Capture, or Clipboard/Drag-Drop and returning a Structured Precondition-Failure code on violation.

21. The method of claim 19, further comprising attaching a reference to a current signed head of an append-only public log and treating the signed head as the basis for inclusion and append-only evolution proofs recorded in at least one of a View Receipt or an Interaction Receipt.

22. The method of claim 19, further comprising emitting a View-Deny Receipt recording a deny code and the scene digest when the overlay is dropped.

23. A non-transitory computer-readable medium storing instructions that, when executed, cause one or more processors to perform the method of claim 19.

24. The method of claim 19, further comprising attaching to the machine-readable label a proof reference for a succinct zero-knowledge detection proof attesting to a client-side classifier verdict without disclosing frames, and treating PROOF_PENDING as HOLD.

25. An apparatus comprising one or more processors and memory storing instructions that, when executed, cause the apparatus to: ingest Reality Receipts, View Receipts, and Interaction Receipts; validate, under a freshness policy, proofs of inclusion relative to a current signed head of an append-only public log and, responsive to head changes, proofs of append-only evolution demonstrating consistency of the append-only public log; verify anti-replay tuples and policy predicates including geographic fences, jurisdictional fences, and safety budgets; and emit a machine-readable Certification Result for a selected profile from a Trusted Reality Compositor (TRC) profile set including TRC-Core, TRC-Pro, or TRC-Privacy.

26. The apparatus of claim 25, wherein the Certification Result further comprises a content-credential reference selected from a Coalition for Content Provenance and Authenticity (C2PA) hashed uniform resource identifier (URI) or a hashed extended uniform resource identifier (hashed-ext-URI) identifying a manifest or claim signature captured as audit-only evidence.

27. The apparatus of claim 25, wherein TRC-Pro requires quorum validation across multiple transparency logs and at least one of trusted-execution attestation and zero-knowl- edge predicate assurance.

28. The apparatus of claim 25, wherein TRC-Privacy validates a zero-knowledge predicate that a prohibited source contribution is less than a threshold.

29. The apparatus of claim 25, wherein the Certification Result further comprises (i) a signed badge identifier veri- fiable against a public registry and (ii) a registry uniform resource identifier (URI), for consumption by a platform selected from an app store or an enterprise continuous- integration (CI) system to gate distribution or egress for overlays lacking a valid badge corresponding to a TRC-Core conformance manifest.

30. The apparatus of claim 25, wherein the Certification Result is consumable by a platform selected from an app store, an insurer, a regulator, or an ad exchange to gate distribution, coverage, conformance, or bidding for aug- mented reality (AR), virtual reality (VR), or camera content.

\* \* \* \* \*